United States Patent
Leabman et al.

(10) Patent No.: US 11,652,369 B2
(45) Date of Patent: *May 16, 2023

(54) SYSTEMS AND METHODS OF DETERMINING A LOCATION OF A RECEIVER DEVICE AND WIRELESSLY DELIVERING POWER TO A FOCUS REGION ASSOCIATED WITH THE RECEIVER DEVICE

(71) Applicant: Energous Corporation, San Jose, CA (US)

(72) Inventors: Michael A. Leabman, San Ramon, CA (US); Gregory Scott Brewer, Livermore, CA (US)

(73) Assignee: Energous Corporation, San Jose, CA (US)

( * ) Notice: Subject to any disclaimer, the term of this patent is extended or adjusted under 35 U.S.C. 154(b) by 104 days.

This patent is subject to a terminal disclaimer.

(21) Appl. No.: 17/216,474

(22) Filed: Mar. 29, 2021

(65) Prior Publication Data

US 2021/0313840 A1 Oct. 7, 2021

Related U.S. Application Data

(63) Continuation of application No. 15/912,520, filed on Mar. 5, 2018, now Pat. No. 10,965,164, which is a
(Continued)

(51) Int. Cl.
*H02J 7/00* (2006.01)
*H02J 50/20* (2016.01)
(Continued)

(52) U.S. Cl.
CPC .......... *H02J 50/20* (2016.02); *H02J 7/00034* (2020.01); *H02J 50/402* (2020.01); *H02J 50/80* (2016.02)

(58) Field of Classification Search
CPC ....................................................... H02J 50/20
(Continued)

(56) References Cited

U.S. PATENT DOCUMENTS

| 787,412 A | 4/1905 | Tesla |
| 2,811,624 A | 10/1957 | Haagensen |

(Continued)

FOREIGN PATENT DOCUMENTS

| CN | 1829999 A | 9/2006 |
| CN | 101465471 A | 6/2009 |

(Continued)

OTHER PUBLICATIONS

Energous Corp., IPRP, PCT/US2014/037072, Nov. 10, 2015, 6pgs.
(Continued)

*Primary Examiner* — Yalkew Fantu
(74) *Attorney, Agent, or Firm* — Morgan, Lewis & Bockius LLP

(57) ABSTRACT

A method of wireless power transmission includes transmitting, via antenna elements of an antenna array, a plurality of first signals having a first phase and a first gain. The method further includes determining a location of a receiver device based on the plurality of first signals transmitted by the antenna elements of the antenna array. The method includes adjusting, for the antenna elements of the antenna array, one of a phase and a gain based on the location of the receiver device. The method includes transmitting, via the antenna elements, a plurality of second signals having a second phase or a second gain such that the plurality of second signals are focused at a focus region that is approximately the size of an antenna array of the receiver device and provide energy at the focus region that is converted by the receiver device into usable power.

27 Claims, 17 Drawing Sheets

Related U.S. Application Data continuation-in-part of application No. 13/891,399, filed on May 10, 2013, now Pat. No. 9,912,199, which is a continuation-in-part of application No. 13/891,445, filed on May 10, 2013, now Pat. No. 10,103,582.

(60) Provisional application No. 61/668,799, filed on Jul. 6, 2012, provisional application No. 61/677,706, filed on Jul. 31, 2012, provisional application No. 61/720,798, filed on Oct. 31, 2012, provisional application No. 61/668,799, filed on Jul. 6, 2012, provisional application No. 61/677,706, filed on Jul. 31, 2012, provisional application No. 61/720,798, filed on Oct. 31, 2012.

(51) Int. Cl.
  *H02J 50/80* (2016.01)
  *H02J 50/40* (2016.01)

(58) Field of Classification Search
  USPC .......................................................... 320/108
  See application file for complete search history.

(56) References Cited

U.S. PATENT DOCUMENTS

| | | |
|---|---|---|
| 2,863,148 A | 12/1958 | Gammon et al. |
| 3,167,775 A | 1/1965 | Guertler |
| 3,434,678 A | 3/1969 | Brown et al. |
| 3,696,384 A | 10/1972 | Lester |
| 3,754,269 A | 8/1973 | Clavin |
| 4,101,895 A | 7/1978 | Jones, Jr. |
| 4,360,741 A | 11/1982 | Fitzsimmons et al. |
| 4,944,036 A | 7/1990 | Hyatt |
| 4,995,010 A | 2/1991 | Knight |
| 5,142,292 A | 8/1992 | Chang |
| 5,200,759 A | 4/1993 | McGinnis |
| 5,211,471 A | 5/1993 | Rohrs |
| 5,276,455 A | 1/1994 | Fitzsimmons et al. |
| 5,548,292 A | 8/1996 | Hirshfield et al. |
| 5,556,749 A | 9/1996 | Mitsuhashi et al. |
| 5,568,088 A | 10/1996 | Dent et al. |
| 5,631,572 A | 5/1997 | Sheen et al. |
| 5,646,633 A | 7/1997 | Dahlberg |
| 5,697,063 A | 12/1997 | Kishigami et al. |
| 5,712,642 A | 1/1998 | Hulderman |
| 5,936,527 A | 8/1999 | Isaacman et al. |
| 5,982,139 A | 11/1999 | Parise |
| 6,046,708 A | 4/2000 | MacDonald, Jr. et al. |
| 6,061,025 A | 5/2000 | Jackson et al. |
| 6,127,799 A | 10/2000 | Krishnan |
| 6,127,942 A | 10/2000 | Welle |
| 6,163,296 A | 12/2000 | Lier et al. |
| 6,176,433 B1 | 1/2001 | Uesaka et al. |
| 6,271,799 B1 | 8/2001 | Rief |
| 6,289,237 B1 | 9/2001 | Mickle et al. |
| 6,329,908 B1 | 12/2001 | Frecska |
| 6,400,586 B2 | 6/2002 | Raddi et al. |
| 6,421,235 B2 | 7/2002 | Ditzik |
| 6,437,685 B2 | 8/2002 | Hanaki |
| 6,456,253 B1 | 9/2002 | Rummeli et al. |
| 6,476,795 B1 | 11/2002 | Derocher et al. |
| 6,501,414 B2 | 12/2002 | Amdt et al. |
| 6,583,723 B2 | 6/2003 | Watanabe et al. |
| 6,597,897 B2 | 7/2003 | Tang |
| 6,615,074 B2 | 9/2003 | Mickle et al. |
| 6,650,376 B1 | 11/2003 | Obitsu |
| 6,664,920 B1 | 12/2003 | Mott et al. |
| 6,680,700 B2 | 1/2004 | Hilgers |
| 6,798,716 B1 | 9/2004 | Charych |
| 6,803,744 B1 | 10/2004 | Sabo |
| 6,853,197 B1 | 2/2005 | McFarland |
| 6,856,291 B2 | 2/2005 | Mickle et al. |
| 6,911,945 B2 | 6/2005 | Korva |
| 6,960,968 B2 | 11/2005 | Odendaal et al. |
| 6,967,462 B1 | 11/2005 | Landis |
| 6,988,026 B2 | 1/2006 | Breed et al. |
| 7,003,350 B2 | 2/2006 | Denker et al. |
| 7,012,572 B1 | 3/2006 | Schaffner et al. |
| 7,027,311 B2 | 4/2006 | Vanderelli et al. |
| 7,068,234 B2 | 6/2006 | Sievenpiper |
| 7,068,991 B2 | 6/2006 | Parise |
| 7,079,079 B2 | 7/2006 | Jo et al. |
| 7,183,748 B1 | 2/2007 | Unno et al. |
| 7,191,013 B1 | 3/2007 | Miranda et al. |
| 7,193,644 B2 | 3/2007 | Carter |
| 7,196,663 B2 | 3/2007 | Bolzer et al. |
| 7,205,749 B2 | 4/2007 | Hagen et al. |
| 7,215,296 B2 | 5/2007 | Abramov et al. |
| 7,222,356 B1 | 5/2007 | Yonezawa et al. |
| 7,274,334 B2 | 9/2007 | O'Riordan et al. |
| 7,274,336 B2 | 9/2007 | Carson |
| 7,351,975 B2 | 4/2008 | Brady et al. |
| 7,359,730 B2 | 4/2008 | Dennis et al. |
| 7,372,408 B2 | 5/2008 | Gaucher |
| 7,392,068 B2 | 6/2008 | Dayan |
| 7,403,803 B2 | 7/2008 | Mickle et al. |
| 7,443,057 B2 | 10/2008 | Nunally |
| 7,451,839 B2 | 11/2008 | Perlman |
| 7,463,201 B2 | 12/2008 | Chiang et al. |
| 7,471,247 B2 | 12/2008 | Saily |
| 7,535,195 B1 | 5/2009 | Horovitz et al. |
| 7,614,556 B2 | 11/2009 | Overhultz et al. |
| 7,639,994 B2 | 12/2009 | Greene et al. |
| 7,643,312 B2 | 1/2010 | Vanderelli et al. |
| 7,652,577 B1 | 1/2010 | Madhow et al. |
| 7,679,576 B2 | 3/2010 | Riedel et al. |
| 7,702,771 B2 | 4/2010 | Ewing et al. |
| 7,786,419 B2 | 8/2010 | Hyde et al. |
| 7,812,771 B2 | 10/2010 | Greene et al. |
| 7,830,312 B2 | 11/2010 | Choudhury et al. |
| 7,844,306 B2 | 11/2010 | Shearer et al. |
| 7,868,482 B2 | 1/2011 | Greene et al. |
| 7,898,105 B2 | 3/2011 | Greene et al. |
| 7,904,117 B2 | 3/2011 | Doan et al. |
| 7,911,386 B1 | 3/2011 | Ito et al. |
| 7,925,308 B2 | 4/2011 | Greene et al. |
| 7,948,208 B2 | 5/2011 | Partovi et al. |
| 8,049,676 B2 | 11/2011 | Yoon et al. |
| 8,055,003 B2 | 11/2011 | Mittleman et al. |
| 8,070,595 B2 | 12/2011 | Alderucci et al. |
| 8,072,380 B2 | 12/2011 | Crouch |
| 8,092,301 B2 | 1/2012 | Alderucci et al. |
| 8,099,140 B2 | 1/2012 | Arai |
| 8,115,448 B2 | 2/2012 | John |
| 8,159,090 B2 | 4/2012 | Greene et al. |
| 8,159,364 B2 | 4/2012 | Zeine |
| 8,180,286 B2 | 5/2012 | Yamasuge |
| 8,184,454 B2 | 5/2012 | Mao |
| 8,228,194 B2 | 7/2012 | Mickle |
| 8,234,509 B2 | 7/2012 | Gioscia et al. |
| 8,264,101 B2 | 9/2012 | Hyde et al. |
| 8,264,291 B2 | 9/2012 | Morita |
| 8,276,325 B2 | 10/2012 | Clifton et al. |
| 8,278,784 B2 | 10/2012 | Cook et al. |
| 8,284,101 B2 | 10/2012 | Fusco |
| 8,310,201 B1 | 11/2012 | Wright |
| 8,338,991 B2 | 12/2012 | Von Novak et al. |
| 8,362,745 B2 | 1/2013 | Tinaphong |
| 8,380,255 B2 | 2/2013 | Shearer et al. |
| 8,384,600 B2 | 2/2013 | Huang et al. |
| 8,410,953 B2 | 4/2013 | Zeine |
| 8,411,963 B2 | 4/2013 | Luff |
| 8,432,062 B2 | 4/2013 | Greene et al. |
| 8,432,071 B2 | 4/2013 | Huang et al. |
| 8,446,248 B2 | 5/2013 | Zeine |
| 8,447,234 B2 | 5/2013 | Cook et al. |
| 8,451,189 B1 | 5/2013 | Fluhler |
| 8,452,235 B2 | 5/2013 | Kirby et al. |
| 8,457,656 B2 | 6/2013 | Perkins et al. |
| 8,461,817 B2 | 6/2013 | Martin et al. |
| 8,467,733 B2 | 6/2013 | Leabman |
| 8,497,601 B2 | 7/2013 | Hall et al. |

(56) References Cited

U.S. PATENT DOCUMENTS

| | | |
|---|---|---|
| 8,497,658 B2 | 7/2013 | Von Novak et al. |
| 8,552,597 B2 | 8/2013 | Song et al. |
| 8,558,661 B2 | 10/2013 | Zeine |
| 8,560,026 B2 | 10/2013 | Chanterac |
| 8,564,485 B2 | 10/2013 | Milosavljevic et al. |
| 8,604,746 B2 | 12/2013 | Lee |
| 8,614,643 B2 | 12/2013 | Leabman |
| 8,621,245 B2 | 12/2013 | Shearer et al. |
| 8,626,249 B2 | 1/2014 | Kuusilinna et al. |
| 8,629,576 B2 | 1/2014 | Levine |
| 8,653,966 B2 | 2/2014 | Rao et al. |
| 8,655,272 B2 | 2/2014 | Saunamäki |
| 8,674,551 B2 | 3/2014 | Low et al. |
| 8,686,685 B2 | 4/2014 | Moshfeghi |
| 8,686,905 B2 | 4/2014 | Shtrom |
| 8,712,355 B2 | 4/2014 | Black et al. |
| 8,712,485 B2 | 4/2014 | Tam |
| 8,718,773 B2 | 5/2014 | Wills et al. |
| 8,729,737 B2 | 5/2014 | Schatz et al. |
| 8,736,228 B1 | 5/2014 | Freed et al. |
| 8,760,113 B2 | 6/2014 | Keating |
| 8,770,482 B2 | 7/2014 | Ackermann et al. |
| 8,772,960 B2 | 7/2014 | Yoshida |
| 8,823,319 B2 | 9/2014 | Von Novak, III et al. |
| 8,832,646 B1 | 9/2014 | Wendling |
| 8,854,176 B2 | 10/2014 | Zeine |
| 8,860,364 B2 | 10/2014 | Low et al. |
| 8,897,770 B1 | 11/2014 | Frolov et al. |
| 8,903,456 B2 | 12/2014 | Chu et al. |
| 8,917,057 B2 | 12/2014 | Hui |
| 8,923,189 B2 | 12/2014 | Leabman |
| 8,928,544 B2 | 1/2015 | Massie et al. |
| 8,937,408 B2 | 1/2015 | Ganem et al. |
| 8,946,940 B2 | 2/2015 | Kim et al. |
| 8,963,486 B2 | 2/2015 | Kirby et al. |
| 8,970,070 B2 | 3/2015 | Sada et al. |
| 8,989,053 B1 | 3/2015 | Skaaksrud et al. |
| 9,000,616 B2 | 4/2015 | Greene et al. |
| 9,001,622 B2 | 4/2015 | Perry |
| 9,006,934 B2 | 4/2015 | Kozakai et al. |
| 9,021,277 B2 | 4/2015 | Shearer et al. |
| 9,030,161 B2 | 5/2015 | Lu et al. |
| 9,059,598 B2 | 6/2015 | Kang et al. |
| 9,059,599 B2 | 6/2015 | Won et al. |
| 9,077,188 B2 | 7/2015 | Moshfeghi |
| 9,083,595 B2 | 7/2015 | Rakib et al. |
| 9,088,216 B2 | 7/2015 | Garrity et al. |
| 9,124,125 B2 | 9/2015 | Leabman et al. |
| 9,130,397 B2 | 9/2015 | Leabman et al. |
| 9,130,602 B2 | 9/2015 | Cook |
| 9,142,998 B2 | 9/2015 | Yu et al. |
| 9,143,000 B2 | 9/2015 | Leabman et al. |
| 9,143,010 B2 | 9/2015 | Urano |
| 9,153,074 B2 | 10/2015 | Zhou et al. |
| 9,178,389 B2 | 11/2015 | Hwang |
| 9,225,196 B2 | 12/2015 | Huang et al. |
| 9,240,469 B2 | 1/2016 | Sun et al. |
| 9,242,411 B2 | 1/2016 | Kritchman et al. |
| 9,244,500 B2 | 1/2016 | Cain et al. |
| 9,252,628 B2 | 2/2016 | Leabman et al. |
| 9,270,344 B2 | 2/2016 | Rosenberg |
| 9,276,329 B2 | 3/2016 | Jones et al. |
| 9,282,582 B1 | 3/2016 | Dunsbergen et al. |
| 9,294,840 B1 | 3/2016 | Anderson et al. |
| 9,297,896 B1 | 3/2016 | Andrews |
| 9,318,898 B2 | 4/2016 | John |
| 9,368,020 B1 | 6/2016 | Bell et al. |
| 9,401,977 B1 | 7/2016 | Gaw |
| 9,409,490 B2 | 8/2016 | Kawashima |
| 9,419,335 B2 | 8/2016 | Pintos |
| 9,419,443 B2 | 8/2016 | Leabman |
| 9,438,045 B1 | 9/2016 | Leabman |
| 9,438,046 B1 | 9/2016 | Leabman |
| 9,444,283 B2 | 9/2016 | Son et al. |
| 9,450,449 B1 | 9/2016 | Leabman et al. |
| 9,461,502 B2 | 10/2016 | Lee et al. |
| 9,520,725 B2 | 12/2016 | Masaoka et al. |
| 9,520,748 B2 | 12/2016 | Hyde et al. |
| 9,521,926 B1 | 12/2016 | Leabman et al. |
| 9,522,270 B2 | 12/2016 | Perryman et al. |
| 9,532,748 B2 | 1/2017 | Denison et al. |
| 9,537,354 B2 | 1/2017 | Bell et al. |
| 9,537,357 B2 | 1/2017 | Leabman |
| 9,537,358 B2 | 1/2017 | Leabman |
| 9,538,382 B2 | 1/2017 | Bell et al. |
| 9,544,640 B2 | 1/2017 | Lau |
| 9,559,553 B2 | 1/2017 | Bae |
| 9,564,773 B2 | 2/2017 | Pogorelik et al. |
| 9,571,974 B2 | 2/2017 | Choi et al. |
| 9,590,317 B2 | 3/2017 | Zimmerman et al. |
| 9,590,444 B2 | 3/2017 | Walley |
| 9,620,996 B2 | 4/2017 | Zeine |
| 9,647,328 B2 | 5/2017 | Dobric |
| 9,706,137 B2 | 7/2017 | Scanlon et al. |
| 9,711,999 B2 | 7/2017 | Hietala et al. |
| 9,723,635 B2 | 8/2017 | Nambord et al. |
| 9,787,103 B1 | 10/2017 | Leabman et al. |
| 9,793,758 B2 | 10/2017 | Leabman |
| 9,793,764 B2 | 10/2017 | Perry |
| 9,800,080 B2 | 10/2017 | Leabman et al. |
| 9,800,172 B1 | 10/2017 | Leabman |
| 9,806,564 B2 | 10/2017 | Leabman |
| 9,812,890 B1 | 11/2017 | Leabman et al. |
| 9,819,230 B2 | 11/2017 | Petras et al. |
| 9,824,815 B2 | 11/2017 | Leabman et al. |
| 9,825,674 B1 | 11/2017 | Leabman |
| 9,831,718 B2 | 11/2017 | Leabman et al. |
| 9,838,083 B2 | 12/2017 | Bell et al. |
| 9,843,201 B1 | 12/2017 | Leabman et al. |
| 9,843,213 B2 | 12/2017 | Leabman et al. |
| 9,843,229 B2 | 12/2017 | Leabman |
| 9,843,763 B2 | 12/2017 | Leabman et al. |
| 9,847,669 B2 | 12/2017 | Leabman |
| 9,847,677 B1 | 12/2017 | Leabman |
| 9,847,679 B2 | 12/2017 | Bell et al. |
| 9,853,361 B2 | 12/2017 | Chen et al. |
| 9,853,458 B1 | 12/2017 | Bell et al. |
| 9,853,485 B2 | 12/2017 | Contopanagos |
| 9,853,692 B1 | 12/2017 | Bell et al. |
| 9,859,756 B2 | 1/2018 | Leabman et al. |
| 9,859,757 B1 | 1/2018 | Leabman et al. |
| 9,859,758 B1 | 1/2018 | Leabman |
| 9,859,797 B1 | 1/2018 | Leabman |
| 9,866,279 B2 | 1/2018 | Bell et al. |
| 9,867,032 B2 | 1/2018 | Verma et al. |
| 9,867,062 B1 | 1/2018 | Bell et al. |
| 9,871,301 B2 | 1/2018 | Contopanagos |
| 9,871,387 B1 | 1/2018 | Bell et al. |
| 9,871,398 B1 | 1/2018 | Leabman |
| 9,876,379 B1 | 1/2018 | Leabman et al. |
| 9,876,380 B1 | 1/2018 | Leabman et al. |
| 9,876,394 B1 | 1/2018 | Leabman |
| 9,876,536 B1 | 1/2018 | Bell et al. |
| 9,876,648 B2 | 1/2018 | Bell |
| 9,882,394 B1 | 1/2018 | Bell et al. |
| 9,882,395 B1 | 1/2018 | Leabman et al. |
| 9,882,427 B2 | 1/2018 | Leabman et al. |
| 9,882,430 B1 | 1/2018 | Leabman et al. |
| 9,887,584 B1 | 2/2018 | Bell et al. |
| 9,887,739 B2 | 2/2018 | Leabman et al. |
| 9,891,669 B2 | 2/2018 | Bell |
| 9,893,535 B2 | 2/2018 | Leabman |
| 9,893,538 B1 | 2/2018 | Bell et al. |
| 9,893,554 B2 | 2/2018 | Bell et al. |
| 9,893,555 B1 | 2/2018 | Leabman et al. |
| 9,893,564 B2 | 2/2018 | de Rochemont |
| 9,899,744 B1 | 2/2018 | Contopanagos et al. |
| 9,899,844 B1 | 2/2018 | Bell et al. |
| 9,899,861 B1 | 2/2018 | Leabman et al. |
| 9,912,199 B2 | 3/2018 | Leabman et al. |
| 9,916,485 B1 | 3/2018 | Lilly et al. |
| 9,917,477 B1 | 3/2018 | Bell et al. |
| 9,923,386 B1 | 3/2018 | Leabman et al. |
| 9,939,864 B1 | 4/2018 | Bell et al. |

(56) References Cited

U.S. PATENT DOCUMENTS

| | | |
|---|---|---|
| 9,965,009 B1 | 5/2018 | Bell et al. |
| 9,966,765 B1 | 5/2018 | Leabman |
| 9,966,784 B2 | 5/2018 | Leabman |
| 9,967,743 B1 | 5/2018 | Bell et al. |
| 9,973,008 B1 | 5/2018 | Leabman |
| 10,003,211 B1 | 6/2018 | Leabman et al. |
| 10,008,777 B1 | 6/2018 | Broyde et al. |
| 10,014,728 B1 | 7/2018 | Leabman |
| 10,027,159 B2 | 7/2018 | Hosseini |
| 10,038,337 B1 | 7/2018 | Leabman et al. |
| 10,050,462 B1 | 8/2018 | Leabman et al. |
| 10,056,782 B1 | 8/2018 | Leabman |
| 10,063,064 B1 | 8/2018 | Bell et al. |
| 10,068,703 B1 | 9/2018 | Contopanagos |
| 10,075,008 B1 | 9/2018 | Bell et al. |
| 10,090,699 B1 | 10/2018 | Leabman |
| 10,090,714 B2 | 10/2018 | Bohn et al. |
| 10,090,886 B1 | 10/2018 | Bell et al. |
| 10,103,552 B1 | 10/2018 | Leabman et al. |
| 10,103,582 B2 | 10/2018 | Leabman et al. |
| 10,110,046 B1 | 10/2018 | Esquibel et al. |
| 10,122,219 B1 | 11/2018 | Hosseini et al. |
| 10,124,754 B1 | 11/2018 | Leabman |
| 10,128,686 B1 | 11/2018 | Leabman et al. |
| 10,134,260 B1 | 11/2018 | Bell et al. |
| 10,135,112 B1 | 11/2018 | Hosseini |
| 10,135,294 B1 | 11/2018 | Leabman |
| 10,141,771 B1 | 11/2018 | Hosseini et al. |
| 10,148,097 B1 | 12/2018 | Leabman et al. |
| 10,153,645 B1 | 12/2018 | Bell et al. |
| 10,153,653 B1 | 12/2018 | Bell et al. |
| 10,153,660 B1 | 12/2018 | Leabman et al. |
| 10,158,257 B2 | 12/2018 | Leabman |
| 10,158,259 B1 | 12/2018 | Leabman |
| 10,164,478 B2 | 12/2018 | Leabman |
| 10,170,917 B1 | 1/2019 | Bell et al. |
| 10,177,594 B2 | 1/2019 | Contopanagos |
| 10,181,756 B2 | 1/2019 | Bae et al. |
| 10,186,892 B2 | 1/2019 | Hosseini et al. |
| 10,186,893 B2 | 1/2019 | Bell et al. |
| 10,186,911 B2 | 1/2019 | Leabman |
| 10,186,913 B2 | 1/2019 | Leabman et al. |
| 10,193,396 B1 | 1/2019 | Bell et al. |
| 10,199,835 B2 | 2/2019 | Bell |
| 10,199,849 B1 | 2/2019 | Bell |
| 10,199,850 B2 | 2/2019 | Leabman |
| 10,205,239 B1 | 2/2019 | Contopanagos et al. |
| 10,206,185 B2 | 2/2019 | Leabman et al. |
| 10,211,674 B1 | 2/2019 | Leabman et al. |
| 10,211,680 B2 | 2/2019 | Leabman et al. |
| 10,211,682 B2 | 2/2019 | Bell et al. |
| 10,211,685 B2 | 2/2019 | Bell et al. |
| 10,218,207 B2 | 2/2019 | Hosseini et al. |
| 10,218,227 B2 | 2/2019 | Leabman et al. |
| 10,223,717 B1 | 3/2019 | Bell |
| 10,224,758 B2 | 3/2019 | Leabman et al. |
| 10,224,982 B1 * | 3/2019 | Leabman ............... H02J 50/20 |
| 10,230,266 B1 | 3/2019 | Leabman et al. |
| 10,243,414 B1 | 3/2019 | Leabman et al. |
| 10,256,657 B2 | 4/2019 | Hosseini et al. |
| 10,256,677 B2 | 4/2019 | Hosseini et al. |
| 10,263,432 B1 * | 4/2019 | Leabman ............... H02J 50/402 |
| 10,263,476 B2 | 4/2019 | Leabman |
| 10,277,054 B2 | 4/2019 | Hosseini |
| 10,291,055 B1 | 5/2019 | Bell et al. |
| 10,291,066 B1 | 5/2019 | Leabman |
| 10,291,294 B2 | 5/2019 | Leabman |
| 10,298,024 B2 | 5/2019 | Leabman |
| 10,298,133 B2 | 5/2019 | Leabman |
| 10,305,315 B2 | 5/2019 | Leabman et al. |
| 10,312,715 B2 | 6/2019 | Leabman |
| 10,320,446 B2 | 6/2019 | Hosseini |
| 10,333,332 B1 | 6/2019 | Hosseini |
| 10,355,534 B2 | 7/2019 | Johnston et al. |
| 10,381,880 B2 | 8/2019 | Leabman et al. |
| 10,389,161 B2 | 8/2019 | Hosseini et al. |
| 10,396,588 B2 | 8/2019 | Leabman |
| 10,396,604 B2 | 8/2019 | Bell et al. |
| 10,439,442 B2 | 10/2019 | Hosseini et al. |
| 10,447,093 B2 | 10/2019 | Hosseini |
| 10,476,312 B2 | 11/2019 | Johnston et al. |
| 10,483,768 B2 | 11/2019 | Bell et al. |
| 10,490,346 B2 | 11/2019 | Contopanagos |
| 10,491,029 B2 | 11/2019 | Hosseini |
| 10,498,144 B2 | 12/2019 | Leabman et al. |
| 10,511,097 B2 | 12/2019 | Komaros et al. |
| 10,511,196 B2 | 12/2019 | Hosseini |
| 10,516,289 B2 | 12/2019 | Leabman et al. |
| 10,516,301 B2 | 12/2019 | Leabman |
| 10,523,033 B2 | 12/2019 | Leabman |
| 10,523,058 B2 | 12/2019 | Leabman |
| 10,554,052 B2 | 2/2020 | Bell et al. |
| 10,594,165 B2 | 3/2020 | Hosseini |
| 10,615,647 B2 | 4/2020 | Johnston et al. |
| 10,680,319 B2 | 6/2020 | Hosseini et al. |
| 10,714,984 B2 | 7/2020 | Hosseini et al. |
| 10,734,717 B2 | 8/2020 | Hosseini |
| 10,778,041 B2 | 9/2020 | Leabman |
| 10,965,164 B2 * | 3/2021 | Leabman ............... H02J 50/20 |
| 10,985,617 B1 | 4/2021 | Johnston et al. |
| 2001/0027876 A1 | 10/2001 | Tsukamoto et al. |
| 2002/0001307 A1 | 1/2002 | Nguyen et al. |
| 2002/0024471 A1 | 2/2002 | Ishitobi |
| 2002/0028655 A1 | 3/2002 | Rosener et al. |
| 2002/0034958 A1 | 3/2002 | Oberschmidt et al. |
| 2002/0054330 A1 | 5/2002 | Jinbo et al. |
| 2002/0065052 A1 | 5/2002 | Pande et al. |
| 2002/0072784 A1 | 6/2002 | Sheppard et al. |
| 2002/0095980 A1 | 7/2002 | Breed et al. |
| 2002/0103447 A1 | 8/2002 | Terry |
| 2002/0123776 A1 | 9/2002 | Von Arx |
| 2002/0133592 A1 | 9/2002 | Matsuda |
| 2002/0171594 A1 | 11/2002 | Fang |
| 2002/0172223 A1 | 11/2002 | Stilp |
| 2003/0005759 A1 | 1/2003 | Breed et al. |
| 2003/0038750 A1 | 2/2003 | Chen |
| 2003/0058187 A1 | 3/2003 | Billiet et al. |
| 2003/0076274 A1 | 4/2003 | Phelan et al. |
| 2003/0179152 A1 | 9/2003 | Watada et al. |
| 2003/0179573 A1 | 9/2003 | Chun |
| 2003/0192053 A1 | 10/2003 | Sheppard et al. |
| 2004/0019624 A1 | 1/2004 | Sukegawa |
| 2004/0020100 A1 | 2/2004 | O'Brian et al. |
| 2004/0036657 A1 | 2/2004 | Forster et al. |
| 2004/0066251 A1 | 4/2004 | Eleftheriades et al. |
| 2004/0107641 A1 | 6/2004 | Walton et al. |
| 2004/0113543 A1 | 6/2004 | Daniels |
| 2004/0119675 A1 | 6/2004 | Washio et al. |
| 2004/0130425 A1 | 7/2004 | Dayan et al. |
| 2004/0130442 A1 | 7/2004 | Breed |
| 2004/0142733 A1 | 7/2004 | Parise |
| 2004/0145342 A1 | 7/2004 | Lyon |
| 2004/0155832 A1 | 8/2004 | Yuanzhu |
| 2004/0196190 A1 | 10/2004 | Mendolia et al. |
| 2004/0203979 A1 | 10/2004 | Attar et al. |
| 2004/0207559 A1 | 10/2004 | Milosavljevic |
| 2004/0218759 A1 | 11/2004 | Yacobi |
| 2004/0241402 A1 | 12/2004 | Kawate |
| 2004/0259604 A1 | 12/2004 | Mickle et al. |
| 2004/0263124 A1 | 12/2004 | Wieck et al. |
| 2005/0007276 A1 | 1/2005 | Barrick et al. |
| 2005/0030118 A1 | 2/2005 | Wang |
| 2005/0046584 A1 | 3/2005 | Breed |
| 2005/0055316 A1 | 3/2005 | Williams |
| 2005/0077872 A1 | 4/2005 | Single |
| 2005/0093766 A1 | 5/2005 | Turner |
| 2005/0116683 A1 | 6/2005 | Cheng |
| 2005/0117660 A1 | 6/2005 | Vialle et al. |
| 2005/0134517 A1 | 6/2005 | Gotti |
| 2005/0171411 A1 | 8/2005 | KenKnight |
| 2005/0198673 A1 | 9/2005 | Kit et al. |
| 2005/0227619 A1 | 10/2005 | Lee et al. |
| 2005/0232469 A1 | 10/2005 | Schofield |
| 2005/0237249 A1 | 10/2005 | Nagel |

(56) References Cited

U.S. PATENT DOCUMENTS

| | | |
|---|---|---|
| 2005/0237258 A1 | 10/2005 | Abramov et al. |
| 2005/0282591 A1 | 12/2005 | Shaff |
| 2006/0013335 A1 | 1/2006 | Leabman |
| 2006/0019712 A1 | 1/2006 | Choi |
| 2006/0030279 A1 | 2/2006 | Leabman et al. |
| 2006/0033674 A1 | 2/2006 | Essig, Jr. et al. |
| 2006/0056855 A1 | 3/2006 | Nakagawa et al. |
| 2006/0071308 A1 | 4/2006 | Tang et al. |
| 2006/0092079 A1 | 5/2006 | de Rochemont |
| 2006/0094425 A1 | 5/2006 | Mickle et al. |
| 2006/0113955 A1 | 6/2006 | Nunally |
| 2006/0119532 A1 | 6/2006 | Yun et al. |
| 2006/0136004 A1 | 6/2006 | Cowan et al. |
| 2006/0160517 A1 | 7/2006 | Yoon |
| 2006/0183473 A1 | 8/2006 | Ukon |
| 2006/0190063 A1 | 8/2006 | Kanzius |
| 2006/0192913 A1 | 8/2006 | Shutou et al. |
| 2006/0199620 A1 | 9/2006 | Greene et al. |
| 2006/0238365 A1 | 10/2006 | Vecchione et al. |
| 2006/0266564 A1 | 11/2006 | Perlman et al. |
| 2006/0266917 A1 | 11/2006 | Baldis et al. |
| 2006/0278706 A1 | 12/2006 | Hatakayama et al. |
| 2006/0284593 A1 | 12/2006 | Nagy et al. |
| 2006/0287094 A1 | 12/2006 | Mahaffey et al. |
| 2007/0007821 A1 | 1/2007 | Rossetti |
| 2007/0019693 A1 | 1/2007 | Graham |
| 2007/0021140 A1 | 1/2007 | Keyes |
| 2007/0060185 A1 | 3/2007 | Simon et al. |
| 2007/0070490 A1 | 3/2007 | Tsunoda et al. |
| 2007/0090997 A1 | 4/2007 | Brown et al. |
| 2007/0093269 A1 | 4/2007 | Leabman et al. |
| 2007/0097653 A1 | 5/2007 | Gilliland et al. |
| 2007/0103110 A1 | 5/2007 | Sagoo |
| 2007/0106894 A1 | 5/2007 | Zhang |
| 2007/0109121 A1 | 5/2007 | Cohen |
| 2007/0139000 A1 | 6/2007 | Kozuma |
| 2007/0149162 A1 | 6/2007 | Greene et al. |
| 2007/0164868 A1 | 7/2007 | Deavours et al. |
| 2007/0173196 A1 | 7/2007 | Gallic |
| 2007/0173214 A1 | 7/2007 | Mickle et al. |
| 2007/0178857 A1 | 8/2007 | Greene et al. |
| 2007/0178945 A1 | 8/2007 | Cook et al. |
| 2007/0182367 A1 | 8/2007 | Partovi |
| 2007/0191074 A1 | 8/2007 | Harrist et al. |
| 2007/0191075 A1 | 8/2007 | Greene et al. |
| 2007/0197281 A1 | 8/2007 | Stronach |
| 2007/0210960 A1 | 9/2007 | Rofougaran et al. |
| 2007/0222681 A1 | 9/2007 | Greene et al. |
| 2007/0228833 A1 | 10/2007 | Stevens et al. |
| 2007/0229261 A1 | 10/2007 | Zimmerman et al. |
| 2007/0240297 A1 | 10/2007 | Yang et al. |
| 2007/0257634 A1 | 11/2007 | Leschin et al. |
| 2007/0273486 A1 | 11/2007 | Shiotsu |
| 2007/0291165 A1 | 12/2007 | Wang |
| 2007/0296639 A1 | 12/2007 | Hook et al. |
| 2007/0298846 A1 | 12/2007 | Greene et al. |
| 2008/0014897 A1 | 1/2008 | Cook et al. |
| 2008/0024376 A1 | 1/2008 | Norris et al. |
| 2008/0048917 A1 | 2/2008 | Achour et al. |
| 2008/0062062 A1 | 3/2008 | Borau et al. |
| 2008/0062255 A1 | 3/2008 | Gal |
| 2008/0067874 A1 | 3/2008 | Tseng |
| 2008/0074324 A1 | 3/2008 | Puzella et al. |
| 2008/0089277 A1 | 4/2008 | Alexander et al. |
| 2008/0110263 A1 | 5/2008 | Klessel et al. |
| 2008/0113816 A1 | 5/2008 | Mahaffey et al. |
| 2008/0122297 A1 | 5/2008 | Arai |
| 2008/0123383 A1 | 5/2008 | Shionoiri |
| 2008/0129536 A1 | 6/2008 | Randall et al. |
| 2008/0140278 A1 | 6/2008 | Breed |
| 2008/0169910 A1 | 7/2008 | Greene et al. |
| 2008/0197802 A1 | 8/2008 | Onishi |
| 2008/0204342 A1 | 8/2008 | Kharadly |
| 2008/0204350 A1 | 8/2008 | Tam et al. |
| 2008/0210762 A1 | 9/2008 | Osada et al. |
| 2008/0211458 A1 | 9/2008 | Lawther et al. |
| 2008/0233890 A1 | 9/2008 | Baker |
| 2008/0248758 A1 | 10/2008 | Schedelbeck et al. |
| 2008/0248846 A1 | 10/2008 | Stronach et al. |
| 2008/0258993 A1 | 10/2008 | Gummalla et al. |
| 2008/0266191 A1 | 10/2008 | Hilgers |
| 2008/0278378 A1 | 11/2008 | Chang et al. |
| 2008/0309452 A1 | 12/2008 | Zeine |
| 2009/0002493 A1 | 1/2009 | Kates |
| 2009/0010316 A1 | 1/2009 | Rofougaran et al. |
| 2009/0019183 A1 | 1/2009 | Wu et al. |
| 2009/0036065 A1 | 2/2009 | Siu |
| 2009/0039828 A1 | 2/2009 | Jakubowski |
| 2009/0047998 A1 | 2/2009 | Alberth, Jr. |
| 2009/0058354 A1 | 3/2009 | Harrison |
| 2009/0058361 A1 | 3/2009 | John |
| 2009/0058731 A1 | 3/2009 | Geary et al. |
| 2009/0060012 A1 | 3/2009 | Gresset et al. |
| 2009/0067198 A1 | 3/2009 | Graham et al. |
| 2009/0067208 A1 | 3/2009 | Martin et al. |
| 2009/0073066 A1 | 3/2009 | Jordon et al. |
| 2009/0096412 A1 | 4/2009 | Huang |
| 2009/0096413 A1 | 4/2009 | Partovi |
| 2009/0102292 A1 | 4/2009 | Cook et al. |
| 2009/0102296 A1 | 4/2009 | Greene et al. |
| 2009/0108679 A1 | 4/2009 | Porwal |
| 2009/0122847 A1 | 5/2009 | Nysen et al. |
| 2009/0128262 A1 | 5/2009 | Lee et al. |
| 2009/0157911 A1 | 6/2009 | Aihara |
| 2009/0174604 A1 | 7/2009 | Keskitalo |
| 2009/0180653 A1 | 7/2009 | Sjursen et al. |
| 2009/0200985 A1 | 8/2009 | Zane et al. |
| 2009/0206791 A1 | 8/2009 | Jung |
| 2009/0207090 A1 | 8/2009 | Pettus et al. |
| 2009/0207092 A1 | 8/2009 | Nysen et al. |
| 2009/0218884 A1 | 9/2009 | Soar |
| 2009/0218891 A1 | 9/2009 | McCollough |
| 2009/0219903 A1 | 9/2009 | Alamouti et al. |
| 2009/0243397 A1 | 10/2009 | Cook et al. |
| 2009/0256752 A1 | 10/2009 | Akkermans et al. |
| 2009/0264069 A1 | 10/2009 | Yamasuge |
| 2009/0271048 A1 | 10/2009 | Wakamatsu |
| 2009/0280866 A1 | 11/2009 | Lo et al. |
| 2009/0281678 A1 | 11/2009 | Wakamatsu |
| 2009/0284082 A1 | 11/2009 | Mohammadian |
| 2009/0284083 A1 | 11/2009 | Karalis et al. |
| 2009/0284220 A1 | 11/2009 | Toncich et al. |
| 2009/0284227 A1 | 11/2009 | Mohammadian et al. |
| 2009/0284325 A1 | 11/2009 | Rossiter et al. |
| 2009/0286475 A1 | 11/2009 | Toncich et al. |
| 2009/0286476 A1 | 11/2009 | Toncich et al. |
| 2009/0291634 A1 | 11/2009 | Saarisalo |
| 2009/0299175 A1 | 12/2009 | Bernstein et al. |
| 2009/0308936 A1 | 12/2009 | Nitzan et al. |
| 2009/0312046 A1 | 12/2009 | Clevenger et al. |
| 2009/0315412 A1 | 12/2009 | Yamamoto et al. |
| 2009/0322281 A1 | 12/2009 | Kamijo et al. |
| 2010/0001683 A1 | 1/2010 | Huang et al. |
| 2010/0007307 A1 | 1/2010 | Baarman et al. |
| 2010/0007569 A1 | 1/2010 | Sim et al. |
| 2010/0019686 A1 | 1/2010 | Gutierrez, Jr. |
| 2010/0019908 A1 | 1/2010 | Cho et al. |
| 2010/0026605 A1 | 2/2010 | Yang et al. |
| 2010/0027379 A1 | 2/2010 | Saulnier et al. |
| 2010/0029383 A1 | 2/2010 | Dai |
| 2010/0033021 A1 | 2/2010 | Bennett |
| 2010/0033390 A1 | 2/2010 | Alamouti et al. |
| 2010/0034238 A1 | 2/2010 | Bennett |
| 2010/0041453 A1 | 2/2010 | Grimm, Jr. |
| 2010/0044123 A1 | 2/2010 | Perlman et al. |
| 2010/0054200 A1 | 3/2010 | Tsai |
| 2010/0060534 A1 | 3/2010 | Oodachi |
| 2010/0066631 A1 | 3/2010 | Puzella et al. |
| 2010/0075607 A1 | 3/2010 | Hosoya |
| 2010/0079005 A1 | 4/2010 | Hyde et al. |
| 2010/0079011 A1 | 4/2010 | Hyde et al. |
| 2010/0082193 A1 | 4/2010 | Chiappetta |
| 2010/0087227 A1 | 4/2010 | Francos et al. |
| 2010/0090524 A1 | 4/2010 | Obayashi |

(56) References Cited

U.S. PATENT DOCUMENTS

| | | |
|---|---|---|
| 2010/0090656 A1 | 4/2010 | Shearer et al. |
| 2010/0109443 A1 | 5/2010 | Cook et al. |
| 2010/0117596 A1 | 5/2010 | Cook et al. |
| 2010/0117926 A1 | 5/2010 | DeJean, II |
| 2010/0119234 A1 | 5/2010 | Suematsu et al. |
| 2010/0123618 A1 | 5/2010 | Martin et al. |
| 2010/0123624 A1 | 5/2010 | Minear et al. |
| 2010/0124040 A1 | 5/2010 | Diebel et al. |
| 2010/0127660 A1 | 5/2010 | Cook et al. |
| 2010/0142418 A1 | 6/2010 | Nishioka et al. |
| 2010/0142509 A1 | 6/2010 | Zhu et al. |
| 2010/0148723 A1 | 6/2010 | Cook et al. |
| 2010/0151808 A1 | 6/2010 | Toncich et al. |
| 2010/0156721 A1 | 6/2010 | Alamouti et al. |
| 2010/0156741 A1 | 6/2010 | Vazquez et al. |
| 2010/0164296 A1 | 7/2010 | Kurs et al. |
| 2010/0164433 A1 | 7/2010 | Janefalker et al. |
| 2010/0167664 A1 | 7/2010 | Szini |
| 2010/0171461 A1 | 7/2010 | Baarman et al. |
| 2010/0171676 A1 | 7/2010 | Tani et al. |
| 2010/0174629 A1 | 7/2010 | Taylor et al. |
| 2010/0176934 A1 | 7/2010 | Chou et al. |
| 2010/0181961 A1 | 7/2010 | Novak et al. |
| 2010/0181964 A1 | 7/2010 | Huggins et al. |
| 2010/0194206 A1 | 8/2010 | Burdo et al. |
| 2010/0201189 A1 | 8/2010 | Kirby et al. |
| 2010/0201201 A1 | 8/2010 | Mobarhan et al. |
| 2010/0201314 A1 | 8/2010 | Toncich et al. |
| 2010/0207572 A1 | 8/2010 | Kirby et al. |
| 2010/0210233 A1 | 8/2010 | Cook et al. |
| 2010/0213895 A1 | 8/2010 | Keating et al. |
| 2010/0214177 A1 | 8/2010 | Parsche |
| 2010/0222010 A1 | 9/2010 | Ozaki et al. |
| 2010/0225270 A1 | 9/2010 | Jacobs et al. |
| 2010/0227570 A1 | 9/2010 | Hendin |
| 2010/0231470 A1 | 9/2010 | Lee et al. |
| 2010/0237709 A1 | 9/2010 | Hall et al. |
| 2010/0244576 A1 | 9/2010 | Hillan et al. |
| 2010/0253281 A1 | 10/2010 | Li |
| 2010/0256831 A1 | 10/2010 | Abramo et al. |
| 2010/0259110 A1 | 10/2010 | Kurs et al. |
| 2010/0259447 A1 | 10/2010 | Crouch |
| 2010/0264747 A1 | 10/2010 | Hall et al. |
| 2010/0277003 A1 | 11/2010 | Von Novak et al. |
| 2010/0277121 A1 | 11/2010 | Hall et al. |
| 2010/0279606 A1 | 11/2010 | Hillan et al. |
| 2010/0289341 A1 | 11/2010 | Ozaki et al. |
| 2010/0295372 A1 | 11/2010 | Hyde et al. |
| 2010/0308767 A1 | 12/2010 | Rofougaran et al. |
| 2010/0309079 A1 | 12/2010 | Rofougaran et al. |
| 2010/0309088 A1 | 12/2010 | Hyvonen et al. |
| 2010/0315045 A1 | 12/2010 | Zeine |
| 2010/0316163 A1 | 12/2010 | Forenza et al. |
| 2010/0327766 A1 | 12/2010 | Recker et al. |
| 2010/0328044 A1 | 12/2010 | Waffenschmidt et al. |
| 2010/0332401 A1 | 12/2010 | Prahlad et al. |
| 2011/0009057 A1 | 1/2011 | Saunamaki |
| 2011/0013198 A1 | 1/2011 | Shirley |
| 2011/0018360 A1 | 1/2011 | Baarman et al. |
| 2011/0028114 A1 | 2/2011 | Kerselaers |
| 2011/0031928 A1 | 2/2011 | Soar |
| 2011/0032149 A1 | 2/2011 | Leabman |
| 2011/0032866 A1 | 2/2011 | Leabman |
| 2011/0034190 A1 | 2/2011 | Leabman |
| 2011/0034191 A1 | 2/2011 | Leabman |
| 2011/0043047 A1 | 2/2011 | Karalis et al. |
| 2011/0043163 A1 | 2/2011 | Baarman et al. |
| 2011/0043327 A1 | 2/2011 | Baarman et al. |
| 2011/0050166 A1 | 3/2011 | Cook et al. |
| 2011/0055037 A1 | 3/2011 | Hayashigawa et al. |
| 2011/0056215 A1 | 3/2011 | Ham |
| 2011/0057607 A1 | 3/2011 | Carobolante |
| 2011/0057853 A1 | 3/2011 | Kim et al. |
| 2011/0062788 A1 | 3/2011 | Chen et al. |
| 2011/0074342 A1 | 3/2011 | MacLaughlin |
| 2011/0074349 A1 | 3/2011 | Ghovanloo |
| 2011/0074620 A1 | 3/2011 | Wintermantel |
| 2011/0078092 A1 | 3/2011 | Kim et al. |
| 2011/0090126 A1 | 4/2011 | Szini et al. |
| 2011/0109167 A1 | 5/2011 | Park et al. |
| 2011/0114401 A1 | 5/2011 | Kanno |
| 2011/0115303 A1 | 5/2011 | Baarman et al. |
| 2011/0115432 A1 | 5/2011 | El-Maleh |
| 2011/0115605 A1 | 5/2011 | Dimig et al. |
| 2011/0121660 A1 | 5/2011 | Azancot et al. |
| 2011/0122018 A1 | 5/2011 | Tarng et al. |
| 2011/0122026 A1 | 5/2011 | DeLaquil et al. |
| 2011/0127845 A1 | 6/2011 | Walley et al. |
| 2011/0127952 A1 | 6/2011 | Walley et al. |
| 2011/0133655 A1 | 6/2011 | Recker et al. |
| 2011/0133691 A1 | 6/2011 | Hautanen |
| 2011/0148578 A1 | 6/2011 | Aloi et al. |
| 2011/0148595 A1 | 6/2011 | Miller et al. |
| 2011/0151789 A1 | 6/2011 | Viglione et al. |
| 2011/0154429 A1 | 6/2011 | Stantchev |
| 2011/0156493 A1 | 6/2011 | Bennett |
| 2011/0156494 A1 | 6/2011 | Mashinsky |
| 2011/0156640 A1 | 6/2011 | Moshfeghi |
| 2011/0163128 A1 | 7/2011 | Taguchi et al. |
| 2011/0175455 A1 | 7/2011 | Hashiguchi |
| 2011/0175461 A1 | 7/2011 | Tinaphong |
| 2011/0181120 A1 | 7/2011 | Liu et al. |
| 2011/0182245 A1 | 7/2011 | Malkamaki et al. |
| 2011/0184842 A1 | 7/2011 | Melen |
| 2011/0188207 A1 | 8/2011 | Won et al. |
| 2011/0193688 A1 | 8/2011 | Forsell |
| 2011/0194543 A1 | 8/2011 | Zhao et al. |
| 2011/0195722 A1 | 8/2011 | Walter et al. |
| 2011/0199046 A1 | 8/2011 | Tsai et al. |
| 2011/0215086 A1 | 9/2011 | Yeh |
| 2011/0217923 A1 | 9/2011 | Ma |
| 2011/0220634 A1 | 9/2011 | Yeh |
| 2011/0221389 A1 | 9/2011 | Won et al. |
| 2011/0222272 A1 | 9/2011 | Yeh |
| 2011/0227725 A1 | 9/2011 | Muirhead |
| 2011/0243040 A1 | 10/2011 | Khan et al. |
| 2011/0243050 A1 | 10/2011 | Yanover |
| 2011/0244913 A1 | 10/2011 | Kim et al. |
| 2011/0248573 A1 | 10/2011 | Kanno et al. |
| 2011/0248575 A1 | 10/2011 | Kim et al. |
| 2011/0249678 A1 | 10/2011 | Bonicatto |
| 2011/0254377 A1 | 10/2011 | Widmer et al. |
| 2011/0254503 A1 | 10/2011 | Widmer et al. |
| 2011/0259953 A1 | 10/2011 | Baarman et al. |
| 2011/0273977 A1 | 11/2011 | Shapira et al. |
| 2011/0278941 A1 | 11/2011 | Krishna et al. |
| 2011/0279226 A1 | 11/2011 | Chen et al. |
| 2011/0281535 A1 | 11/2011 | Low et al. |
| 2011/0282415 A1 | 11/2011 | Eckhoff et al. |
| 2011/0285213 A1 | 11/2011 | Kowalewski |
| 2011/0286374 A1 | 11/2011 | Shin et al. |
| 2011/0291489 A1 | 12/2011 | Tsai et al. |
| 2011/0302078 A1 | 12/2011 | Failing |
| 2011/0304216 A1 | 12/2011 | Baarman |
| 2011/0304437 A1 | 12/2011 | Beeler |
| 2011/0304521 A1 | 12/2011 | Ando et al. |
| 2012/0007441 A1 | 1/2012 | John |
| 2012/0013196 A1 | 1/2012 | Kim et al. |
| 2012/0013198 A1 | 1/2012 | Uramoto et al. |
| 2012/0013296 A1 | 1/2012 | Heydari et al. |
| 2012/0019419 A1 | 1/2012 | Prat et al. |
| 2012/0025622 A1 | 2/2012 | Kim et al. |
| 2012/0043887 A1 | 2/2012 | Mesibov |
| 2012/0051109 A1 | 3/2012 | Kim et al. |
| 2012/0051294 A1 | 3/2012 | Guillouard |
| 2012/0056486 A1 | 3/2012 | Endo et al. |
| 2012/0056741 A1 | 3/2012 | Zhu et al. |
| 2012/0068906 A1 | 3/2012 | Asher et al. |
| 2012/0074891 A1 | 3/2012 | Anderson et al. |
| 2012/0075072 A1 | 3/2012 | Pappu |
| 2012/0080944 A1 | 4/2012 | Recker et al. |
| 2012/0080957 A1 | 4/2012 | Cooper et al. |
| 2012/0086284 A1 | 4/2012 | Capanella et al. |
| 2012/0086615 A1 | 4/2012 | Norair |

(56) References Cited

U.S. PATENT DOCUMENTS

| | | |
|---|---|---|
| 2012/0095617 A1 | 4/2012 | Martin et al. |
| 2012/0098350 A1 | 4/2012 | Campanella et al. |
| 2012/0098485 A1 | 4/2012 | Kang et al. |
| 2012/0099675 A1 | 4/2012 | Kitamura et al. |
| 2012/0103562 A1 | 5/2012 | Clayton |
| 2012/0104849 A1 | 5/2012 | Jackson |
| 2012/0105252 A1 | 5/2012 | Wang |
| 2012/0112532 A1 | 5/2012 | Kesler et al. |
| 2012/0119914 A1 | 5/2012 | Uchida |
| 2012/0126743 A1 | 5/2012 | Rivers, Jr. |
| 2012/0132647 A1 | 5/2012 | Beverly et al. |
| 2012/0133214 A1 | 5/2012 | Yun et al. |
| 2012/0142291 A1 | 6/2012 | Rath et al. |
| 2012/0146426 A1 | 6/2012 | Sabo |
| 2012/0146576 A1 | 6/2012 | Partovi |
| 2012/0146577 A1 | 6/2012 | Tanabe |
| 2012/0147802 A1 | 6/2012 | Ukita et al. |
| 2012/0149307 A1 | 6/2012 | Terada et al. |
| 2012/0150670 A1 | 6/2012 | Taylor et al. |
| 2012/0153894 A1 | 6/2012 | Widmer et al. |
| 2012/0157019 A1 | 6/2012 | Li |
| 2012/0161531 A1 | 6/2012 | Kim et al. |
| 2012/0161544 A1 | 6/2012 | Kashiwagi et al. |
| 2012/0169276 A1 | 7/2012 | Wang |
| 2012/0169278 A1 | 7/2012 | Choi |
| 2012/0173418 A1 | 7/2012 | Beardsmore et al. |
| 2012/0179004 A1 | 7/2012 | Roesicke et al. |
| 2012/0181973 A1 | 7/2012 | Lyden |
| 2012/0182427 A1 | 7/2012 | Marshall |
| 2012/0188142 A1 | 7/2012 | Shashi et al. |
| 2012/0187851 A1 | 8/2012 | Huggins et al. |
| 2012/0193999 A1 | 8/2012 | Zeine |
| 2012/0200399 A1 | 8/2012 | Chae |
| 2012/0201153 A1 | 8/2012 | Bharadia et al. |
| 2012/0201173 A1 | 8/2012 | Jian et al. |
| 2012/0206299 A1 | 8/2012 | Valdes-Garcia |
| 2012/0211214 A1 | 8/2012 | Phan |
| 2012/0212071 A1 | 8/2012 | Miyabayashi et al. |
| 2012/0212072 A1 | 8/2012 | Miyabayashi et al. |
| 2012/0214462 A1 | 8/2012 | Chu et al. |
| 2012/0214536 A1 | 8/2012 | Kim et al. |
| 2012/0228392 A1 | 9/2012 | Cameron et al. |
| 2012/0228956 A1 | 9/2012 | Kamata |
| 2012/0231856 A1 | 9/2012 | Lee et al. |
| 2012/0235636 A1 | 9/2012 | Partovi |
| 2012/0242283 A1 | 9/2012 | Kim et al. |
| 2012/0248886 A1 | 10/2012 | Kesler et al. |
| 2012/0248888 A1 | 10/2012 | Kesler et al. |
| 2012/0248891 A1 | 10/2012 | Drennen |
| 2012/0249051 A1 | 10/2012 | Son et al. |
| 2012/0262002 A1 | 10/2012 | Widmer et al. |
| 2012/0265272 A1 | 10/2012 | Judkins |
| 2012/0267900 A1 | 10/2012 | Huffman et al. |
| 2012/0268238 A1 | 10/2012 | Park et al. |
| 2012/0270592 A1 | 10/2012 | Ngai |
| 2012/0274154 A1 | 11/2012 | DeLuca |
| 2012/0280650 A1 | 11/2012 | Kim et al. |
| 2012/0286582 A1 | 11/2012 | Kim et al. |
| 2012/0292993 A1 | 11/2012 | Mettler et al. |
| 2012/0293021 A1 | 11/2012 | Teggatz et al. |
| 2012/0293119 A1 | 11/2012 | Park et al. |
| 2012/0299389 A1 | 11/2012 | Lee et al. |
| 2012/0299540 A1 | 11/2012 | Perry |
| 2012/0299541 A1 | 11/2012 | Perry |
| 2012/0299542 A1 | 11/2012 | Perry |
| 2012/0300588 A1 | 11/2012 | Perry |
| 2012/0300592 A1 | 11/2012 | Perry |
| 2012/0300593 A1 | 11/2012 | Perry |
| 2012/0306284 A1 | 12/2012 | Lee et al. |
| 2012/0306433 A1 | 12/2012 | Kim et al. |
| 2012/0306572 A1 | 12/2012 | Hietala et al. |
| 2012/0306705 A1 | 12/2012 | Sakurai et al. |
| 2012/0306707 A1 | 12/2012 | Yang et al. |
| 2012/0306720 A1 | 12/2012 | Tanmi et al. |
| 2012/0307873 A1 | 12/2012 | Kim et al. |
| 2012/0309295 A1 | 12/2012 | Maguire |
| 2012/0309308 A1 | 12/2012 | Kim et al. |
| 2012/0309332 A1 | 12/2012 | Liao |
| 2012/0313446 A1 | 12/2012 | Park et al. |
| 2012/0313449 A1 | 12/2012 | Kurs |
| 2012/0313835 A1 | 12/2012 | Gebretnsae |
| 2012/0326660 A1 | 12/2012 | Lu et al. |
| 2013/0002550 A1 | 1/2013 | Zalewski |
| 2013/0005252 A1 | 1/2013 | Lee et al. |
| 2013/0018439 A1 | 1/2013 | Chow et al. |
| 2013/0024059 A1 | 1/2013 | Miller et al. |
| 2013/0026981 A1 | 1/2013 | Van Der Lee |
| 2013/0026982 A1 | 1/2013 | Rothenbaum |
| 2013/0032589 A1 | 2/2013 | Chung |
| 2013/0033571 A1 | 2/2013 | Steen |
| 2013/0038124 A1 | 2/2013 | Newdoll et al. |
| 2013/0038402 A1 | 2/2013 | Karalis et al. |
| 2013/0043738 A1 | 2/2013 | Park et al. |
| 2013/0044035 A1 | 2/2013 | Zhuang |
| 2013/0049471 A1 | 2/2013 | Oleynik |
| 2013/0049475 A1 | 2/2013 | Kim et al. |
| 2013/0049484 A1 | 2/2013 | Weissentern et al. |
| 2013/0057078 A1 | 3/2013 | Lee |
| 2013/0057205 A1 | 3/2013 | Lee et al. |
| 2013/0057210 A1 | 3/2013 | Negaard et al. |
| 2013/0057364 A1 | 3/2013 | Kesler et al. |
| 2013/0058379 A1 | 3/2013 | Kim et al. |
| 2013/0062959 A1 | 3/2013 | Lee et al. |
| 2013/0063082 A1 | 3/2013 | Lee et al. |
| 2013/0063143 A1 | 3/2013 | Adalsteinsson et al. |
| 2013/0063266 A1 | 3/2013 | Yunker et al. |
| 2013/0069444 A1 | 3/2013 | Waffenschmidt et al. |
| 2013/0076308 A1 | 3/2013 | Niskala et al. |
| 2013/0077650 A1 | 3/2013 | Traxler et al. |
| 2013/0078918 A1 | 3/2013 | Crowley et al. |
| 2013/0082651 A1 | 4/2013 | Park et al. |
| 2013/0082653 A1 | 4/2013 | Lee et al. |
| 2013/0083774 A1 | 4/2013 | Son et al. |
| 2013/0088082 A1 | 4/2013 | Kang et al. |
| 2013/0088090 A1 | 4/2013 | Wu |
| 2013/0088192 A1 | 4/2013 | Eaton |
| 2013/0088331 A1 | 4/2013 | Cho |
| 2013/0093388 A1 | 4/2013 | Partovi |
| 2013/0099389 A1 | 4/2013 | Hong et al. |
| 2013/0099586 A1 | 4/2013 | Kato |
| 2013/0106197 A1 | 5/2013 | Bae et al. |
| 2013/0107023 A1 | 5/2013 | Tanaka et al. |
| 2013/0119777 A1 | 5/2013 | Rees |
| 2013/0119778 A1 | 5/2013 | Jung |
| 2013/0119929 A1 | 5/2013 | Partovi |
| 2013/0120052 A1 | 5/2013 | Siska |
| 2013/0120205 A1 | 5/2013 | Thomson et al. |
| 2013/0120206 A1 | 5/2013 | Biancotto et al. |
| 2013/0120217 A1 | 5/2013 | Ueda et al. |
| 2013/0130621 A1 | 5/2013 | Kim et al. |
| 2013/0132010 A1 | 5/2013 | Winger et al. |
| 2013/0134923 A1 | 5/2013 | Smith |
| 2013/0137455 A1 | 5/2013 | Xia |
| 2013/0141037 A1 | 6/2013 | Jenwatanavet et al. |
| 2013/0148341 A1 | 6/2013 | Williams |
| 2013/0149975 A1 | 6/2013 | Yu et al. |
| 2013/0154387 A1 | 6/2013 | Lee et al. |
| 2013/0155748 A1 | 6/2013 | Sundstrom |
| 2013/0157729 A1 | 6/2013 | Tabe |
| 2013/0162335 A1 | 6/2013 | Kim et al. |
| 2013/0169061 A1 | 7/2013 | Microshnichenko et al. |
| 2013/0169219 A1 | 7/2013 | Gray |
| 2013/0169348 A1 | 7/2013 | Shi |
| 2013/0171939 A1 | 7/2013 | Tian et al. |
| 2013/0175877 A1 | 7/2013 | Abe et al. |
| 2013/0178253 A1 | 7/2013 | Karaoguz |
| 2013/0181881 A1 | 7/2013 | Christie et al. |
| 2013/0187475 A1 | 7/2013 | Vendik |
| 2013/0190031 A1 | 7/2013 | Persson et al. |
| 2013/0193769 A1 | 8/2013 | Mehta et al. |
| 2013/0197320 A1 | 8/2013 | Albert et al. |
| 2013/0200064 A1 | 8/2013 | Alexander |
| 2013/0207477 A1 | 8/2013 | Nam et al. |
| 2013/0207604 A1 | 8/2013 | Zeine |

(56) References Cited

U.S. PATENT DOCUMENTS

| | | |
|---|---|---|
| 2013/0207879 A1 | 8/2013 | Rada et al. |
| 2013/0210357 A1 | 8/2013 | Qin et al. |
| 2013/0221757 A1 | 8/2013 | Cho et al. |
| 2013/0222201 A1 | 8/2013 | Ma et al. |
| 2013/0234530 A1 | 9/2013 | Miyauchi |
| 2013/0234536 A1 | 9/2013 | Chemishkian et al. |
| 2013/0234658 A1 | 9/2013 | Endo et al. |
| 2013/0241306 A1 | 9/2013 | Aber et al. |
| 2013/0241468 A1 | 9/2013 | Moshfeghi |
| 2013/0241474 A1 | 9/2013 | Moshfeghi |
| 2013/0249478 A1 | 9/2013 | Hirano |
| 2013/0249479 A1 | 9/2013 | Partovi |
| 2013/0249682 A1 | 9/2013 | Van Wiemeersch et al. |
| 2013/0250102 A1 | 9/2013 | Scanlon et al. |
| 2013/0254578 A1 | 9/2013 | Huang et al. |
| 2013/0264997 A1 | 10/2013 | Lee et al. |
| 2013/0268782 A1 | 10/2013 | Tam et al. |
| 2013/0270923 A1 | 10/2013 | Cook et al. |
| 2013/0278076 A1 | 10/2013 | Proud |
| 2013/0278209 A1 | 10/2013 | Novak |
| 2013/0285464 A1 | 10/2013 | Miwa |
| 2013/0285477 A1 | 10/2013 | Lo et al. |
| 2013/0285606 A1 | 10/2013 | Ben-Shalom et al. |
| 2013/0288600 A1 | 10/2013 | Kuusilinna et al. |
| 2013/0288617 A1 | 10/2013 | Kim et al. |
| 2013/0293423 A1 | 11/2013 | Moshfeghi |
| 2013/0300356 A1 | 11/2013 | Yang |
| 2013/0307751 A1 | 11/2013 | Yu-Juin et al. |
| 2013/0310020 A1 | 11/2013 | Kazuhiro |
| 2013/0311798 A1 | 11/2013 | Sultenfuss |
| 2013/0328417 A1 | 12/2013 | Takeuchi |
| 2013/0334883 A1 | 12/2013 | Kim et al. |
| 2013/0339108 A1 | 12/2013 | Ryder et al. |
| 2013/0343208 A1 | 12/2013 | Sexton et al. |
| 2013/0343251 A1 | 12/2013 | Zhang |
| 2013/0343585 A1 | 12/2013 | Bennett et al. |
| 2014/0001846 A1 | 1/2014 | Mosebrook |
| 2014/0001875 A1 | 1/2014 | Nahidipour |
| 2014/0001876 A1 | 1/2014 | Fujiwara et al. |
| 2014/0006017 A1 | 1/2014 | Sen |
| 2014/0008992 A1 | 1/2014 | Leabman |
| 2014/0008993 A1 | 1/2014 | Leabman |
| 2014/0009108 A1 | 1/2014 | Leabman |
| 2014/0009110 A1 | 1/2014 | Lee |
| 2014/0011531 A1 | 1/2014 | Burstrom et al. |
| 2014/0015336 A1 | 1/2014 | Weber et al. |
| 2014/0015344 A1 | 1/2014 | Mohamadi |
| 2014/0021907 A1 | 1/2014 | Yun et al. |
| 2014/0021908 A1 | 1/2014 | McCool |
| 2014/0024325 A1 | 1/2014 | Iun et al. |
| 2014/0035524 A1 | 2/2014 | Zeine |
| 2014/0035526 A1 | 2/2014 | Tripathi et al. |
| 2014/0035786 A1 | 2/2014 | Ley |
| 2014/0043248 A1 | 2/2014 | Yeh |
| 2014/0049422 A1 | 2/2014 | Von Novak et al. |
| 2014/0054971 A1 | 2/2014 | Kissin |
| 2014/0055098 A1 | 2/2014 | Lee et al. |
| 2014/0057618 A1 | 2/2014 | Zirwas et al. |
| 2014/0062395 A1 | 3/2014 | Kwon et al. |
| 2014/0082435 A1 | 3/2014 | Kitgawa |
| 2014/0086125 A1 | 3/2014 | Polo et al. |
| 2014/0086592 A1 | 3/2014 | Nakahara et al. |
| 2014/0091756 A1 | 4/2014 | Ofstein et al. |
| 2014/0091968 A1 | 4/2014 | Harel et al. |
| 2014/0091974 A1 | 4/2014 | Desclos et al. |
| 2014/0103869 A1 | 4/2014 | Radovic |
| 2014/0104157 A1 | 4/2014 | Burns |
| 2014/0111147 A1 | 4/2014 | Soar |
| 2014/0111153 A1 | 4/2014 | Kwon et al. |
| 2014/0113689 A1 | 4/2014 | Lee |
| 2014/0117946 A1 | 5/2014 | Muller et al. |
| 2014/0118140 A1 | 5/2014 | Amis |
| 2014/0128107 A1 | 5/2014 | An |
| 2014/0132210 A1 | 5/2014 | Partovi |
| 2014/0133279 A1 | 5/2014 | Khuri-Yakub |
| 2014/0139034 A1 | 5/2014 | Sankar et al. |
| 2014/0139039 A1 | 5/2014 | Cook et al. |
| 2014/0139180 A1 | 5/2014 | Kim et al. |
| 2014/0141838 A1 | 5/2014 | Cai et al. |
| 2014/0142876 A1 | 5/2014 | John et al. |
| 2014/0143933 A1 | 5/2014 | Low et al. |
| 2014/0145879 A1 | 5/2014 | Pan |
| 2014/0145884 A1 | 5/2014 | Dang et al. |
| 2014/0152117 A1 | 6/2014 | Sanker |
| 2014/0159651 A1 | 6/2014 | Von Novak et al. |
| 2014/0159652 A1 | 6/2014 | Hall et al. |
| 2014/0159662 A1 | 6/2014 | Furui |
| 2014/0159667 A1 | 6/2014 | Kim et al. |
| 2014/0169385 A1 | 6/2014 | Hadani et al. |
| 2014/0175876 A1 | 6/2014 | Cheatham, III et al. |
| 2014/0175893 A1 | 6/2014 | Sengupta et al. |
| 2014/0176054 A1 | 6/2014 | Porat et al. |
| 2014/0176061 A1 | 6/2014 | Cheatham, III et al. |
| 2014/0176082 A1 | 6/2014 | Visser |
| 2014/0177399 A1 | 6/2014 | Teng et al. |
| 2014/0183964 A1 | 7/2014 | Walley |
| 2014/0184148 A1 | 7/2014 | Van Der Lee et al. |
| 2014/0184155 A1 | 7/2014 | Cha |
| 2014/0184163 A1 | 7/2014 | Das et al. |
| 2014/0184170 A1 | 7/2014 | Jeong |
| 2014/0191568 A1 | 7/2014 | Partovi |
| 2014/0191818 A1 | 7/2014 | Waffenschmidt et al. |
| 2014/0194092 A1 | 7/2014 | Wanstedt et al. |
| 2014/0194095 A1 | 7/2014 | Wanstedt et al. |
| 2014/0197691 A1 | 7/2014 | Wang |
| 2014/0203629 A1 | 7/2014 | Hoffman et al. |
| 2014/0206384 A1 | 7/2014 | Kim et al. |
| 2014/0210281 A1 | 7/2014 | Ito et al. |
| 2014/0217955 A1 | 8/2014 | Lin |
| 2014/0217967 A1 | 8/2014 | Zeine et al. |
| 2014/0225805 A1 | 8/2014 | Pan et al. |
| 2014/0232320 A1 | 8/2014 | Ento July et al. |
| 2014/0232610 A1 | 8/2014 | Shigemoto et al. |
| 2014/0239733 A1 | 8/2014 | Mach et al. |
| 2014/0241231 A1 | 8/2014 | Zeine |
| 2014/0245036 A1 | 8/2014 | Oishi |
| 2014/0246416 A1 | 9/2014 | White |
| 2014/0247152 A1 | 9/2014 | Proud |
| 2014/0252813 A1 | 9/2014 | Lee et al. |
| 2014/0252866 A1 | 9/2014 | Walsh et al. |
| 2014/0265725 A1 | 9/2014 | Angle et al. |
| 2014/0265727 A1 | 9/2014 | Berte |
| 2014/0265943 A1 | 9/2014 | Angle et al. |
| 2014/0266025 A1 | 9/2014 | Jakubowski |
| 2014/0266946 A1 | 9/2014 | Bily et al. |
| 2014/0273819 A1 | 9/2014 | Nadakuduti et al. |
| 2014/0273892 A1 | 9/2014 | Nourbakhsh |
| 2014/0281655 A1 | 9/2014 | Angle et al. |
| 2014/0292090 A1 | 10/2014 | Cordeiro et al. |
| 2014/0292451 A1 | 10/2014 | Zimmerman |
| 2014/0300452 A1 | 10/2014 | Rofe et al. |
| 2014/0312706 A1 | 10/2014 | Fiorello et al. |
| 2014/0325218 A1 | 10/2014 | Shimizu et al. |
| 2014/0327320 A1 | 11/2014 | Muhs et al. |
| 2014/0327390 A1 | 11/2014 | Park et al. |
| 2014/0333142 A1 | 11/2014 | Desrosiers |
| 2014/0346860 A1 | 11/2014 | Aubry et al. |
| 2014/0354063 A1 | 12/2014 | Leabman et al. |
| 2014/0354221 A1 | 12/2014 | Leabman et al. |
| 2014/0355718 A1 | 12/2014 | Guan et al. |
| 2014/0357309 A1 | 12/2014 | Leabman et al. |
| 2014/0368048 A1 | 12/2014 | Leabman et al. |
| 2014/0368161 A1 | 12/2014 | Leabman et al. |
| 2014/0368405 A1 | 12/2014 | Ek et al. |
| 2014/0370929 A1 | 12/2014 | Khawand et al. |
| 2014/0375139 A1 | 12/2014 | Tsukamoto |
| 2014/0375253 A1 | 12/2014 | Leabman et al. |
| 2014/0375255 A1 | 12/2014 | Leabman et al. |
| 2014/0375258 A1 | 12/2014 | Arkhipenkov |
| 2014/0375261 A1 | 12/2014 | Manova-Elssibony et al. |
| 2014/0376646 A1 | 12/2014 | Leabman et al. |
| 2015/0001949 A1 | 1/2015 | Leabman et al. |
| 2015/0002086 A1 | 1/2015 | Matos et al. |
| 2015/0003207 A1 | 1/2015 | Lee et al. |

(56) References Cited

U.S. PATENT DOCUMENTS

| | | |
|---|---|---|
| 2015/0008980 A1 | 1/2015 | Kim et al. |
| 2015/0011160 A1 | 1/2015 | Uurgovan et al. |
| 2015/0015180 A1 | 1/2015 | Miller et al. |
| 2015/0015182 A1 | 1/2015 | Brandtman et al. |
| 2015/0015192 A1 | 1/2015 | Leabman et al. |
| 2015/0015194 A1 | 1/2015 | Leabman et al. |
| 2015/0015195 A1 | 1/2015 | Leabman et al. |
| 2015/0021990 A1 | 1/2015 | Myer et al. |
| 2015/0022008 A1 | 1/2015 | Leabman et al. |
| 2015/0022009 A1 | 1/2015 | Leabman et al. |
| 2015/0022010 A1 | 1/2015 | Leabman et al. |
| 2015/0022194 A1 | 1/2015 | Almalki et al. |
| 2015/0023204 A1 | 1/2015 | Wil et al. |
| 2015/0028688 A1 | 1/2015 | Masaoka |
| 2015/0028694 A1 | 1/2015 | Leabman et al. |
| 2015/0028697 A1 | 1/2015 | Leabman et al. |
| 2015/0028875 A1 | 1/2015 | Irie et al. |
| 2015/0029397 A1 | 1/2015 | Leabman et al. |
| 2015/0035378 A1 | 2/2015 | Calhoun et al. |
| 2015/0035709 A1 | 2/2015 | Lim |
| 2015/0035715 A1 | 2/2015 | Kim et al. |
| 2015/0039482 A1 | 2/2015 | Fuinaga |
| 2015/0041459 A1 | 2/2015 | Leabman et al. |
| 2015/0042264 A1 | 2/2015 | Leabman et al. |
| 2015/0042265 A1 | 2/2015 | Leabman et al. |
| 2015/0044977 A1 | 2/2015 | Ramasamy et al. |
| 2015/0046526 A1 | 2/2015 | Bush et al. |
| 2015/0061404 A1 | 3/2015 | Lamenza et al. |
| 2015/0076917 A1 | 3/2015 | Leabman et al. |
| 2015/0076927 A1 | 3/2015 | Leabman et al. |
| 2015/0077036 A1 | 3/2015 | Leabman et al. |
| 2015/0077037 A1 | 3/2015 | Leabman et al. |
| 2015/0091520 A1 | 4/2015 | Blum et al. |
| 2015/0091706 A1 | 4/2015 | Chemishkian et al. |
| 2015/0097442 A1 | 4/2015 | Muurinen |
| 2015/0097663 A1 | 4/2015 | Sloo et al. |
| 2015/0102681 A1 | 4/2015 | Leabman et al. |
| 2015/0102764 A1 | 4/2015 | Leabman et al. |
| 2015/0102769 A1 | 4/2015 | Leabman et al. |
| 2015/0102942 A1 | 4/2015 | Houser et al. |
| 2015/0102973 A1 | 4/2015 | Hand et al. |
| 2015/0108848 A1 | 4/2015 | Joehren |
| 2015/0109181 A1 | 4/2015 | Hyde et al. |
| 2015/0115877 A1 | 4/2015 | Aria et al. |
| 2015/0115878 A1 | 4/2015 | Park |
| 2015/0116153 A1 | 4/2015 | Chen et al. |
| 2015/0123483 A1 | 5/2015 | Leabman et al. |
| 2015/0123496 A1 | 5/2015 | Leabman et al. |
| 2015/0128733 A1 | 5/2015 | Taylor et al. |
| 2015/0130285 A1 | 5/2015 | Leabman et al. |
| 2015/0130293 A1 | 5/2015 | Hajimiri et al. |
| 2015/0137612 A1 | 5/2015 | Yamakawa et al. |
| 2015/0148664 A1 | 5/2015 | Stolka et al. |
| 2015/0155737 A1 | 6/2015 | Mayo |
| 2015/0155738 A1 | 6/2015 | Leabman et al. |
| 2015/0162662 A1 | 6/2015 | Chen et al. |
| 2015/0162751 A1 | 6/2015 | Leabman et al. |
| 2015/0162779 A1 | 6/2015 | Lee et al. |
| 2015/0171512 A1 | 6/2015 | Chen et al. |
| 2015/0171513 A1 | 6/2015 | Chen et al. |
| 2015/0171656 A1 | 6/2015 | Leabman et al. |
| 2015/0171658 A1 | 6/2015 | Manova-Elssibony et al. |
| 2015/0171931 A1 | 6/2015 | Won et al. |
| 2015/0177326 A1 | 6/2015 | Chakraborty et al. |
| 2015/0180133 A1 | 6/2015 | Hunt |
| 2015/0180249 A1 | 6/2015 | Jeon et al. |
| 2015/0180284 A1 | 6/2015 | Kang et al. |
| 2015/0181117 A1 | 6/2015 | Park et al. |
| 2015/0187491 A1 | 7/2015 | Yanagawa |
| 2015/0188352 A1 | 7/2015 | Peek et al. |
| 2015/0199665 A1 | 7/2015 | Chu |
| 2015/0201385 A1 | 7/2015 | Mercer et al. |
| 2015/0207333 A1 | 7/2015 | Baarman et al. |
| 2015/0207542 A1 | 7/2015 | Zeine |
| 2015/0222126 A1 | 8/2015 | Leabman et al. |
| 2015/0233987 A1 | 8/2015 | Von Novak, III et al. |
| 2015/0234144 A1 | 8/2015 | Cameron et al. |
| 2015/0236520 A1 | 8/2015 | Baarman |
| 2015/0236877 A1 | 8/2015 | Peng et al. |
| 2015/0244070 A1 | 8/2015 | Cheng et al. |
| 2015/0244080 A1 | 8/2015 | Gregoire |
| 2015/0244187 A1 | 8/2015 | Horie |
| 2015/0244201 A1 | 8/2015 | Chu |
| 2015/0244341 A1 | 8/2015 | Ritter et al. |
| 2015/0249484 A1 | 9/2015 | Mach et al. |
| 2015/0255989 A1 | 9/2015 | Walley et al. |
| 2015/0256097 A1 | 9/2015 | Gudan et al. |
| 2015/0260835 A1 | 9/2015 | Widmer et al. |
| 2015/0262465 A1 | 9/2015 | Pritchett |
| 2015/0263534 A1 | 9/2015 | Lee et al. |
| 2015/0263548 A1 | 9/2015 | Cooper |
| 2015/0270618 A1 | 9/2015 | Zhu et al. |
| 2015/0270622 A1 | 9/2015 | Takasaki et al. |
| 2015/0270741 A1 | 9/2015 | Leabman et al. |
| 2015/0278558 A1 | 10/2015 | Priev et al. |
| 2015/0280429 A1 | 10/2015 | Makita et al. |
| 2015/0280484 A1 | 10/2015 | Radziemski et al. |
| 2015/0288074 A1 | 10/2015 | Harper et al. |
| 2015/0288438 A1 | 10/2015 | Maltsev et al. |
| 2015/0311585 A1 | 10/2015 | Church et al. |
| 2015/0312721 A1 | 10/2015 | Singh |
| 2015/0318729 A1 | 11/2015 | Leabman |
| 2015/0326024 A1 | 11/2015 | Bell et al. |
| 2015/0326025 A1 | 11/2015 | Bell et al. |
| 2015/0326051 A1 | 11/2015 | Bell et al. |
| 2015/0326063 A1 | 11/2015 | Leabman et al. |
| 2015/0326068 A1 | 11/2015 | Bell et al. |
| 2015/0326069 A1 | 11/2015 | Petras et al. |
| 2015/0326070 A1 | 11/2015 | Petras et al. |
| 2015/0326071 A1 | 11/2015 | Contopanagos |
| 2015/0326072 A1 | 11/2015 | Petras et al. |
| 2015/0326142 A1 | 11/2015 | Petras et al. |
| 2015/0326143 A1 | 11/2015 | Petras et al. |
| 2015/0327085 A1 | 11/2015 | Hadani |
| 2015/0333528 A1 | 11/2015 | Leabman |
| 2015/0333529 A1 | 11/2015 | Leabman |
| 2015/0333573 A1 | 11/2015 | Leabman |
| 2015/0333800 A1 | 11/2015 | Perry et al. |
| 2015/0339497 A1 | 11/2015 | Kurian |
| 2015/0340759 A1 | 11/2015 | Bridgelall et al. |
| 2015/0340903 A1 | 11/2015 | Bell et al. |
| 2015/0340909 A1 | 11/2015 | Bell et al. |
| 2015/0340910 A1 | 11/2015 | Petras et al. |
| 2015/0340911 A1 | 11/2015 | Bell et al. |
| 2015/0341087 A1 | 11/2015 | Moore et al. |
| 2015/0349574 A1 | 12/2015 | Leabman |
| 2015/0358222 A1 | 12/2015 | Berger et al. |
| 2015/0365137 A1 | 12/2015 | Miller et al. |
| 2015/0365138 A1 | 12/2015 | Miller et al. |
| 2016/0005068 A1 | 1/2016 | Im et al. |
| 2016/0012695 A1 | 1/2016 | Bell et al. |
| 2016/0013560 A1 | 1/2016 | Daniels |
| 2016/0013656 A1 | 1/2016 | Bell et al. |
| 2016/0013661 A1 | 1/2016 | Kurs et al. |
| 2016/0013677 A1 | 1/2016 | Bell et al. |
| 2016/0013678 A1 | 1/2016 | Bell et al. |
| 2016/0013855 A1 | 1/2016 | Campos |
| 2016/0020636 A1 | 1/2016 | Khlat |
| 2016/0020647 A1 | 1/2016 | Leabman et al. |
| 2016/0020649 A1 | 1/2016 | Bell et al. |
| 2016/0020830 A1 | 1/2016 | Bell et al. |
| 2016/0028403 A1 | 1/2016 | McCaughan et al. |
| 2016/0033254 A1 | 2/2016 | Zeine et al. |
| 2016/0042206 A1 | 2/2016 | Pesavento et al. |
| 2016/0043571 A1 | 2/2016 | Kesler et al. |
| 2016/0043572 A1 | 2/2016 | Cooper et al. |
| 2016/0054395 A1 | 2/2016 | Bell et al. |
| 2016/0054396 A1 | 2/2016 | Bell et al. |
| 2016/0054440 A1 | 2/2016 | Younis |
| 2016/0056635 A1 | 2/2016 | Bell |
| 2016/0056640 A1 | 2/2016 | Mao |
| 2016/0056669 A1 | 2/2016 | Bell |
| 2016/0056966 A1 | 2/2016 | Bell |
| 2016/0065005 A1 | 3/2016 | Won et al. |

(56) References Cited

U.S. PATENT DOCUMENTS

| | | |
|---|---|---|
| 2016/0079799 A1 | 3/2016 | Khlat |
| 2016/0087483 A1 | 3/2016 | Hietala et al. |
| 2016/0087486 A1 | 3/2016 | Pogorelik et al. |
| 2016/0094091 A1 | 3/2016 | Shin et al. |
| 2016/0094092 A1 | 3/2016 | Davlantes et al. |
| 2016/0099601 A1 | 4/2016 | Leabman et al. |
| 2016/0099602 A1 | 4/2016 | Leabman et al. |
| 2016/0099609 A1 | 4/2016 | Leabman et al. |
| 2016/0099610 A1 | 4/2016 | Leabman et al. |
| 2016/0099611 A1 | 4/2016 | Leabman et al. |
| 2016/0099612 A1 | 4/2016 | Leabman et al. |
| 2016/0099613 A1 | 4/2016 | Leabman et al. |
| 2016/0099614 A1 | 4/2016 | Leabman et al. |
| 2016/0099755 A1 | 4/2016 | Leabman et al. |
| 2016/0099756 A1 | 4/2016 | Leabman et al. |
| 2016/0099757 A1 | 4/2016 | Leabman et al. |
| 2016/0099758 A1 | 4/2016 | Leabman et al. |
| 2016/0100124 A1 | 4/2016 | Leabman et al. |
| 2016/0100312 A1 | 4/2016 | Bell et al. |
| 2016/0112787 A1 | 4/2016 | Rich |
| 2016/0126749 A1 | 5/2016 | Shichino et al. |
| 2016/0126752 A1 | 5/2016 | Vuori et al. |
| 2016/0126776 A1 | 5/2016 | Kim et al. |
| 2016/0141908 A1 | 5/2016 | Jaki et al. |
| 2016/0164563 A1 | 6/2016 | Khawand et al. |
| 2016/0174162 A1 | 6/2016 | Nadakuduti et al. |
| 2016/0181849 A1 | 6/2016 | Govindaraj |
| 2016/0181854 A1 | 6/2016 | Leabman |
| 2016/0181867 A1 | 6/2016 | Daniel et al. |
| 2016/0181873 A1 | 6/2016 | Mitcheson et al. |
| 2016/0191121 A1 | 6/2016 | Bell |
| 2016/0197511 A1* | 7/2016 | Atasoy ................ H02J 50/10 307/104 |
| 2016/0197522 A1 | 7/2016 | Zeine et al. |
| 2016/0202343 A1 | 7/2016 | Okutsu |
| 2016/0204622 A1 | 7/2016 | Leabman |
| 2016/0204642 A1 | 7/2016 | Oh |
| 2016/0218545 A1 | 7/2016 | Schroeder et al. |
| 2016/0233582 A1 | 8/2016 | Piskun |
| 2016/0238365 A1 | 8/2016 | Wixey et al. |
| 2016/0240908 A1 | 8/2016 | Strong |
| 2016/0248276 A1 | 8/2016 | Hong et al. |
| 2016/0294225 A1 | 10/2016 | Blum et al. |
| 2016/0299210 A1 | 10/2016 | Zeine |
| 2016/0301240 A1 | 10/2016 | Zeine |
| 2016/0322868 A1 | 11/2016 | Akuzawa et al. |
| 2016/0323000 A1 | 11/2016 | Liu et al. |
| 2016/0336804 A1 | 11/2016 | Son et al. |
| 2016/0339258 A1 | 11/2016 | Perryman et al. |
| 2016/0344098 A1 | 11/2016 | Ming |
| 2016/0359367 A1 | 12/2016 | Rothschild |
| 2016/0380464 A1 | 12/2016 | Chin et al. |
| 2016/0380466 A1 | 12/2016 | Yang et al. |
| 2017/0005481 A1 | 1/2017 | Von Novak, III et al. |
| 2017/0005516 A9 | 1/2017 | Leabman et al. |
| 2017/0005524 A1 | 1/2017 | Akuzawa et al. |
| 2017/0005530 A1 | 1/2017 | Zeine et al. |
| 2017/0012448 A1 | 1/2017 | Miller et al. |
| 2017/0025887 A1 | 1/2017 | Hyun et al. |
| 2017/0025903 A1 | 1/2017 | Song et al. |
| 2017/0026087 A1 | 1/2017 | Tanabe |
| 2017/0040700 A1 | 2/2017 | Leung |
| 2017/0043675 A1 | 2/2017 | Jones et al. |
| 2017/0047784 A1 | 2/2017 | Jung et al. |
| 2017/0187225 A1 | 2/2017 | Hosseini |
| 2017/0063168 A1 | 3/2017 | Uchida |
| 2017/0077733 A1 | 3/2017 | Jeong et al. |
| 2017/0077735 A1 | 3/2017 | Leabman |
| 2017/0077736 A1 | 3/2017 | Leabman |
| 2017/0077764 A1 | 3/2017 | Bell et al. |
| 2017/0077765 A1 | 3/2017 | Bell et al. |
| 2017/0077979 A1 | 3/2017 | Papa et al. |
| 2017/0077995 A1 | 3/2017 | Leabman |
| 2017/0085120 A1 | 3/2017 | Leabman et al. |
| 2017/0085127 A1 | 3/2017 | Leabman |
| 2017/0085437 A1 | 3/2017 | Condeixa et al. |
| 2017/0092115 A1 | 3/2017 | Sloo et al. |
| 2017/0104263 A1 | 4/2017 | Hosseini |
| 2017/0110886 A1 | 4/2017 | Reynolds et al. |
| 2017/0110887 A1 | 4/2017 | Bell et al. |
| 2017/0110888 A1 | 4/2017 | Leabman |
| 2017/0110889 A1 | 4/2017 | Bell |
| 2017/0110910 A1 | 4/2017 | Zeine et al. |
| 2017/0110914 A1 | 4/2017 | Bell |
| 2017/0127196 A1 | 5/2017 | Blum et al. |
| 2017/0134686 A9 | 5/2017 | Leabman |
| 2017/0141582 A1 | 5/2017 | Adolf et al. |
| 2017/0141583 A1 | 5/2017 | Adolf et al. |
| 2017/0163076 A1 | 6/2017 | Park et al. |
| 2017/0168595 A1 | 6/2017 | Sakaguchi et al. |
| 2017/0179763 A9 | 6/2017 | Leabman |
| 2017/0179771 A1 | 6/2017 | Leabman |
| 2017/0187198 A1 | 6/2017 | Leabman |
| 2017/0187222 A1 | 6/2017 | Hosseini |
| 2017/0187223 A1 | 6/2017 | Hosseini |
| 2017/0187228 A1 | 6/2017 | Hosseini |
| 2017/0187248 A1 | 6/2017 | Leabman |
| 2017/0214422 A1 | 7/2017 | Na et al. |
| 2017/0274787 A1 | 9/2017 | Salter et al. |
| 2017/0338695 A1 | 11/2017 | Port |
| 2018/0006611 A1 | 1/2018 | de Jong et al. |
| 2018/0040929 A1 | 2/2018 | Chappelle |
| 2018/0048178 A1 | 2/2018 | Leabman |
| 2018/0090992 A1 | 3/2018 | Shrivastava et al. |
| 2018/0123400 A1 | 5/2018 | Leabman |
| 2018/0131238 A1 | 5/2018 | Leabman |
| 2018/0159355 A1 | 6/2018 | Leabman |
| 2018/0166924 A1 | 6/2018 | Hosseini |
| 2018/0166925 A1 | 6/2018 | Hosseini |
| 2018/0226840 A1* | 8/2018 | Leabman ................ H02J 50/20 |
| 2018/0227018 A1 | 8/2018 | Moshfeghi |
| 2018/0241255 A1 | 8/2018 | Leabman |
| 2018/0262040 A1 | 9/2018 | Contopanagos |
| 2018/0262050 A1 | 9/2018 | Yankowitz |
| 2018/0262060 A1 | 9/2018 | Johnston |
| 2018/0287431 A1 | 10/2018 | Liu et al. |
| 2018/0301934 A1 | 10/2018 | Prabhala et al. |
| 2018/0309314 A1 | 10/2018 | White et al. |
| 2018/0343040 A1 | 11/2018 | Luzinski et al. |
| 2018/0375340 A1 | 12/2018 | Bell et al. |
| 2018/0375368 A1 | 12/2018 | Leabman et al. |
| 2018/0376235 A1 | 12/2018 | Leabman |
| 2019/0052979 A1 | 2/2019 | Chen et al. |
| 2019/0074728 A1 | 3/2019 | Leabman |
| 2019/0074862 A1 | 3/2019 | Wang et al. |
| 2019/0131827 A1 | 5/2019 | Johnston |
| 2019/0148967 A1* | 5/2019 | Bae .................... H02J 50/12 320/108 |
| 2019/0173323 A1 | 6/2019 | Hosseini |
| 2019/0245389 A1 | 8/2019 | Johnston et al. |
| 2019/0288567 A1 | 9/2019 | Leabman et al. |
| 2019/0296586 A1 | 9/2019 | Moshfeghi |
| 2019/0326782 A1 | 10/2019 | Graham et al. |
| 2019/0372384 A1 | 12/2019 | Hosseini et al. |
| 2019/0386522 A1 | 12/2019 | Park et al. |
| 2019/0393729 A1 | 12/2019 | Contopanagos et al. |
| 2019/0393928 A1 | 12/2019 | Leabman |
| 2020/0006988 A1 | 1/2020 | Leabman |
| 2020/0021128 A1 | 1/2020 | Bell et al. |
| 2020/0044488 A1 | 2/2020 | Johnston et al. |
| 2020/0091608 A1 | 3/2020 | Alpman et al. |
| 2020/0112204 A1 | 4/2020 | Hosseini et al. |
| 2020/0119592 A1 | 4/2020 | Hosseini |
| 2020/0153117 A1 | 5/2020 | Papio-Toda et al. |
| 2020/0203837 A1 | 6/2020 | Kornaros et al. |
| 2020/0235614 A1 | 7/2020 | Swan et al. |
| 2020/0244102 A1 | 7/2020 | Leabman et al. |
| 2020/0244104 A1 | 7/2020 | Katajamaki et al. |
| 2020/0244111 A1 | 7/2020 | Johnston et al. |

(56) References Cited

U.S. PATENT DOCUMENTS

| | | |
|---|---|---|
| 2020/0252141 A1 | 8/2020 | Sarajedini |
| 2020/0274397 A1 | 8/2020 | Hwang et al. |

FOREIGN PATENT DOCUMENTS

| | | |
|---|---|---|
| CN | 201278367 Y | 7/2009 |
| CN | 101507044 A | 8/2009 |
| CN | 102027690 A | 4/2011 |
| CN | 102089952 A | 6/2011 |
| CN | 102292896 A | 12/2011 |
| CN | 102860037 A | 1/2013 |
| CN | 103151848 A | 6/2013 |
| CN | 103348563 A | 10/2013 |
| CN | 103594776 A | 2/2014 |
| CN | 104040789 A | 9/2014 |
| CN | 203826555 U | 9/2014 |
| CN | 104090265 A | 10/2014 |
| CN | 104167773 A | 11/2014 |
| CN | 104347915 A | 2/2015 |
| CN | 105762946 A | 7/2016 |
| CN | 105765821 A | 7/2016 |
| CN | 105932407 A | 9/2016 |
| CN | 106329116 A | 1/2017 |
| CN | 103380561 B | 9/2017 |
| DE | 20016655 U1 | 2/2002 |
| DE | 102013216953 A1 | 2/2015 |
| DE | 102014219679 A1 | 3/2016 |
| EP | 1028482 A2 | 8/2000 |
| EP | 1081506 A1 | 3/2001 |
| EP | 2346136 A1 | 7/2011 |
| EP | 2397973 A1 | 2/2012 |
| EP | 2545635 A2 | 1/2013 |
| EP | 2747195 A1 | 6/2014 |
| EP | 3067983 A1 | 9/2016 |
| EP | 3118970 A1 | 1/2017 |
| EP | 3145052 A1 | 3/2017 |
| GB | 2404497 A | 2/2005 |
| GB | 2556620 A | 6/2018 |
| JP | 2000323916 A | 11/2000 |
| JP | 2002209343 A | 7/2002 |
| JP | 2002319816 A | 10/2002 |
| JP | 2006157586 A | 6/2006 |
| JP | 2007043432 A | 2/2007 |
| JP | 2007135335 A | 5/2007 |
| JP | 2008092704 A | 4/2008 |
| JP | 2008167017 A | 7/2008 |
| JP | 2009525715 A | 7/2009 |
| JP | 2009201328 A | 9/2009 |
| JP | 2011514781 A | 5/2011 |
| JP | 2012016171 A | 1/2012 |
| JP | 2012023950 A | 2/2012 |
| JP | 2012095226 A | 5/2012 |
| JP | 2012157167 A | 8/2012 |
| JP | 2013099249 A | 5/2013 |
| JP | 2013162624 A | 8/2013 |
| JP | 2014501080 A | 1/2014 |
| JP | 2014075927 A | 4/2014 |
| JP | 2014112063 A | 6/2014 |
| JP | 2014176131 A | 9/2014 |
| JP | 2014223018 A | 11/2014 |
| JP | 2015027345 A | 2/2015 |
| JP | 2015128349 A | 7/2015 |
| JP | 2015128370 A | 7/2015 |
| JP | WO2015177859 A1 | 4/2017 |
| KR | 20060061776 A | 6/2006 |
| KR | 20070044302 A | 4/2007 |
| KR | 100755144 B1 | 9/2007 |
| KR | 20110132059 A | 12/2011 |
| KR | 20110135540 A1 | 12/2011 |
| KR | 20120009843 A | 2/2012 |
| KR | 20120108759 A | 10/2012 |
| KR | 20130026977 A | 3/2013 |
| KR | 20140023409 A | 2/2014 |
| KR | 20140023410 A | 3/2014 |
| KR | 20140085200 A | 7/2014 |
| KR | 20140148270 A | 12/2014 |
| KR | 20150077678 A | 7/2015 |
| RU | 2658332 C1 | 6/2018 |
| WO | WO 199508125 A1 | 3/1995 |
| WO | WO 199831070 A1 | 7/1998 |
| WO | WO 199952173 A1 | 10/1999 |
| WO | WO 2000111716 A1 | 2/2001 |
| WO | WO 2003091943 A1 | 11/2003 |
| WO | WO 2004077550 A1 | 9/2004 |
| WO | WO 2006122783 A2 | 11/2006 |
| WO | WO 2007070571 A2 | 6/2007 |
| WO | WO 2008024993 A2 | 2/2008 |
| WO | WO 2008156571 A2 | 12/2008 |
| WO | WO 2010022181 A1 | 2/2010 |
| WO | WO 2010039246 A1 | 4/2010 |
| WO | WO 2010116441 A1 | 10/2010 |
| WO | WO 2010138994 A1 | 12/2010 |
| WO | WO 2011112022 A2 | 9/2011 |
| WO | WO 2012177283 A1 | 12/2012 |
| WO | WO 2013031988 A1 | 3/2013 |
| WO | WO 2013035190 A1 | 3/2013 |
| WO | WO 2013038074 A2 | 3/2013 |
| WO | WO 2013042399 A1 | 3/2013 |
| WO | WO 2013052950 A1 | 4/2013 |
| WO | WO 2013105920 A2 | 7/2013 |
| WO | WO 2013175596 A1 | 11/2013 |
| WO | WO 2014068992 A1 | 5/2014 |
| WO | WO 2014075103 A1 | 5/2014 |
| WO | WO 2014113093 A1 | 7/2014 |
| WO | WO 2014132258 A1 | 9/2014 |
| WO | WO 2014134996 A1 | 9/2014 |
| WO | WO 2014156465 A1 | 10/2014 |
| WO | WO 2014182788 A2 | 11/2014 |
| WO | WO 2014182788 A3 | 11/2014 |
| WO | WO 2014197472 A1 | 12/2014 |
| WO | WO 2014209587 A1 | 12/2014 |
| WO | WO 2015038773 A1 | 3/2015 |
| WO | WO 2015097809 A1 | 7/2015 |
| WO | WO 2015130902 A1 | 9/2015 |
| WO | WO 2015161323 A1 | 10/2015 |
| WO | WO 2016024869 A1 | 2/2016 |
| WO | WO 2016048512 A1 | 3/2016 |
| WO | WO 2016088261 A1 | 6/2016 |
| WO | WO 2016187357 A1 | 11/2016 |

OTHER PUBLICATIONS

Energous Corp., IPRP, PCT/US2014/037109, Apr. 12, 2016, 9 pgs.
Energous Corp., IPRP, PCT/US2014/037170, Nov. 10, 2015, 8 pgs.
Energous Corp., IPRP, PCT/US2014/040648, Dec. 8, 2015, 8 pgs.
Energous Corp., IPRP, PCT/US2014/040697, Dec. 8, 2015, 9 pgs.
Energous Corp., IPRP, PCT/US2014/040705, Dec. 8, 2015, 6 pgs.
Energous Corp., IPRP, PCT/US2014/041323, Dec. 22, 2015, 8 pgs.
Energous Corp., IPRP, PCT/US2014/041342, Dec. 15, 2015, 8 pgs.
Energous Corp., IPRP, PCT/US2014/041534, Dec. 29, 2015, 7 pgs.
Energous Corp., IPRP, PCT/US2014/041546, Dec. 29, 2015, 9 pgs.
Energous Corp., IPRP, PCT/US2014/041558, Dec. 29, 2015, 6 pgs.
Energous Corp., IPRP, PCT/US2014/044810, Jan. 5, 2016, 10 pgs.
Energous Corp., IPRP, PCT/US2014/045102, Jan. 12, 2016, 11 pgs.
Energous Corp., IPRP, PCT/US2014/045119, Jan. 12, 2016, 9 pgs.
Energous Corp., IPRP, PCT/US2014/045237, Jan. 12, 2016, 12 pgs.
Energous Corp., IPRP, PCT/US2014/046941, Jan. 19, 2016, 9 pgs.
Energous Corp., IPRP, PCT/US2014/046956, Jan. 19, 2016, 7 pgs.
Energous Corp., IPRP, PCT/US2014/046961, Jan. 19, 2016, 8 pgs.
Energous Corp., IPRP, PCT/US2014/047963, Jan. 26, 2016, 10 pgs.
Energous Corp., IPRP, PCT/US2014/048002, Feb. 12, 2015 8 pgs.
Energous Corp., IPRP, PCT/US2014/049666, Feb. 9, 2016, 5 pgs.
Energous Corp., IPRP, PCT/US2014/049669, Feb. 9, 2016, 8 pgs.
Energous Corp., IPRP, PCT/US2014/049673, Feb. 9, 2016, 6 pgs.
Energous Corp., IPRP, PCT/US2014/054891, Mar. 15, 2016, 10 pgs.
Energous Corp., IPRP, PCT/US2014/054897, Mar. 15, 2016, 8 pgs.
Energous Corp., IPRP, PCT/US2014/054953, Mar. 22, 2016, 5 pgs.
Energous Corp., IPRP, PCT/US2014/055195, Mar. 22, 2016, 9 pgs.
Energous Corp., IPRP, PCT/US2014/059317, Apr. 12, 2016, 10 pgs.
Energous Corp., IPRP, PCT/US2014/059340, Apr. 12, 2016, 11 pgs.

(56) References Cited

OTHER PUBLICATIONS

Energous Corp., IPRP, PCT/US2014/059871, Apr. 12, 2016, 9 pgs.
Energous Corp., IPRP, PCT/US2014/062661, May 3, 2016, 10 pgs.
Energous Corp., IPRP, PCT/US2014/062672, May 10, 2016, 8 pgs.
Energous Corp., IPRP, PCT/US2014/062682, May 3, 2016, 8 pgs.
Energous Corp., IPRP, PCT/US2014/068282, Jun. 7, 2016, 10 pgs.
Energous Corp., IPRP, PCT/US2014/068568, Jun. 14, 2016, 8 pgs.
Energous Corp., IPRP, PCT/US2014/068586, Jun. 14, 2016, 8 pgs.
Energous Corp., IPRP, PCT/US2015/067242, Jun. 27, 2017, 7 pgs.
Energous Corp., IPRP, PCT/US2015/067243, Jun. 27, 2017, 7 pgs.
Energous Corp., IPRP, PCT/US2015/067245, Jun. 27, 2017, 7 pgs.
Energous Corp., IPRP, PCT/US2015/067246, Jun. 27, 2017, 9 pgs.
Energous Corp., IPRP, PCT/US2015/067249, Jun. 27, 2017, 7 pgs.
Energous Corp., IPRP, PCT/US2015/067250, Mar. 30, 2016, 10 pgs.
Energous Corp., IPRP, PCT/US2015/067271, Jul. 4, 2017, 5 pgs.
Energous Corp., IPRP, PCT/US2015/067275, Jul. 4, 2017, 7 pgs.
Energous Corp., IPRP, PCT/US2015/067279, Jul. 4, 2017, 7 pgs.
Energous Corp., IPRP, PCT/US2015/067282, Jul. 4, 2017, 6 pgs.
Energous Corp., IPRP, PCT/US2015/067287, Jul. 4, 2017, 6 pgs.
Energous Corp., IPRP, PCT/US2015/067291, Jul. 4, 2017, 4 pgs.
Energous Corp., IPRP, PCT/US2015/067294, Jul. 4, 2017, 6 pgs.
Energous Corp., IPRP, PCT/US2015/067325, Jul. 4, 2017, 8 pgs.
Energous Corp., IPRP, PCT/US2015/067334, Jul. 4, 2017, 5 pgs.
Energous Corp., IPRP, PCT/US2016/068495, Jun. 26, 2018, 7 pgs.
Energous Corp., IPRP, PCT/US2016/068498, Jun. 26, 2018, 6 pgs.
Energous Corp., IPRP, PCT/US2016/068504, Jun. 26, 2018, 5 pgs.
Energous Corp., IPRP, PCT/US2016/068551, Jun. 26, 2018, 6 pgs.
Energous Corp., IPRP, PCT/US2016/068565, Jun. 26, 2018, 9 pgs.
Energous Corp., IPRP, PCT/US2016/068987, Jul. 3, 2018, 7 pgs.
Energous Corp., IPRP, PCT/US2016/068993, Jul. 3, 2018, 10 pgs.
Energous Corp., IPRP, PCT/US2016/069313, Jul. 3, 2018, 7 pgs.
Energous Corp., IPRP, PCT/US2016/069316, Jul. 3, 2018, 12 pgs.
Energous Corp., IPRP, PCT/US2017/046800, Feb. 12, 2019, 10 pgs.
Energous Corp., IPRP, PCT/US2017/065886, Jun. 18, 2019, 10 pgs.
Energous Corp., IPRP, PCT/US2018/012806, Jul. 9, 2019, 6 pgs.
Energous Corp., IPRP, PCT/US2018/025465, Oct. 1, 2019, 8 pgs.
Energous Corp., IPRP, PCT/US2018/031768, Nov. 12, 2019, 8 pgs.
Energous Corp., IPRP, PCT/US2018/031786, Apr. 14, 2020, 7 pgs.
Energous Corp., IPRP, PCT/US2018/039334, Dec. 24, 2019, 8 pgs.
Energous Corp., IPRP, PCT/US2018/051082, Mar. 17, 2020, 9 pgs.
Energous Corp., IPRP, PCT/US2018/058178, May 5, 2020, 7 pgs.
Energous Corp., IPRP, PCT/US2019/015820, Aug. 4, 2020, 7 pgs.
Energous Corp., IPRP, PCT/US2019/021817, Sep. 15, 2020, 7 pgs.
Energous Corp., ISRWO, PCT/US2014/037072, Sep. 12, 2014, 8 pgs.
Energous Corp., ISRWO, PCT/US2014/037109, Apr. 8, 2016, 12 pgs.
Energous Corp., ISRWO, PCT/US2014/037170, Sep. 15, 2014, 11 pgs.
Energous Corp., ISRWO, PCT/US2014/040648, Oct. 10, 2014, 11 pgs.
Energous Corp., ISRWO, PCT/US2014/040697, Oct. 1, 2014, 12 pgs.
Energous Corp., ISRWO, PCT/US2014/040705, Sep. 23, 2014, 8 pgs.
Energous Corp., ISRWO, PCT/US2014/041323, Oct. 1, 2014, 10 pgs.
Energous Corp., ISRWO, PCT/US2014/041342, Jan. 27, 2015, 10 pgs.
Energous Corp., ISRWO, PCT/US2014/041534, Oct. 13, 2014, 10 pgs.
Energous Corp., ISRWO, PCT/US2014/041546, Oct. 16, 2014, 12 pgs.
Energous Corp., ISRWO, PCT/US2014/041558, Oct. 10, 2014, 8 pgs.
Energous Corp., ISRWO, PCT/US2014/044810 Oct. 21, 2014, 12 pgs.
Energous Corp., ISRWO, PCT/US2014/045102, Oct. 28, 2014, 14 pgs.
Energous Corp., ISRWO, PCT/US2014/045119, Oct. 13, 2014, 11 pgs.
Energous Corp., ISRWO, PCT/US2014/045237, Oct. 13, 2014, 16 pgs.
Energous Corp., ISRWO, PCT/US2014/046941, Nov. 6, 2014, 11 pgs.
Energous Corp., ISRWO, PCT/US2014/046956, Nov. 12, 2014, 10 pgs.
Energous Corp., ISRWO, PCT/US2014/046961, Nov. 24, 2014, 16 pgs.
Energous Corp., ISRWO, PCT/US2014/047963, Nov. 7, 2014, 13 pgs.
Energous Corp., ISRWO, PCT/US2014/048002, Nov. 13, 2014, 11 pgs.
Energous Corp., ISRWO, PCT/US2014/049666, Nov. 10, 2014, 7 pgs.
Energous Corp., ISRWO, PCT/US2014/049669, Nov. 13, 2014, 10 pgs.
Energous Corp., ISRWO, PCT/US2014/049673, Nov. 18, 2014, 10 pgs.
Energous Corp., ISRWO, PCT/US2014/054891, Dec. 18, 2014, 12 pgs.
Energous Corp., ISRWO, PCT/US2014/054897, Feb. 17, 2015, 10 pgs.
Energous Corp., ISRWO, PCT/US2014/054953, Dec. 4, 2014, 7 pgs.
Energous Corp., ISRWO, PCT/US2014/055195, Dec. 22, 2014, 11 pgs.
Energous Corp., ISRWO, PCT/US2014/059317, Feb. 24, 2015, 13 pgs.
Energous Corp., ISRWO, PCT/US2014/059340, Jan. 15, 2015, 13 pgs.
Energous Corp., ISRWO, PCT/US2014/059871, Jan. 23, 2015, 12 pgs.
Energous Corp., ISRWO, PCT/US2014/062661, Jan. 27, 2015, 12 pgs.
Energous Corp., ISRWO, PCT/US2014/062672, Jan. 26, 2015, 11 pgs.
Energous Corp., ISRWO, PCT/US2014/062682, Feb. 12, 2015, 10 pgs.
Energous Corp., ISRWO, PCT/US2014/068282, Mar. 19, 2015, 13 pgs.
Energous Corp., ISRWO, PCT/US2014/068568, Mar. 20, 2015, 10 pgs.
Energous Corp., ISRWO, PCT/US2014/068586, Mar. 20, 2015, 11 pgs.
Energous Corp., ISRWO, PCT/US2015/067242, Mar. 16, 2016, 9 pgs.
Energous Corp., ISRWO, PCT/US2015/067243, Mar. 10, 2016, 11 pgs.
Energous Corp., ISRWO, PCT/US2015/067245, Mar. 17, 2016, 8 pgs.
Energous Corp., ISRWO, PCT/US2015/067246, May 11, 2016, 18 pgs.
Energous Corp., ISRWO, PCT/US2015/067249, Mar. 29, 2016, 8 pgs.
Energous Corp., ISRWO, PCT/US2015/067250, Mar. 30, 2016, 11 pgs.
Energous Corp., ISRWO, PCT/US2015/067271, Mar. 11, 2016, 6 pgs.
Energous Corp., ISRWO, PCT/US2015/067275, Mar. 3, 2016, 8 pgs.
Energous Corp., ISRWO, PCT/US2015/067279, Mar. 11, 2015, 13 pgs.
Energous Corp., ISRWO, PCT/US2015/067282, Jul. 5, 2016, 7 pgs.
Energous Corp., ISRWO, PCT/US2015/067287, Feb. 2, 2016, 8 pgs.
Energous Corp., ISRWO, PCT/US2015/067291, Mar. 4, 2016, 10 pgs.
Energous Corp., ISRWO, PCT/US2015/067294, Mar. 29, 2016, 7 pgs.
Energous Corp., ISRWO, PCT/US2015/067325, Mar. 10, 2016, 9 pgs.

(56) References Cited

OTHER PUBLICATIONS

Energous Corp., ISRWO, PCT/US2015/067334, Mar. 3, 2016, 6 pgs.
Energous Corp., ISRWO, PCT/US2016/068495, Mar. 30, 2017, 9 pgs.
Energous Corp., ISRWO, PCT/US2016/068498, May 17, 2017, 8 pgs.
Energous Corp., ISRWO, PCT/US2016/068504, Mar. 30, 2017, 8 pgs.
Energous Corp., ISRWO, PCT/US2016/068551, Mar. 17, 2017, 8 pgs.
Energous Corp., ISRWO, PCT/US2016/068565, Mar. 8, 2017, 11 pgs.
Energous Corp., ISRWO, PCT/US2016/068987, May 8, 2017, 10 pgs.
Energous Corp., ISRWO, PCT/US2016/068993, Mar. 13, 2017, 12 pgs.
Energous Corp., ISRWO, PCT/US2016/069313, Nov. 13, 2017, 10 pgs.
Energous Corp., ISRWO, PCT/US2016/069316, Mar. 16, 2017, 15 pgs.
Energous Corp., ISRWO, PCT/US2017/046800, Sep. 11, 2017, 13 pgs.
Energous Corp., ISRWO, PCT/US2017/065886, Apr. 6, 2018, 13 pgs.
Energous Corp., ISRWO, PCT/US2018/012806, Mar. 23, 2018, 9 pgs.
Energous Corp., ISRWO, PCT/US2018/025465, Jun. 22, 2018, 9 pgs.
Energous Corp., ISRWO, PCT/US2018/031768, Jul. 3, 2018, 9 pgs.
Energous Corp., ISRWO, PCT/US2018/031786, Aug. 8, 2018, 9 pgs.
Energous Corp., ISRWO, PCT/US2018/039334, Sep. 11, 2018, 9 pgs.
Energous Corp., ISRWO, PCT/US2018/051082, Dec. 12, 2018, 9 pgs.
Energous Corp., ISRWO, PCT/US2018/058178, Mar. 13, 2019, 10 pgs.
Energous Corp., ISRWO, PCT/US2018/064289, Apr. 25, 2019, 12 pgs.
Energous Corp., ISRWO, PCT/US2019/015820, May 14, 2019, 9 pgs.
Energous Corp., ISRWO, PCT/US2019/021817, Apr. 6, 2019, 11 pgs.
Energous Corp., ISRWO, PCT/US2019/039014, Oct. 4, 2019, 15 pgs.
Energous Corp., ISRWO, PCT/US2019/061445, Jan. 7, 2020, 19 pgs.
Energous Corp., ISRWO, PCT/US2020/015450, May 18, 2020, 8 pgs.
Energous Corp., ISRWO, PCT/US2020/016975, May 15, 2020, 15 pgs.
Energous Corp., ISRWO, PCT/US2020/027409, Jul. 24, 2020, 11 pgs.
Notice of Intent to Issue Reexam Certificate: U.S. Appl. No. 90/013,793 dated Feb. 2, 2017, 8 pgs.
Order Granting Reexamination Request, U.S. Appl. No. 90/013,793 dated Aug. 31, 2016, 23 pgs.
Ossia Inc. vs Energous Corp., Declaration of Stephen B. Heppe in Support of Petition for Post-Grant Review of U.S. Pat. No. 9,124,125, PGR2016-00023, May 31, 2016, 144 pgs.
Ossia Inc. vs Energous Corp., Declaration of Stephen B. Heppe in Support of Petition for Post-Grant Review of U.S. Pat. No. 9,124,125, PGR2016-00024, May 31, 2016, 122 pgs.
Ossia Inc. vs Energous Corp., Patent Owner Preliminary Response, Sep. 8, 2016, 95 pgs.
Ossia Inc. vs Energous Corp., Petition for Post Grant Review of U.S. Pat. No. 9,124,125, May 31, 2016, 86 pgs.
Ossia Inc. vs Energous Corp., Petition for Post-Grant Review of U.S. Pat. No. 9,124,125, May 31, 2016, 92 pgs.
Ossia Inc. vs Energous Corp., PGR2016-00023—Institution Decision, Nov. 29, 2016, 29 pgs.
Ossia Inc. vs Energous Corp., PGR2016-00024—Institution Decision, Nov. 29, 2016, 50 pgs.
Ossia Inc. vs Energous Corp., PGR2016-00024—Judgement-Adverse, Jan. 20, 2017, 3 pgs.
Extended European Search Report, EP14818136.5, dated Jul. 21, 2016, 9 pgs.
Extended European Search Report, EP14822971.9, dated Feb. 10, 2017, 10 pgs.
Extended European Search Report, EP14868901.1, dated Jul. 17, 2017, 6 pgs.
Extended European Search Report, EP15874273.4, dated May 11, 2018, 7 pgs.
Extended European Search Report, EP15876033.0, dated Jun. 13, 2018, 10 pgs.
Extended European Search Report, EP15876036.3, dated May 3, 2018, 9 pgs.
Extended European Search Report, EP15876043.9, dated Aug. 9, 2018, 9 pgs.
Extended European Search Report, EP16189052.0, dated Feb. 10, 2017, 13 pgs.
Extended European Search Report, EP16189300.3, dated Mar. 24, 2017, 6 pgs.
Extended European Search Report, EP16189319.3, dated Feb. 10, 2017, 11 pgs.
Extended European Search Report, EP16189974.5, dated Mar. 13, 2017, 7 pgs.
Extended European Search Report, EP16189982.8, dated Feb. 7, 2017, 11 pgs.
Extended European Search Report, EP16189987.7, dated Feb. 9, 2017, 10 pgs.
Extended European Search Report, EP16189988.5, dated Mar. 13, 2017, 6 pgs.
Extended European Search Report, EP16193743.8, dated Feb. 8, 2017, 9 pgs.
Extended European Search Report, EP16196205.5, dated Apr. 7, 2017, 9 pgs.
Extended European Search Report, EP16880139.7, dated Jul. 12, 2019, 5 pgs.
Extended European Search Report, EP16880153.8, dated Jul. 2, 2019, 9 pgs.
Extended European Search Report, EP16880158.7, dated Jul. 15, 2019, 8 pgs.
Extended European Search Report, EP16882597.4, dated Aug. 7, 2019, 9 pgs.
Extended European Search Report, EP16882696.4, dated Jul. 3, 2019, 10 pgs.
Extended European Search Report, EP17840412.5, dated Jul. 15, 2019, 8 pgs.
Extended European Search Report, EP17882087.4, dated Sep. 17, 2019, 10 pgs.
Extended European Search Report, EP18204043.6, dated Feb. 14, 2019, 5 pgs.
Extended European Search Report, EP18797695.6, dated Nov. 19, 2020, 9 pgs.
Extended European Search Report, EP19214719.7, dated Jan. 17, 2020, 9 pgs.
Adamiuk et al. "Compact, Dual-Polarized UWB-Antanna, Embedded in a Dielectric," IEEE Transactions on Antenna and Propagation, IEEE Service Center, Piscataway, NJ, US vol. 56, No. 2, Feb. 1, 2010, 8 pgs.
Gill et al. "A System for Change Detection and Human Recognition in Voxel Space using the Microsoft Kinect Sensor," 2011 IEEE Applied Imagery Pattern Recognition Workshop. 8 pgs.
Han et al. Enhanced Computer Vision with Microsoft Kinect Sensor: A Review, IEEE Transactions on Cybernetics vol. 43, No. 5. pp. 1318-1334, Oct. 3, 2013.
Hsieh et al. "Development of a Retrodirective Wireless Microwave Power Transmission System", IEEE, 2003 pp. 393-396.
Leabman "Adaptive Band-partitioning for Interference Cancellation in Communication System," Thesis Massachusetts Institute of Technology, Feb. 1997, pp. 1-70.

(56) References Cited

OTHER PUBLICATIONS

Li et al. High-Efficiency Switching-Mode Charger System Design Considerations with Dynamic Power Path Management, Mar./Apr. 2012 Issue, 8 pgs.

Mao et al. "BeamStar: An Edge-Based Approach to Routing in Wireless Sensors Networks", IEEE Transactions on Mobile Computing, IEEE Service Center, Los Alamitos, CA US, vol. 6, No. 11, Nov. 1, 2007, 13 pgs.

Mascarenas et al. "Experimental Studies of Using Wireless Energy Transmission for Powering Embedded Sensor Nodes," Nov. 28, 2009, Journal of Sound and Vibration, 13 pgs.

Mishra et al. "SIW-based Slot Array Antenna and Power Management Circuit for Wireless Energy Harvesting Applications", IEEE APSURSI, Jul. 2012, 2 pgs.

Nenzi et al "U-Helix: On-Chip Short Conical Antenna", 2013 7th European Conference on Antennas and Propagaion (EUCAP), ISBN:978-1-4673-2187-7, IEEE, Apr. 8, 2013, 5 pgs.

Qing et al. "UHF Near-Field Segmented Loop Antennas with Enlarged Interrogation Zone," 2012 IEEE International Workshop on Antenna Technology (iWAT), Mar. 1, 2012, pp. 132-135, XP055572059, ISBN: 978-1-4673-0035-3.

Singh "Wireless Power Transfer Using Metamaterial Bonded Microstrip Antenna for Smart Grid WSN", Fourth International Conference on Advances in Computing and Communitcations (ICACC), Aug. 27-29, 2014, Abstract 1 pg.

Smolders "Broadband Microstrip Array Antennas" Institute of Electrical 1-15 and Electronics Engineers, Digest of the Antennas and Propagation Society International Symposium. Seattle, WA, Jun. 19-24, 1994, Abstract 3 pgs.

Van Veen et al., "Beamforming: A Versatile Approach to Spatial Filtering", IEEE, ASSP Magazine, Apr. 1988, pp. 4-24.

Wei et al. "Design of a Wideband Horizontally Polarized Omnidirectional Printed Loop Antenna," IEEE Antennas and Wireless Propagation Letters, vol. 11, Jan. 3, 2012, 4 pgs.

Zeng et al. "A Compact Fractal Loop Rectenna for RF Energy Harvesting," IEEE Antennas and Wireless Propagation Letters, vol. 16, Jun. 26, 2017, 4 pgs.

Zhai et al. "A Practical Wireless Charging System Based on Ultra-Wideband Retro-Reflective Beamforming" 2010 IEEE Antennas and Propagation Society International Symposium, Toronto, ON 2010, 4 pgs.

Energous Corp., ISRWO, PCT/US2020/067566, Apr. 27, 2021, 12 pgs.

Energous Corp., IPRP, PCT/US2020/067566, Jul. 5, 2022, 8 pgs.

\* cited by examiner

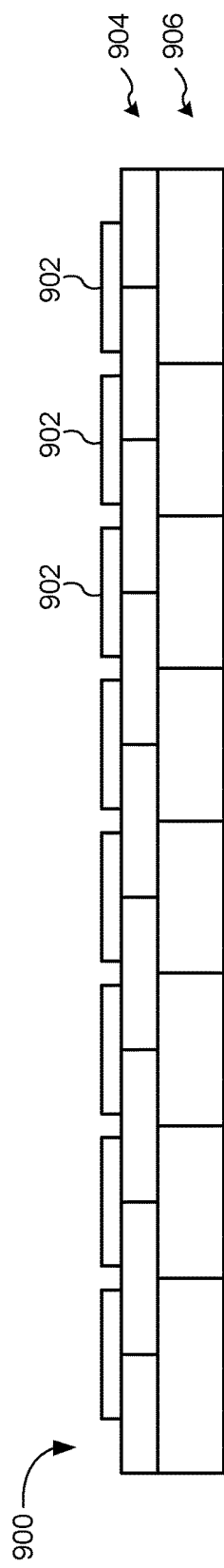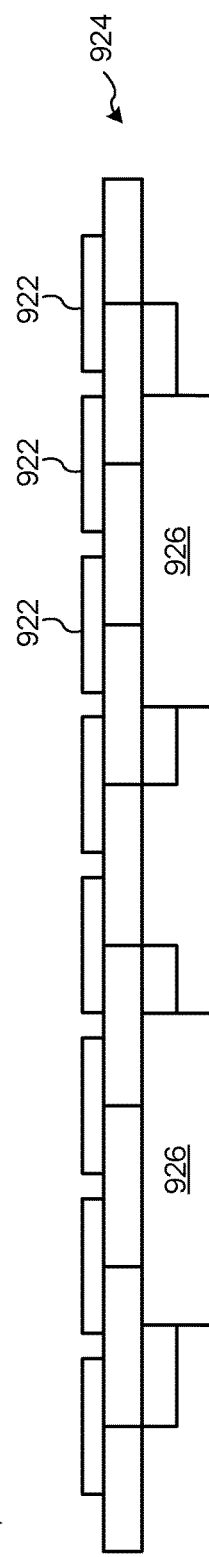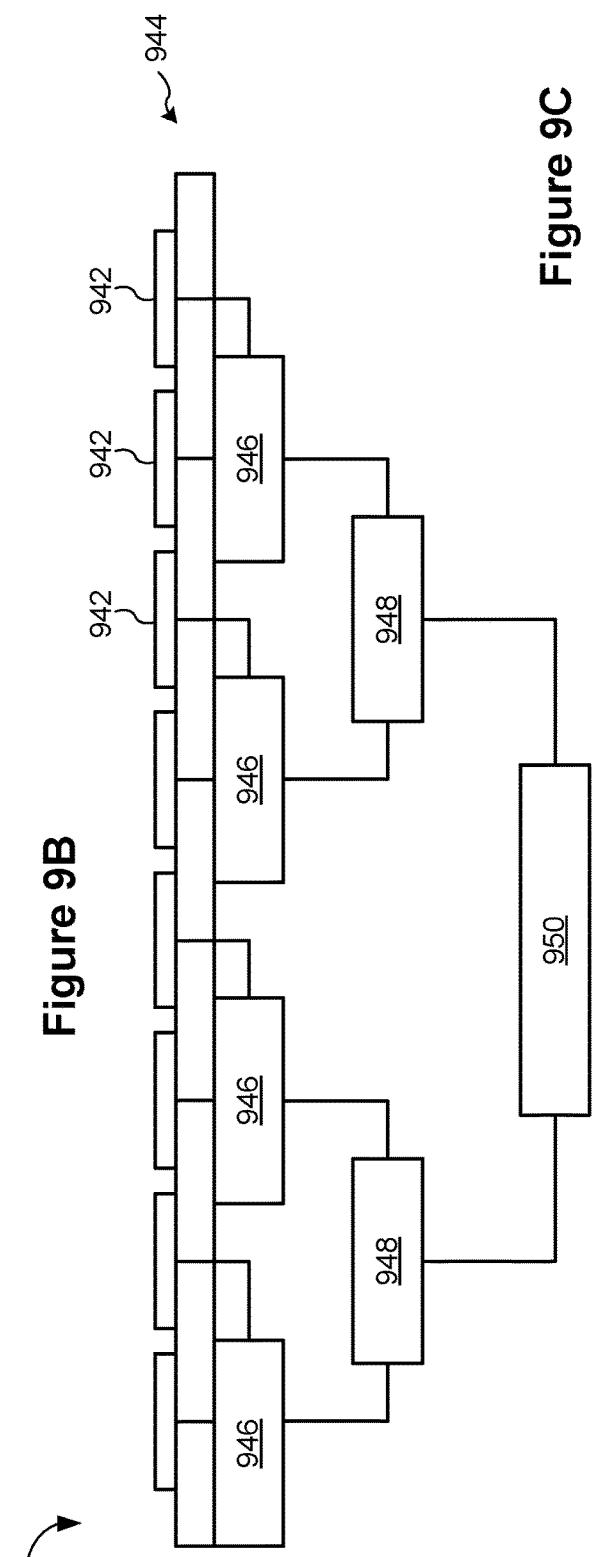

SYSTEMS AND METHODS OF DETERMINING A LOCATION OF A RECEIVER DEVICE AND WIRELESSLY DELIVERING POWER TO A FOCUS REGION ASSOCIATED WITH THE RECEIVER DEVICE

RELATED APPLICATIONS

This application is a continuation of U.S. patent application Ser. No. 15/912,520, filed Mar. 5, 2018 entitled "Systems And Methods Of Wirelessly Delivering Power To A Receiver Device" (the "Parent Application") which is a continuation-in-part of U.S. patent application Ser. No. 13/891,399, filed May 10, 2013 (now U.S. Pat. No. 9,912,199) entitled "Receivers for Wireless Power Transmission," which claims priority to U.S. Provisional Application No. 61/668,799, filed on Jul. 6, 2012, U.S. Provisional Application No. 61/677,706, filed on Jul. 31, 2012, and U.S. Provisional Application No. 61/720,798, filed on Oct. 31, 2012. Each of these applications is hereby incorporated by reference in its respective entirety.

This Parent Application is also a continuation-in-part of U.S. patent application Ser. No. 13/891,445, filed May 10, 2013 (now U.S. Pat. No. 10,103,582) entitled "Transmitters for Wireless Power Transmission," which claims priority to U.S. Provisional Application No. 61/668,799, filed on Jul. 6, 2012, U.S. Provisional Application No. 61/677,706, filed on Jul. 31, 2012, and U.S. Provisional Application No. 61/720,798, filed on Oct. 31, 2012. Each of these applications is hereby incorporated by reference in its respective entirety.

BACKGROUND

People are increasingly relying on electronic devices to perform aspects of everyday life. As an example, many people spend a majority of their day interacting with a computing device, such as a smart phone or tablet computer, in order to obtain information and communicate with others, among other such tasks. The frequent use of these devices can require a significant amount of power, which can quickly drain a battery for devices such as portable computing devices that have relatively small battery lives. A user then must often plug in the device to recharge, which can limit the usefulness of the portable device. Further, a user first has to locate a free outlet, which might be difficult in at least some locations. If a user forgets to plug in or otherwise charge a device, the device can run out of power and then be of no use to the user until the user is again able to charge the device. For frequently used devices, such as remote control units for older electronics or gaming controllers for older systems, the batteries might run out of power in between uses, which can be frustrating for a user.

There have been various approaches to minimizing the impact of the charging needs of these devices. In some cases the devices have replaceable rechargeable batteries, such that a new set of batteries can be used if the current set runs out of power. Such an approach requires a user to carry around extra batteries, and also ensure that these extra batteries are charged. Some approaches involve a mat or pad that is able to charge a device without physically connecting a plug of the device, but such an approach still requires the device to be placed in a certain location for a certain amount of time in order to charge, which limits the improvement over physical power connections. Even for devices that do not run from battery power, the need to place these devices within a distance of a power outlet or other such component can limit the usefulness or flexibility of these devices. As users continue to use these devices, and as the number and type of devices grow, there is a desire to improve the way in which power can be delivered to these and other such devices.

BRIEF DESCRIPTION OF THE DRAWINGS

In order that the present invention may be more clearly ascertained, some embodiments will now be described, by way of example, with reference to the accompanying drawings, in which:

FIGS. 9A-9C illustrate example logical schematics for implementations of a flat panel antenna array such as that illustrated in FIG. 8, which can be utilized in accordance with various embodiments;

DETAILED DESCRIPTION

Embodiments described in accordance with the various embodiments overcome at least some of the aforementioned and other deficiencies in conventional approaches to power delivery. In particular, various embodiments enable power to be delivered wirelessly, without the need for a physical connection between a source and a recipient of the power delivery. In at least some embodiments, a transmitter can be used that includes two or more antennas in communication with control circuitry and/or components. The transmitter can utilize an approach such as "beamforming" to direct a signal, such as a radio frequency (RF) signal, in a determined direction. The transmitter can also utilize the antennas to determine the location of a receiver of the power transmission, in order to determine how to adjust the antennas to deliver the power to the appropriate location, as well as to determine how to "form" the beam in order to provide for an appropriate amount of focusing of the signal, such as may correspond to a size of an antenna array of a receiver of the target device.

The power can be received by a receiver component, which can be part of, connected to, or separate from a device to be powered. The receiver can include one or more antennas for receiving the signal from the transmitter, and components or circuitry useful in converting the signal into power for powering a device, charging a battery, or performing another such function. The receiver can communicate with the transmitter using the antennas, and in at least some embodiments each can also include at least one wireless communication component for communicating information over a sideband channel. Such an approach can help the transmitter to ensure that power is being delivered to the appropriate device, and that the device (or user of the device) is "authorized" or otherwise has permission to receive power from the transmitter. Further, the transmitter can receive information about a current battery state or power level from the device, for example, and can deliver power only when power is necessary. The ability to transmit power only when power is needed and where it is needed can help to improve the overall efficiency of the power delivery system.

Various other functions and advantages are described and suggested below as may be provided in accordance with the various embodiments.

Approaches in accordance with various embodiments can take advantage of one of a plurality of advanced power communication antenna designs. These designs can be implemented on any appropriate device that relies on power for at least a portion of its operation or intended function, such as may include a smart phone, a tablet computer, a television remote, or a child's toy, among many other such devices.

Figure 1:
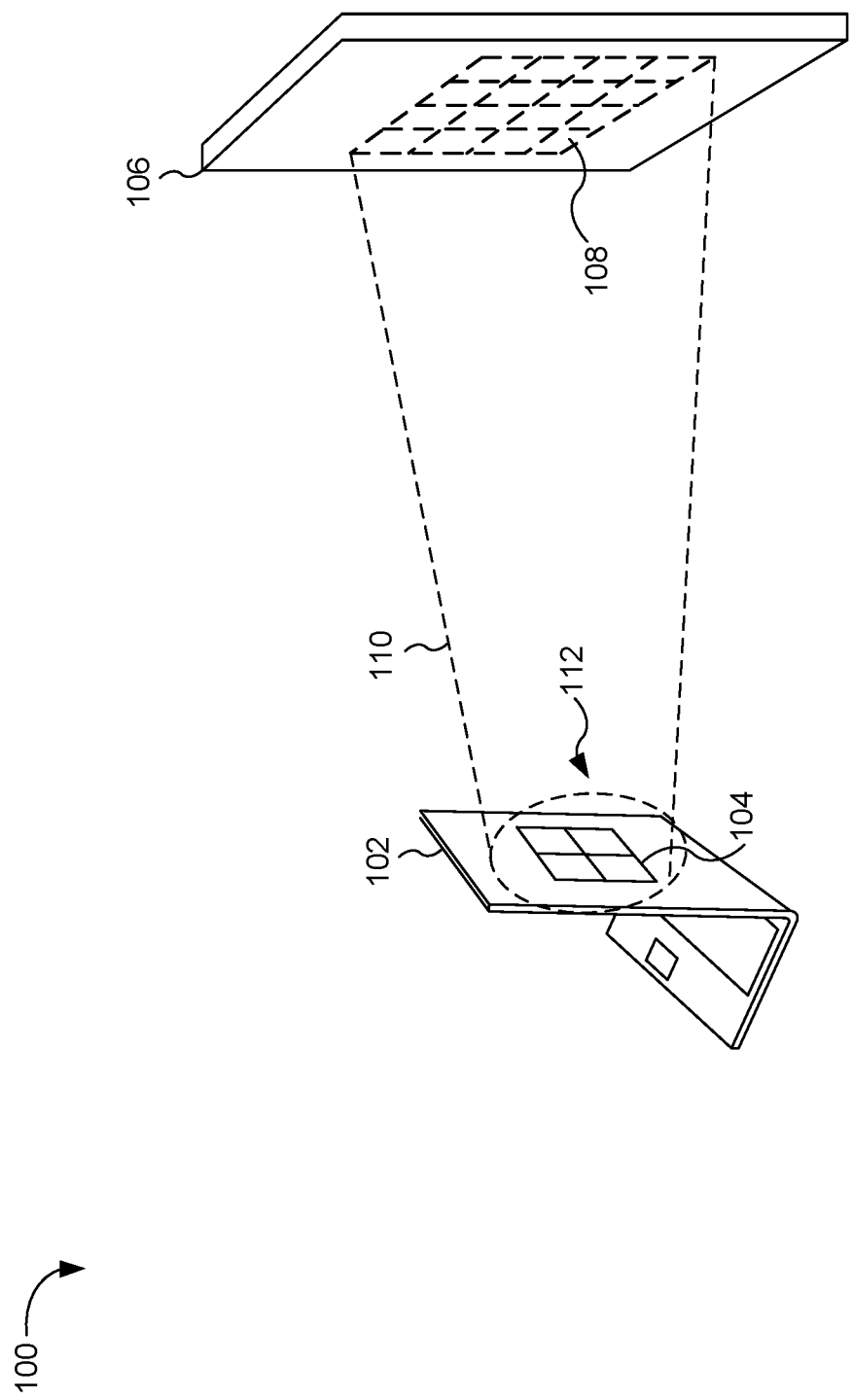
FIG. 1 illustrates a situation in which power can be delivered wirelessly in accordance with one embodiment.

As an example, FIG. 1 illustrates an example situation 100 wherein a notebook computer 102 is connected to a receiver 104 including an antenna array that is configured to receive a transmitted signal from a transmitter 106, which also includes an array of antennas 108. The array in this example includes a plurality of "flat" elements with one or more desired polarizations, including vertical pole, horizontal pole, circularly polarized, left hand polarized, right hand polarized, or a combination of polarizations. The receiver 104 for the notebook computer 102 can be embedded in the computer, such as may be contained behind a screen of the notebook, attached to a back of the notebook computer, or connected to the notebook computer as part of a separate component, among other such options. Since the array is associated with a portable device in this situation, the receiver will be referred to as a mobile receiver 104. The mobile receiver in this embodiment can communicate with the notebook computer over a wired or wireless connection, as discussed elsewhere herein. In at least some embodiments, the receiver can communicate with the notebook to determine a current power level of the device, as well as to obtain other information such as a type of device, device identifier, user identifier, and the like. As discussed, any appropriate electronic device can be used with receivers discussed herein, and the notebook computer is just one example of this type of device, as may also include smart phones, remote controls, toys, tablet computers, media players, gaming systems and controllers, and the like. Further, while the mobile receiver 102 is illustrated as communicating with a power transmitter 106, it should be noted that communications with any viable target are equally possible. This can include, for example, other mobile devices or other mobile platforms.

The antenna of the mobile receiver 104 can include one or more antenna elements as discussed herein, which can include at least one omni-antenna, directional antenna, array of antennas, or flat paneled system. In some embodiments, novel flat panel systems are usable, as will be discussed in greater detail below. Regardless of the type of antenna used, a directional beam 110 can be directed from the transmitter 106 to the receiver 104. Directionality can be accomplished through any appropriate mechanism, as may include physical geometry (i.e., parabolic dish) or through signal reinforcement/interference (i.e., beamforming). The term "beamforming" derives from the fact that early spatial filters were designed to form pencil beams in order to receive a signal radiating from a specific location and attenuate signals from other locations. "Forming beams" seems to indicate radiation of energy; however, beamforming is applicable to either radiation or reception of energy.

Systems designed to receive spatially propagating signals often encounter the presence of interference signals. If the desired signal and interferers occupy the same temporal frequency band, temporal filtering cannot be used to separate signal from interference. However, the desired and interfering signals usually originate from different spatial locations. This spatial separation can be exploited to separate signal from interference using a spatial filter at the receiver. Implementing a temporal filter requires processing of data collected over a temporal aperture. Similarly, implementing a spatial filter requires processing of data collected over a spatial aperture.

In some embodiments, a beamformer linearly combines the spatially sampled time series from each sensor to obtain a scalar output time series in the same manner that an FIR (finite impulse response) filter linearly combines temporally sampled data. Spatial discrimination capability depends on the size of the spatial aperture; as the aperture increases, discrimination improves. The absolute aperture size is not important in at least some embodiments, rather its size in wavelengths is an important parameter. A single physical antenna (continuous spatial aperture) capable of providing the requisite discrimination is often practical for high frequency signals since the wavelength is short. However, when low frequency signals are of interest, an array of sensors can often synthesize a much larger spatial aperture than that practical with a single physical antenna. Note each composite antenna represents a sensor in some embodiments.

A second very significant advantage of using an array of sensors, relevant at any wavelength, is the spatial filtering versatility offered by discrete sampling. In many application areas it is necessary to change the spatial filtering function in real time to maintain effective suppression of interfering signals. This change is easily implemented in a discretely sampled system by changing the way in which the beamformer linearly combines the sensor data. Changing the spatial filtering function of a continuous aperture antenna is impractical.

Beamforming takes advantage of interference to change the directionality of the array whereby constructive interference generates a beam and destructive interference generates the null space. If one issue of current communication antennas on mobile platforms is the inherent cost, bulk and unreliability of moving mechanical bases, it can be desirable to use and be able to change the direction in which RF emissions radiate using non-mechanical means. Beamforming using a smart antenna array, during transmission, is accomplished by controlling the phase and/or relative amplitude of the signal at each transmitter, in order to create a pattern of constructive and destructive interference in the wave front. Similarly, when receiving, information from different sensors is combined in such a way that the expected pattern of radiation is preferentially observed (null steering).

The ability to beamform in this manner requires a minimum of two antennas in the antenna array. This directionality benefit of beamforming has been known generally by those skilled in the art for some time. In general, beamforming may be accomplished in a number of ways, as known by those skilled in the art. For an example of a particular method of implementing directional beamforming, see: B. D. V. Veen and K. M. Buckley. Beamforming: A versatile approach to spatial filtering. IEEE ASSP Magazine, pages 4-24, April 1988.

An additional example of the mathematics behind beamforming may be found in the article by Michael Leabman entitled "Adaptive Band-Partitioning for Interference Cancellation in Communication Systems," Massachusetts Institute of Technology Press, February 1997.

Most array literature specifies spatial dependence in terms of "angles" which is intuitive. It is also possible to define the wavenumber variable $\vec{k}$ which is a spatial vector in terms of Euclidean space, where, $|\vec{k}|=\omega/c$, $\omega$ being the radian frequency, ($2\pi f$), and c being the propagation speed in free space. Thus $|\vec{k}|=\omega/c=2\pi f/c=2\pi/\lambda$ has dimensions of 1/length, where the wavelength $\lambda=f/c$, and $c=3*10^8$ m/s for radio waves. While the standard angular representation does describe the response over the region for all real signals, the full wavenumber space, or 'virtual' space, is more useful in analyzing the consequences of spatial aliasing.

Now consider an array of N elements sampling an area of space where the element locations are governed by $[\vec{z}_i, i=1, \ldots, N]$. The output from each sensor is input to a linear, time invariant filter having the impulse response $w_i(\tau)$. The outputs of the filter are summed to produce the output of the array y(t), $$y(t) = \sum_{i=1}^{N} \int_{-\infty}^{\infty} w_i(t-\tau)x(\tau, \vec{z}_i)d\tau$$

Using the Fourier representation for a space-time signal, a plane wave $x(t, \vec{z}_i)$ of a single frequency may be represented by a complex exponential in terms of a radian frequency w, and vector wavenumber $\vec{k}$:

$$x(t,\vec{z})=e^{j(wt-\vec{k}\cdot\vec{z}_i)}$$

The array response to a plane wave is as follows:

$$y(t) = \sum_{i=1}^{N} \int_{-\infty}^{\infty} w_i(t-\tau)x(\tau, \vec{z}_i)d\tau$$

$$= \sum_{i=1}^{N} \int_{-\infty}^{\infty} w_i(t-\tau)e^{j(\omega t-\vec{k}\cdot\vec{z}_i)}d\tau$$

$$= \sum_{i=1}^{N} \int_{-\infty}^{\infty} w_i(t')e^{-j\omega t'}e^{-j\vec{k}\cdot\vec{z}_i}e^{j\omega t}d\tau' \text{ where } \tau=t-t'$$

$$= \sum_{i=1}^{N} w_i(\omega)e^{j(\omega t-\vec{k}\cdot\vec{z}_i)}$$

letting, $$W(\omega) = \begin{bmatrix} w_1(\omega) \\ \vdots \\ w_N(\omega) \end{bmatrix} \text{ and } E(k) = \begin{bmatrix} e^{-j\vec{k}\cdot\vec{z}_1} \\ \vdots \\ e^{-j\vec{k}\cdot\vec{z}_N} \end{bmatrix}$$

becomes $y(t)=W^+(\omega)E(k)e^{j\omega t}$ where $W(\omega, \vec{k})=W^+(\omega)E(k)$ is the frequency wavenumber response. The frequency wavenumber response evaluated versus direction $\vec{k}$, is known as the beampattern, $$B(a(\theta, \phi)) = W(\omega, \vec{k})|_{k=\frac{2\pi}{\lambda}a(\theta,\phi)'}$$

where $\alpha(\theta, \phi)$ is the unit vector in spherical coordinates.

The most widely used array, suitable for some embodiments, is a linear uniformly weighted array with N elements and an inter-element spacing of $\Delta z$. Note such an array is used by way of example, and other array designs are considered within the scope of various embodiments.

If a frequency independent uniform weighting of 1/N is used, a frequency wavenumber response is arrived at:

$$W(\omega, k) = \frac{1}{N}\sum_{n=-\frac{N-1}{2}}^{\frac{N-1}{2}} e^{-j\vec{k}\cdot\hat{a}_z n\Delta z}, \text{ where } k\cdot\hat{a}_z = k_z = \frac{\sin c\left(k_z\frac{L}{2}\right)}{\sin c\left(k_z\frac{\Delta z}{2}\right)}$$

Evaluating for $k_z=\|k\|\sin(\emptyset)=\sin(\emptyset)$, where (⊖) is defined with respect to the angle to the z axis, a beampattern is calculated as:

$$B(\omega, \theta) = \frac{\sin c\left(2\pi \sin(\theta)\frac{L}{2\lambda}\right)}{\sin c\left(2\pi \sin(\theta)\frac{\Delta z}{2\lambda}\right)}, \text{ where } L = N\Delta z$$

In some embodiments, combinations of beams and nulls may be utilized in order to increase gain in the target axis, while reducing the effective (or equivalent) isotropic radiated power (EIRP) in off axis angles. With more antennas on the array the number of beams/nulls is extendable to meet any specialized requirements.

Figure 2:
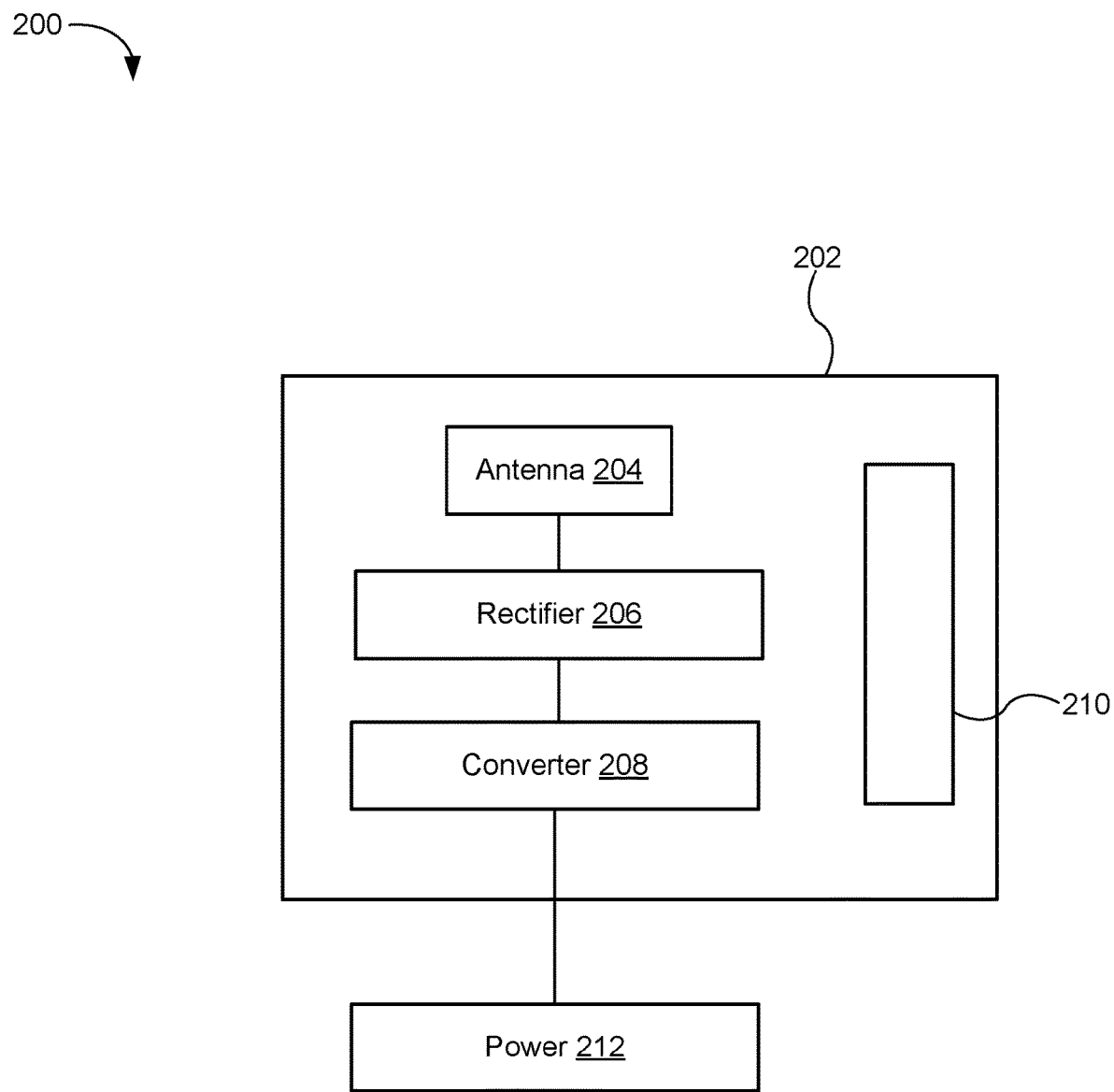
FIG. 2 illustrates an example of a receiver that can be used in accordance with various embodiments.

In order to transfer power using a beamforming (or other such) approach, an example system includes at least one transmitter and at least one receiver. A component level example of a receiver 200 is illustrated in FIG. 2. As discussed, the receiver includes at least one antenna element 204 operable to receive a signal of the desired wavelength. The antenna typically will be contained in some type of housing 202, which can include a housing dedicated to the receiver or a housing of an electronic device, where the receiver is embedded in the device. Other such configurations can be utilized as well. The housing can be made of any appropriate material, such as a plastic, hard rubber, or other such material that enables transmission of the signal to be received. The receiver can also include, internal or external to the housing 202, at least one rectifier 206 and at least one converter 208. The rectifier 206 can include any components known or used for such purposes, as may include at least one diode, capacitor, and resistor, among other such options. The rectifier is configured to convert the signal (e.g., an RF signal) received by the antenna 204 into a voltage (e.g., DC). Conventional or novel rectifiers can be used for such purposes in various embodiments. In some embodiments, as discussed elsewhere herein, the receiver can include multiple antennas and/or rectifiers in order to increase performance and efficiency, as well as to enable the receiver to scale in capacity.

The receiver in this example can also include at least one converter 208, such as a DC-to-DC converter, that enables the receiver to output or provide the intended voltage. In one embodiment the receiver puts out a voltage in the range of about five volts to about 40 volts, while in other embodiments a receiver can output down to a quarter of a volt or less, or up to hundreds or even thousands of volts or more using scaling approaches discussed and suggested elsewhere herein. The converter in this example can take any power coming from the rectifier 206 and ensure that five volts are being output, such as to a battery 212 for charging. As discussed elsewhere herein, it should be understood that the power can be output to any appropriate device, system, component, or service, and in some embodiments can be the sole power source for an electronic device that might not include a dedicated battery or power source. Other such options can be used as well.

In some embodiments, the receiver can use the antenna(s) 204 to communicate with a transmitter, such as by "chirping" or generating a short signal (e.g., RF) that can be received by a transmitter or other such device. In some embodiments, the receiver can additionally (or alternatively) utilize at least one communications component 210 in order to communicate with other devices or components. The communications component can be internal or external to the housing, and in some embodiments the receiver can leverage at least one communications component of a device to which the receiver is connected, or into which the receiver is embedded, among other such options. In at least some embodiments the communications component 210 enables the receiver to communicate using a wireless protocol. The wireless protocol can be a proprietary protocol, or in at least some embodiments can utilize a known or conventional wireless protocol in order to enable the receiver to communicate with additional types of devices. For example, the communications component can enable the receiver to communicate over a Bluetooth® channel, Wi-Fi, ZigBee, etc. As mentioned, the communications component can be used to transfer information such as an identifier for the device or a user of the device, and can also be used to transfer battery level information for a connected device, geographic location data, or other such information that can be useful in determining when to send power to the receiver, as well as the location at which to send the power beam. The communication can also include information about the receiver itself, such as the number of antenna elements, size and arrangement of those elements, power capacity, and other such information that can help to determine the size at which to focus the beam, as well as how much power should be transmitted via the beam. Other such information can be communicated as well, such as account information for use in charging the user for the power, or ensuring that the user, device, and/or receiver is authorized to receive power. Various other information can be transmitted as well in other embodiments.

A receiver can include other communication components as well. For example, the receiver housing 202 might include at least one lighting or display element, such as an LCD display or at least one LED, which can display or flash information that can be detected by a camera or sensor of another device, transmitter, or other such component. Similarly, the receiver might include at least one audio component, such as a speaker or microphone, that enables location determination via sonic triangulation or other such methods. Various other communication approaches can be utilized as well, as should be apparent.

Figure 3:
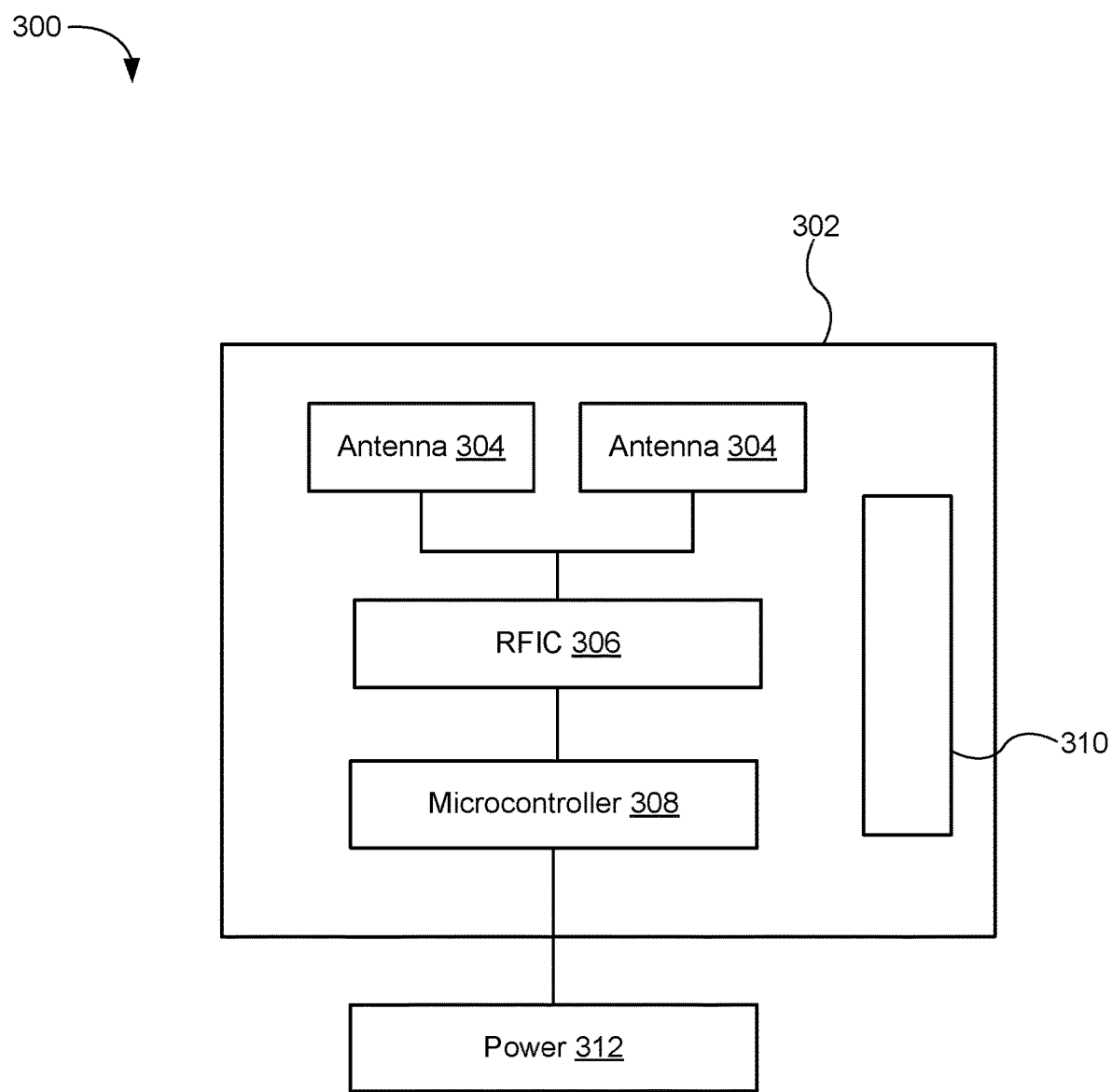
FIG. 3 illustrates an example transmitter that can be used in accordance with various embodiments.

FIG. 3 illustrates an example of a transmitter 300 that can be used to transmit power to a receiver such as that illustrated in FIG. 2. In this example, the transmitter includes at least two antenna elements 304 in order to be able to perform beamforming and/or signal direction for purposes of power transmission. In this example the antenna can be a patch or flat antenna with a diameter on the order of a quarter of an inch to ten inches, with a diameter of at least four inches in some embodiments. The antennas in at least some embodiments can be arranged in a flat array, while in other embodiments two or more orientations of the antenna elements can be used. In some embodiments the transmitter uses at least eight antenna elements, and in some embodiments 256 elements or more can be used for beamforming. As discussed elsewhere herein, however, any appropriate number, size, type, and configuration of antenna elements can be used based at least in part upon the power, distance, efficiency, and other such requirements of the system. Also as discussed, the antenna elements can have at least one polarization, or can have a selection of polarizations. These polarizations can include, for example, vertical pole, horizontal pole, circularly polarized, left hand polarized, right hand polarized, or a combination of polarizations. A transmitter might include a combination of horizontal and vertical polarizations, or might include circular polarization, in order to maximize the directionality and efficiency of the power transmission, as a receiver might be in any of a number of orientations with respect to the transmitter, and there might be various obstructions or path directions that might advantageously utilize specific polarizations. The selection of polarizations can vary for different use cases and embodiments. Further, in some embodiments the antenna elements 304 may be located on more than one surface of the transmitter.

The transmitter can include, internal or external to a housing 302 of the transmitter, at least one signal generation component, such as an analog RF component. In this example, the transmitter includes at least one RF integrated circuit (RFIC) 306 including a plurality of analog RF circuits and/or components that are operable to control aspects of the antenna elements 304, as may include the gain and/or phase of those elements, in order to form and steer a beam with the desired properties (e.g., direction, focus, power level, etc.). In at least some embodiments the RFIC is placed as close to the antenna elements as is practical, in order to minimize losses. One or more digital controllers, such as at least one microcontroller 308, can be attached to the analog RF circuitry in order to control aspects such as when a beam is formed, the direction for the beam, and other such aspects. The microcontroller can be any appropriate microcontroller, such as a PIC-class microprocessor. At least some transmitters can include more than one layer of digital and/or analog RF circuits. Further, in some embodiments each antenna element or a subset of the antenna elements can be connected to a corresponding RF circuit, which can then be connected to one or more microcontrollers.

The housing 302 of the transmitter can take any appropriate form, and can be made of any appropriate material as discussed for the receiver housing. For flat antenna arrays, the receiver housing might take the form of a relatively flat housing, such as may be hung on a wall or ceiling, embedded into a panel, etc. Various other forms can be utilized as well. In some embodiments, the antenna elements and RFIC elements might be included in a first housing, with at least some of the other components being in a separate housing. For example, a power supply 312 and plug for connecting to an outlet or other power source might be part of a "base station" or component that can be placed near an outlet, on a table, on a floor, or in another appropriate location. The base station might be connected to a separate "antenna panel" including the antenna elements and RFIC components, among other possible elements such as one or more microcontrollers, in order to enable the panel to be placed in any appropriate location independent of a location of the base station. The use of a separate base station also enables alternate and/or additional array panels to be utilized without having to purchase or obtain an additional or alternate base station. The base station, antenna panel, or other transmitter also can include at least one communication component 310, as discussed with respect to the receiver, in order to communicate with one or more receivers. In some embodiments, a transmitter might include multiple communication components in order to communicate with devices or receivers using different communication protocols. As discussed, the transmitter also can use the antennas, a camera, a sensor, a display, an LED, or another such element to enable, or assist with, communication. The transmitter can also be very low band with respect to other transmission technologies, such as the 2.4 GHz or 5.8 GHz of Wi-Fi.

Figure 4:
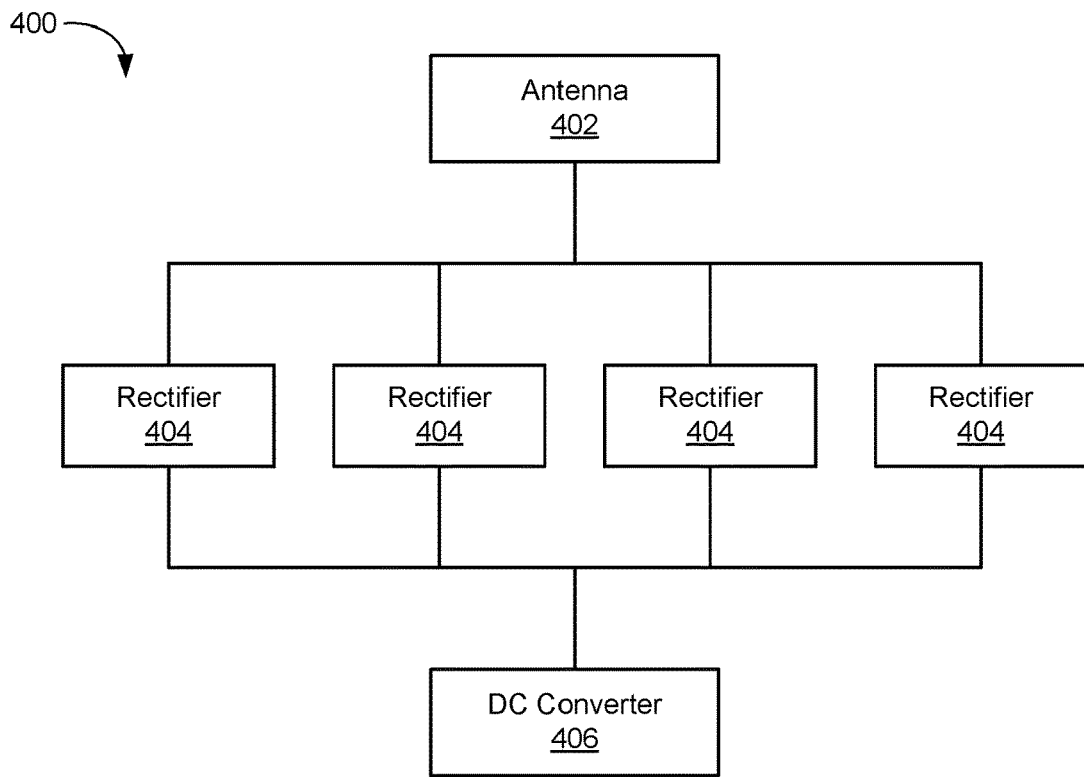
FIG. 4 illustrates a first receiver configuration that can be used in accordance with various embodiments.

The transmitter can thus focus a beam to an appropriate location and size associated with the antenna(s) of the receiver, which can then be rectified by the rectifier of the receiver. The components of the rectifier such as the diode, however, can become relatively expensive as the power requirements increase. This can have the unfortunate result of increasing the cost of the receiver to a point that might make the system impractical or at least too expensive for certain users or applications. Accordingly, approaches in accordance with various embodiments can take advantage of multiple, lower power rectifiers that are significantly cheaper than equivalent higher power rectifiers. FIG. 4 illustrates a configuration 400 wherein multiple rectifiers 404 are connected in parallel between an antenna element 402, or antenna array, and a DC converter 406 of the receiver. In an example where the receiver is attempting to convert 10 Watts, a large and expensive diode would be needed if only a single diode was to be used, as the diode dictates the amount that can be converted. There are relatively inexpensive diodes that can handle smaller amounts, such as on the order of a quarter of a Watt, although other size diodes can be used as well based on factors such as cost, space, etc. By using multiple, smaller rectifiers in parallel, the RF signals received by the antenna element can go through multiple parallel circuits, each of which can handle a portion of the wattage. In at least some embodiments, the wattage can be combined at the DC converter 406. In other embodiments, there might also be multiple converters in parallel, and once the signal is converted to DC a conventional battery or power component can combine the power as needed.

There can be any appropriate number of rectifiers used. In some embodiments there can be two, four, six, or eight rectifiers (e.g., 2.5 GHz rectifiers) per antenna, depending at least in part upon the amount of power to be converted. In an example where power is to be provided to a notebook computer that requires twenty Watts, the receiver might include a single RFIC that includes a set of diodes arranged in parallel, or the receiver might include multiple RFIC elements connected in parallel. Other such configurations can be utilized as well within the scope of the various embodiments.

Figure 5:
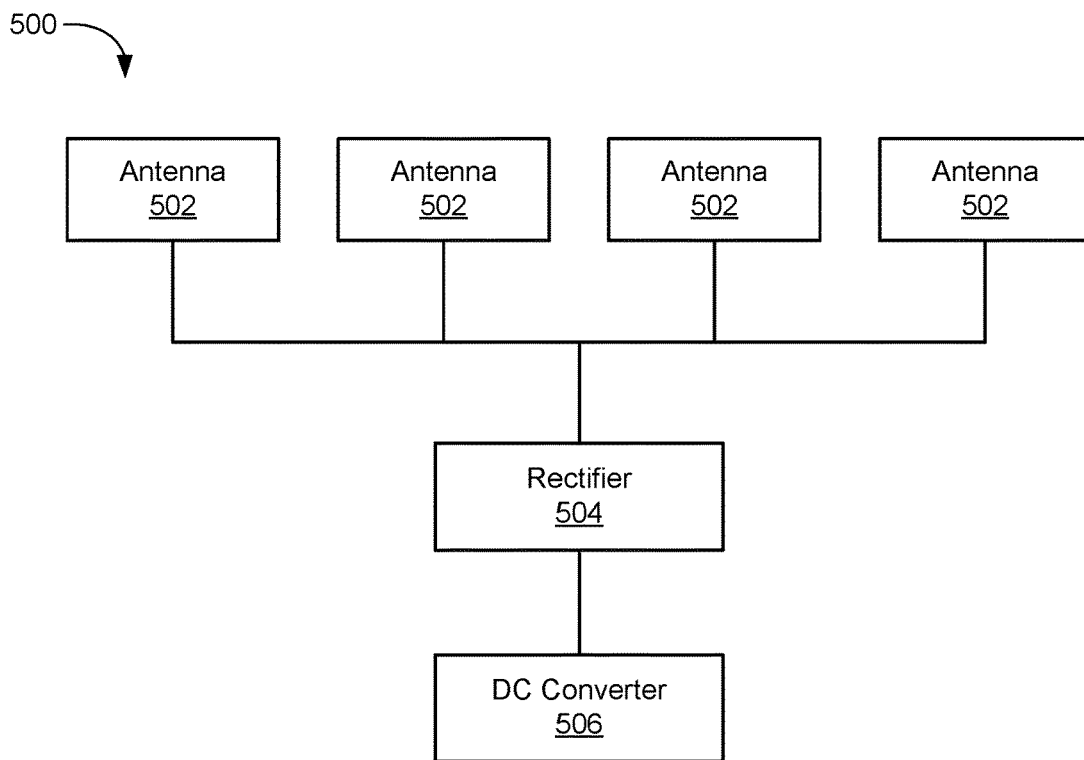
FIG. 5 illustrates a second receiver configuration that can be used in accordance with various embodiments.

In at least some embodiments, it also can be desirable to utilize multiple, independent antenna elements as well. For example, FIG. 5 illustrates an example configuration 500 wherein multiple antenna elements 502 are connected in parallel to a rectifier 504 and DC converter 506. In this example, each antenna might be able to handle a certain wattage, such as about one Watt each. Similar to the rectifiers and converters, the capacity of the receiver can be scaled by increasing the number of antenna elements to provide the necessary capacity. In the example where a notebook computer requires 20 Watts, if each antenna element can handle one Watt then twenty antenna elements can be combined in order to deliver the appropriate capacity. In embodiments where each antenna element is a small patch, for example, there can be enough room on (or within) the casing of the computer to embed multiple antenna elements, such as four antenna elements or more. Each antenna element can be connected to one or more rectifiers, or a subset of the antenna elements can be connected to one of a set of rectifiers, among other such options that can also be selected based upon factors such as cost, space, and capacity, among others. For example, if 20 Watts are needed and each antenna can handle 1 Watt, then 20 antenna elements might be used. Further, if each rectifier diode can handle ¼ Watt, then four rectifiers are needed in parallel for each antenna in this example. The rectifiers can be separate, or at least some can be contained on one or more chips or boards that have an appropriate number of inputs. Other configurations and options can be used as well within the scope of the various embodiments. In at least some embodiments, the number of antenna elements that can be used might be limited by the size of the receiver housing or the size of the beam that can be transmitted by the transmitter, among other such factors.

Figure 6:
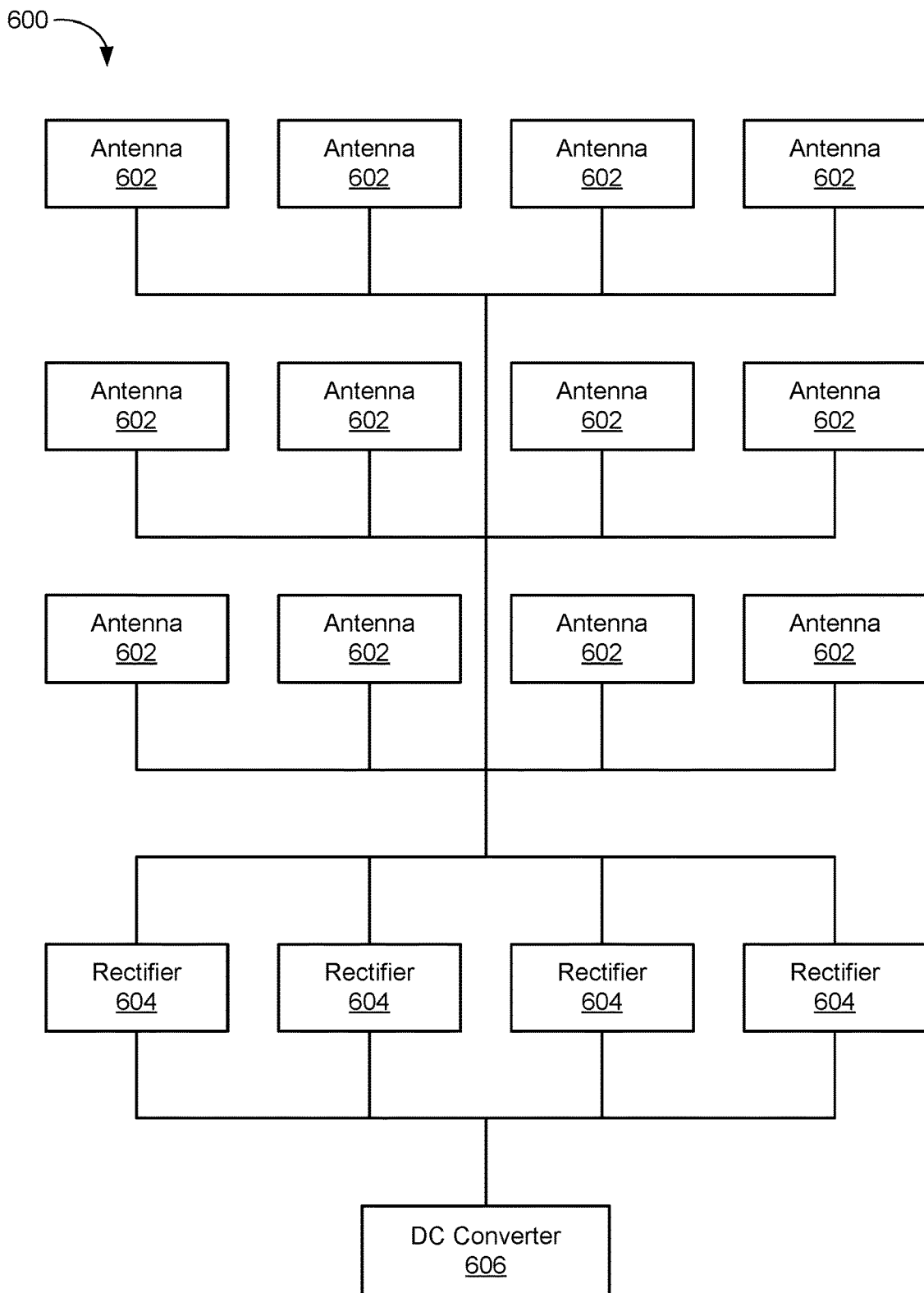
FIG. 6 illustrates a third receiver configuration that can be used in accordance with various embodiments.

FIG. 6 illustrates an example configuration 600 that can be used for a receiver in at least some embodiments. In this example, a number of antenna elements 602 are combined and their output is split across an array of rectifiers 604 configured to process the output in parallel. As discussed, it can be desirable in at least some embodiments for the rectifiers to be as close to the antennas as possible. Thus, although the rectifiers are shown "below" the antenna array in this example, it should be understood that in at least some embodiments the rectifiers can be behind or "within" the array in order to shorten the average path length and reduce losses. Further, in some embodiments each antenna can be connected to a dedicated rectifier, in order to further shorten the paths between the antennas and the rectifiers.

Figure 7:
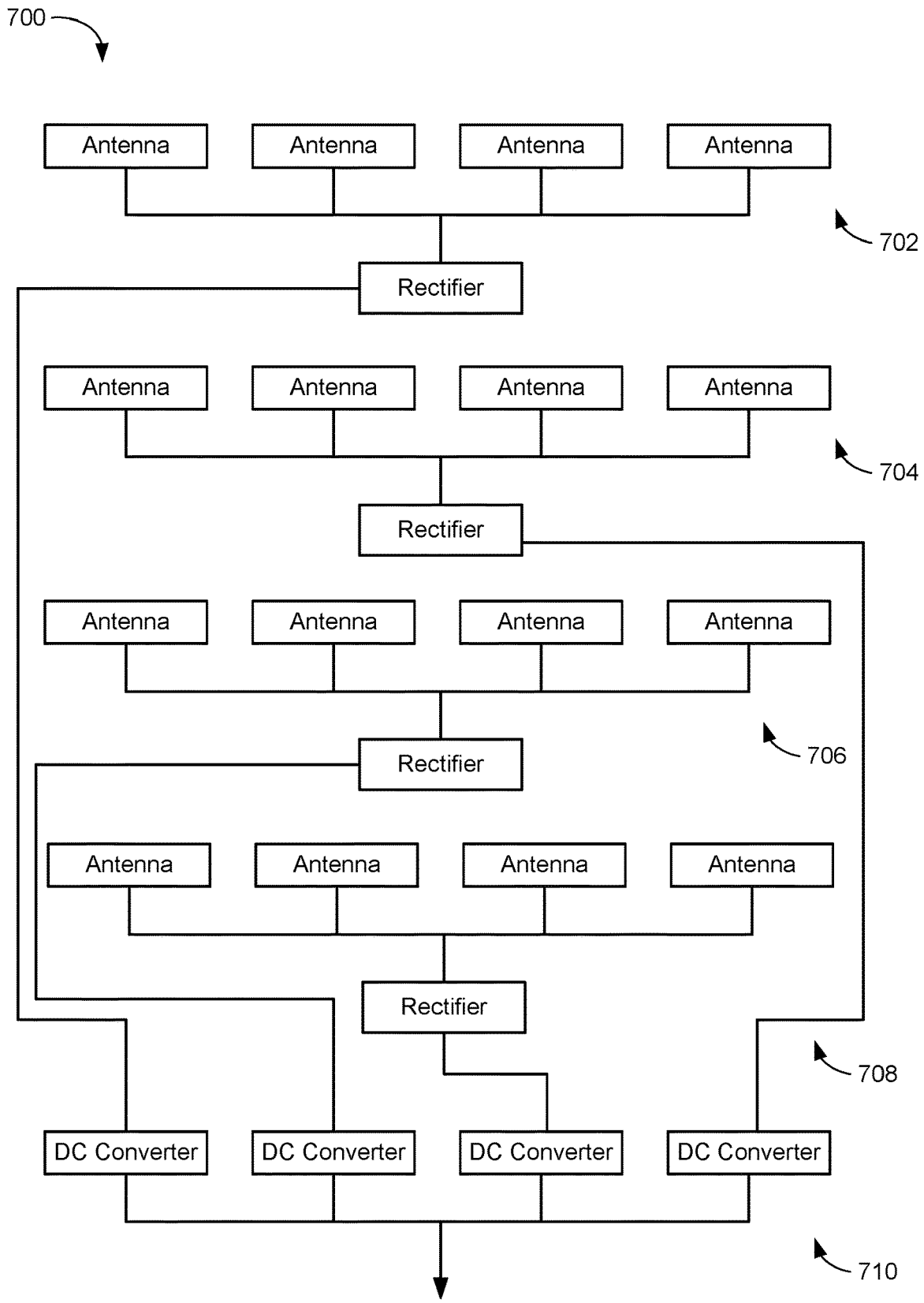
FIG. 7 illustrates a fourth receiver configuration that can be used in accordance with various embodiments.

FIG. 7 illustrates yet another configuration 700, wherein the receiver includes a group of antenna/rectifier sets 702, 704, 706, and 708. Each of these sets can include a subset of the number of antenna elements in the array (e.g., one or more), and can include at least one rectifier. Such an approach enables each rectifier to be very close to the respective antenna(s). The output from each rectifier can then be combined either before or after the converter for the receiver. In this example the receiver also includes a number of converters 710, where each converter receives the output from one of the antenna/rectifier sets, and the output from the converters is then combined. It should also be understood that the output from the sets could be combined before the converters, which could then process the output in parallel. Various other options can be utilized as well in accordance with the various embodiments.

In these and other embodiments, a converter is capable of outputting a specific voltage, such as five volts in some examples, by converting any power or voltage coming in. As the amount of power increases the speed at which a battery or other such power source can be charged. Thus, it can be desirable in at least some embodiments, and where cost and space provide, for example, to include additional elements than are necessary to charge a particular device, in order to charge that device in less time. When multiple receivers are used with a single transmitter, for example, this can also improve the ability for a receiver to receive power when needed, as less time will be dedicated to other receivers. In one example, a device that can be charged using one Watt can be charged in 20% of the time it would take using one Watt by receiving five Watts. Further, the number of antenna elements on a receiver can, in at least some embodiments, also improve the efficiency of the wireless power delivery. In some embodiments, each receiver includes a number of antenna elements, such as ten elements, in order to provide for a range of power amounts, which can increase charging speed for at least some devices, and can guarantee a minimum efficiency of the power delivery. It should be understood that the efficiency and capacity also can be a factor of the number of antenna elements on the transmitter side. In some embodiments, a number of antenna elements can be determined for desired performance, and that number can be split among the transmitter and the receiver. For size, cost, and various other reasons, it will be the case in many embodiments that it will be more practical to place more of the antenna elements in the transmitter than in the receiver. Further, the number of elements needed on the transmitter is a function of the number of elements on the receiver. If it is desirable to put 1,000 antennas on the transmitter, the same basic functionality can be achieved by placing ten antenna elements on the receiver and one hundred on the transmitter, as one element on the receiver side is roughly equivalent to about ten such elements on the transmitter side. In at least some embodiments, then, it can be desirable to place as many antenna elements (up to a potential target number of elements) as is practical. This is further advantageous in at least some instances as receivers can be cheaper to manufacture (and purchase) than receivers for at least some systems. In some embodiments receivers have on the order of from about ten elements to over one-hundred elements, such as forty elements in one example receiver device.

In at least some embodiments, the beam from the transmitter to the receiver is formed along the path of least resistance. For example, if there is an object positioned between the transmitter and the receiver, the transmitter might form the beam to reflect from the ceiling or a wall, which can have less attenuation than the object. Further, although the levels utilized for various applications are safe to operate around humans, such an approach can be further desirable as energy is sent around people instead of through them.

As discussed, although receivers in accordance with certain embodiments utilize single polarizations, it can be desirable in at least some embodiments to include antenna elements of multiple polarizations in a receiver. The use of multiple polarizations can be particularly beneficial for certain types of devices such as portable or mobile devices, where the orientation of the device will change at various times. In some embodiments half of the antenna arrays might be vertical polarized and half horizontal polarized. In other embodiments, right and left circular polarization can be used as well, in any desirable proportion or ratio. For receivers used with devices such as two-handed video game controllers that typically have a range of orientations, there might be greater number of one polarization than another in order to improve efficiency, charging speed, or other such aspects. Other types of antenna designs might be used as well, such as fractal antennas of appropriate bandwidth. An advantage of horizontal and vertical image patches, among other such designs, is that the patches can be the same, with the polarization being determined by the side from which the patch is connected to the receiver. In embodiments with an appropriate controller, each patch can be fed from either of two sides, and the receiver can dynamically adjust the polarization of each patch in order to improve performance. In this way the ratio of horizontal to vertical polarized antennas can be updated as needed to optimize performance for the current orientation and environment. Other antenna elements can be used as well, such as metamaterial antennas that can be significantly more efficient than conventional patch antennas, and in at least some embodiments can be on the order of 10% of the size of a conventional patch or less, all while providing the same gain capacity. Such elements can help to reduce the size of the transmitters and receivers as well.

In some embodiments, the transmitter might use less than a total number of antenna elements in a transmitter antenna array to transmit energy to the receiver. As long as at least two elements are used, the transmitter can perform advanced beamforming to implement beamnulling around mechanically point angle. Such an approach enables a suppression of off-axis sidelobes, and can result in a greater degree of compliance with FCC regulations than other approaches. Antenna designs utilized in accordance with various embodiments can also enable a smaller antenna profile than is utilized for conventional antenna arrays used for communications and other such purposes, and reduces the need for a moving base or other such mechanical mechanism.

Figure 8:
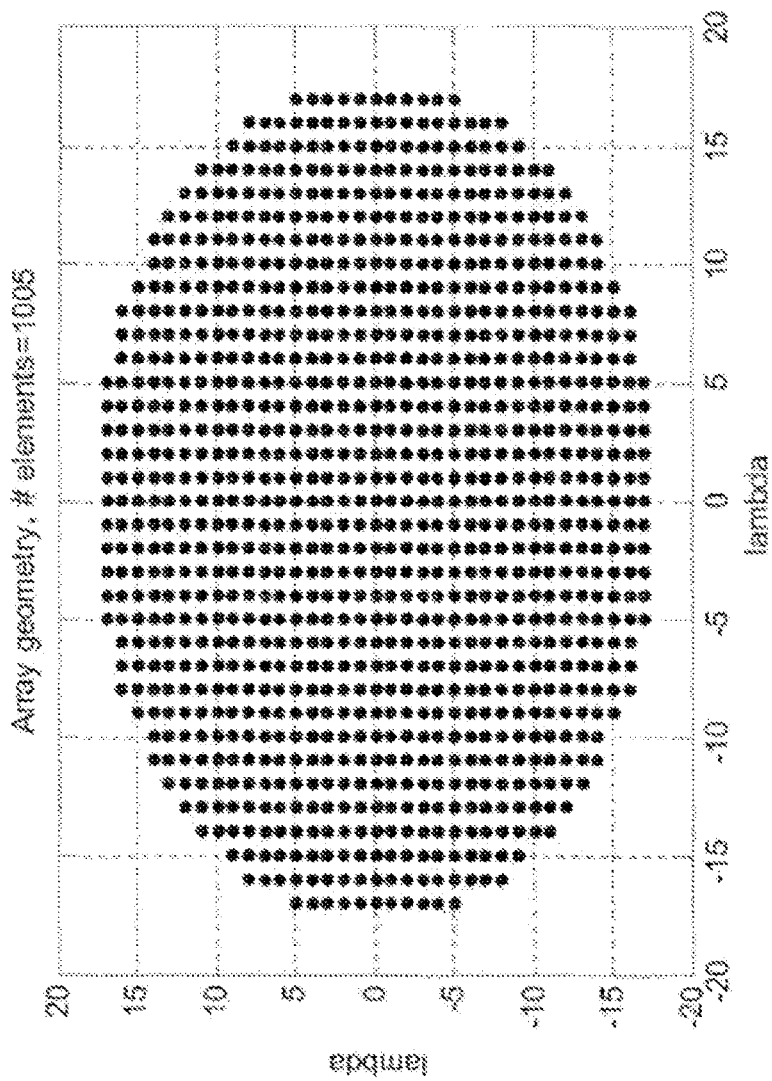
FIG. 8 illustrates a novel flat panel antenna array design that can be utilized in accordance with various embodiments.

FIG. 8 illustrates a flat panel antenna array design 800 that can be used in accordance with various embodiments. This antenna array is illustrated as including 1005 separate elements in a circular arrangement that is approximately 34 inches in diameter. Alternate permutations are also possible including cut-off circular pattern, square, or other polygon arrangements. Additionally, this example array may be broken into numerous pieces and distributed across multiple surfaces (multi-faceted). While other numbers of elements are possible, the gain requirements for power transmitting favor at least 256 elements in this example. In some embodiments where size is an issue, the size of the antenna can be very small, such as on the order of about 4 inches in diameter, and can include as few as eight elements or less in various embodiments. In at least some embodiments a patch is a thin planar piece of metal, such as quarter mill metal. The antennas in some embodiments can be etched onto a printed circuit board, while in other embodiments the elements can be printed onto plastic or formed on a silicon chip, among other such options.

FIGS. 9A-9C illustrate cross section illustrations 900, 920, 940 of components of a flat panel antenna array such as that illustrated in FIG. 8. In the array configuration 900 of FIG. 9A the elements 902 are seen on a substrate layer 904. The elements 902 may be horizontal pole, vertical pole, circular polarized, left hand polarized, right hand polarized or some combination thereof. The substrate layer 904 provides mechanical stability and heat absorption properties, for example. Wires can be seen extending from each element 902 to a corresponding RF circuit 906. Due to the processing requirements of 1005 individual elements in this example, a combination of analog RF circuits 906 and one or more digital circuit(s) may be utilized to reduce processing requirements. However, since these elements are putting out very small signals, it can be desirous in at least some embodiments that the analog RF circuits 904 are physically closely aligned with the elements 902 in order to minimize loss. The phase and amplitude of each element 902 may be modulated by the respective RF circuit 904 in order to generate the desired beamform and null steering.

While FIG. 9A illustrates an array that has each element 902 coupled to a single RF circuit 906, in FIG. 9B an array configuration 920 is illustrated where a subset of the elements 922 are coupled to a single RF circuit 926. In this example, the RF circuit 926 couples to four elements 922. More or fewer elements 922 may be controlled by each RF circuit 926, in some embodiments. The determination of the required number of elements to be coupled to a single controller may be based at least in part upon processing requirements, desired array cost, and the needs of the final application, among other such factors. In some applications, very high levels of control and granularity may be desired, resulting in a lower ratio of controllers to elements. In other applications, fewer controllers are needed because beams control can be less granular.

For example, in FIG. 9C an array configuration 940 is illustrated where a pair of elements 942 couples to a single RF circuit 946. This can provide greater control over beamforming than the previous example that coupled one controller to four elements. Two of these RF circuits may then couple to a second layer analog RF circuit 948. In turn, two of the second layer RF circuits 948 may couple to a single final RE circuit 950. This RF circuit 950 may be an analog or a digital circuit.

In certain embodiments, the RF chips or other such components can be placed as closely to the antennas as possible by embedding the RF chips in a printed circuit board (PCB) positioned just behind, or adjacent to, the respective antenna elements. Such an approach avoids the need to run long traces or RF cables, etc. Since large antenna arrays can require hundreds of such cables, such an approach can significantly reduce the overall cabling length and associated losses. The RF chips can be embedded in locations selected to reduce the length of wire needed. Thus, the array of antenna or dipole elements can have the RFIC analog chip or other such component embedded right behind, in order to minimize the trace length and, thus, the amount of loss.

The package size can be increased in some embodiments in order to have an embedded antenna array on a semiconductor. The die (e.g., RFIC) can be relatively small, but a physical package could be utilized that includes a PCB with wires running as necessary. The die can be positioned on a piece of silicon and/or bonded to a piece of aluminum. In one embodiment a piece of silicon can be used that has on the order of sixteen wires going to the edges, for example. The silicon could be soldered onto a piece of metal, for example, which then becomes the package. Alternatively, the silicon could have a metal ground plane initially. Since the silicon piece generally will be small, however, it can be desirable to place the silicon on a PCB or piece of metal, among other such substrates.

Many embodiments can utilize such a multilayered approach including several-to-many controllers. For example, in some embodiments an array of 1,000 elements may include a first layer of RF circuits that service 10 elements apiece (100 RF circuits). Ten of these RF circuits may feed to a second layer RF circuit (10 second layer RF circuits). These 10 second layer RF circuits then feeds to a final RF circuit. Such a "nested" RF circuit design may be able to provide better control over beamforming than current systems.

In many embodiments phasing is performed in analog, and groups of elements can be combined in analog before converting to digital. In some embodiments, all the elements are combined with an analog RF circuit and then one digital RF circuit. In other embodiments, a group of elements may be controlled using analog RF circuits, and then these groups may be combined using a smaller group of digital RF circuits. For example, every horizontal row of a number (e.g., 8) of elements could be combined in analog, and then the output of these eight rows combined in digital.

Beamforming can be performed on a very short time scale that can seem nearly instantaneous, whereas mechanical movement of a beam is comparatively very slow. Thus such an array may track a moving object (in relation to the mobile platform) much more tightly than mechanically dependent antennas. Further, the flat geometry of such an antenna, and the ability for the array to be static, can enable a nearly flush profile. On very fast moving objects, or those prone to elemental or human damage, this profile may prevent significant drag or damage of the array. Moreover, the lack of complex moving parts reduces maintenance and possible mechanical failures of the antenna compared to traditional antennas. Further, the cost of such an array can be significantly lower than those which rely upon mechanical hardware. In addition to advantages enumerated above, it should also be noted that an array of this sort can have very close control of null spaces. This allows the array to "beamshape" by steering null spaces around the central beamform.

Figure 10:
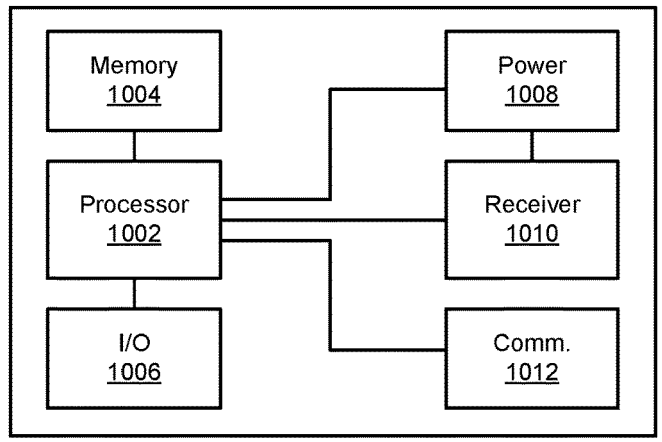
FIG. 10 illustrates a receiver built into a computing device that can be utilized in accordance with various embodiments.

As discussed, the components of a receiver can be connected to an electronic device, embedded in an electronic device, or otherwise positioned in order to deliver power to the device. For example, in FIG. 10 the receiver 1010 is embedded in a device 1000, such that the device can receive power from the receiver which can be provided to a power source 1008 of the device without having to connect any external components to the device. The device can include a communication module 1012 as discussed which can receive information from a processor 1002 or I/O component 1006 of the device to send to a transmitter, in order to cause power to be transmitted to the device. Such an approach can be used to charge a battery of the device or power the device without need for a battery, among other such options.

Figure 11:
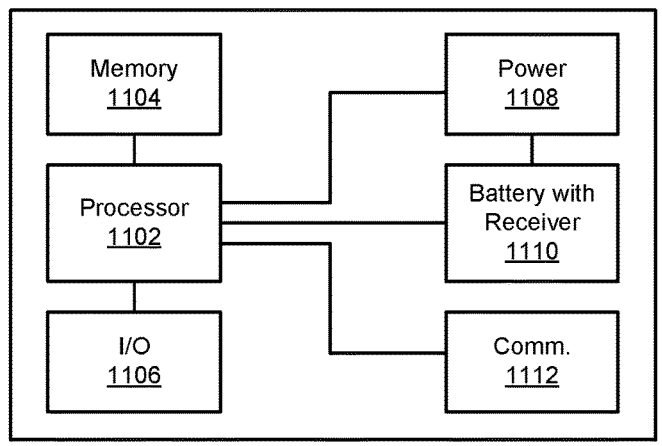
FIG. 11 illustrates a battery with a built-in receiver that can charge wirelessly while contained in a computing device that can be utilized in accordance with various embodiments.

In the configuration 1100 of FIG. 11, the receiver is part of a battery or battery back utilized by the device. In this way, the battery can receive power in order to charge itself without having to be removed from the device, and in at least some embodiments can be charged during operation of the device. In other embodiments, such a "battery" pack enables the device to be powered using the transmitted power, without having to include a battery or even a device for storing power for the device.

Figure 12:
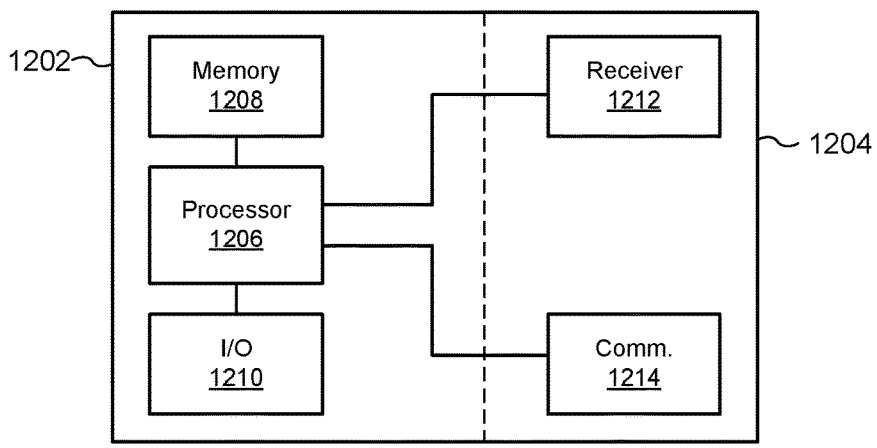
FIG. 12 illustrates an example of an attachment that can be used to wirelessly receive power to a computing device that can be utilized in accordance with various embodiments.

In the configuration 1200 of FIG. 12, the receiver 1212 and a communication element 1214 are contained in a component 1204 that is separate from the electronic device 1202. The component can be plugged into, or otherwise attached to, any of a number of different devices, such that a customer can use a single receiver with various devices. The component also can take a number of different forms, such as a case for the device 1202, a dongle, a USB device, a third-party accessory, etc. In this example the receiver is able to provide power to the device, and the communication module is able to obtain information to be conveyed to the transmitter in order to ensure that an appropriate amount of energy is sent at an appropriate time. Various other configurations and functionality can be used as discussed elsewhere herein.

As mentioned, the transmitter can focus at least one beam to an appropriate location and size associated with the antenna(s) of the receiver, which can then be rectified by the rectifier of the receiver. The ability to precisely form a beam of a desired size and power can depend at least in part upon the number of antenna elements in the transmitter and/or the receiver. Accordingly, approaches in accordance with various embodiments can utilize dozens, hundreds, or even thousands of antenna elements in order to provide desired beamforming capabilities and performance. Using analog elements instead of digital elements can provide significant cost savings, and can allow for the inclusion of additional elements in a transmitter without a substantial increase in cost to the customer. Further, analog elements work over a wide band, not a small portion of the overall spectrum, such that an analog transmitter can also offer greater flexibility than digital transmitters in at least some embodiments.

Figure 13:
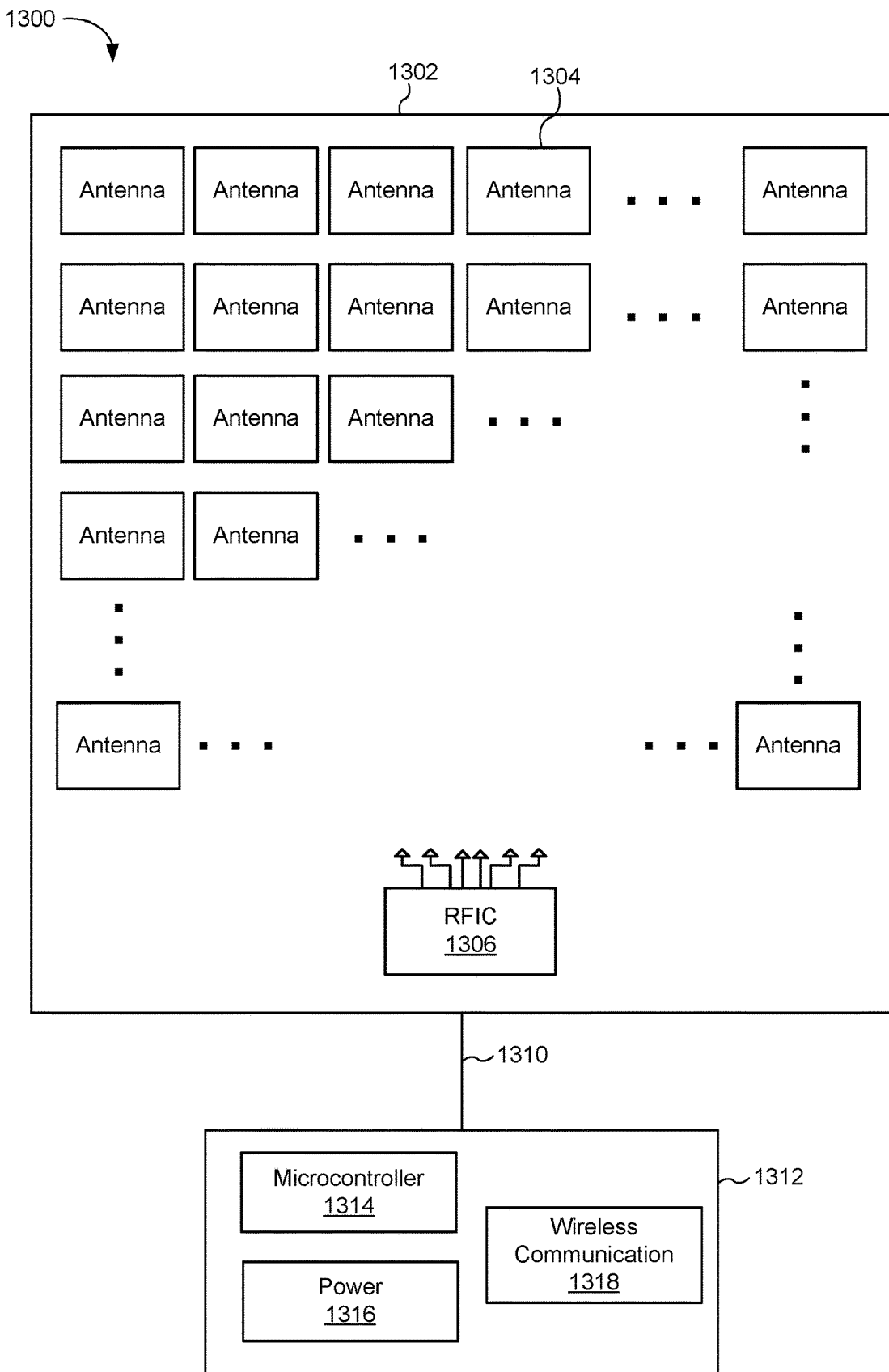
FIG. 13 illustrates an example transmitter configuration that can be used in accordance with various embodiments.

In the example configuration 1300 of FIG. 13, an antenna panel 1302, or housing, is displayed that is connected to a base station 1312. As illustrated in the example of FIG. 3, the components can alternatively be placed in a single housing or otherwise arranged within the scope of the various embodiments. In this example, a number of antenna elements 1304 are arranged within the panel, with each of the antenna elements being connected (not shown) by an appropriate wire, cable, line, or other such mechanism to analog control circuitry, such as at least one RF integrated circuit (RFIC) 1306 including components operable to control aspects of the antenna elements 1304, as may include the gain and/or phase of those elements, in order to form and steer a beam as discussed above. The RFIC in this example is also placed within the panel 1302 in order to place the RFIC as close to the antenna elements as is practical, in order to minimize losses as discussed above. Other components of the transmitter then can be included in the base station 1312. In this example the base station includes the microcontroller 1314 for the antenna array, as well as the power components that are configured to receive power from an outlet and provide the necessary type of power to the microcontroller and other components. The base station in this example also includes a wireless communication element 1318 for communicating with one or more receivers or other such devices, although in at least some embodiments components such as the microcontroller and communication component(s) can be included in the transmitter panel 1302 as well. An advantage to having a panel 1302 separate from the base station 1312 is that components such as the power components might include a significant amount of weight, but elements such as the antenna elements and RFIC components are relatively light. Thus, separating the components can make it easier to hang the antenna panel on a wall or ceiling, for example. Further, the power components typically will need to be plugged into an electrical outlet in certain embodiments, so the separation enables the base station to be near the outlet and the panel placed where desired. In embodiments where the transmitter is hardwired into the location or building, for example, it might be more desirable to use a combined arrangement as illustrated in FIG. 3. Another advantage of the separation is that the customer can purchase a base station and separately purchase an antenna panel of the desired shape and/or capacity, such that the customer can pay for just what the customer wants and more options or combinations can be provided. Further, if the customer's demands change, the customer can buy a new panel instead of a whole new transmitter, which can provide significant cost savings in at least some embodiments.

In this example the panel 1302 can be any appropriate shape and/or size, as may be determined based at least in part upon the number and configuration of antenna elements to be contained within the panel. The panel can be made of any appropriate material, such as a lightweight plastic, rubber, or polymer material. The panel housing also can come in different colors or shapes that might be customizable or selectable by a user. In some embodiments, skins or other mechanisms can be used to adjust the appearance of the panel as well. In some embodiments a customer might utilize the panel behind a wall surface, picture, ceiling panel, or other such object such that appearance or form might not be of concern, other than potentially including helpful mounting mechanisms or other such components. At least some panels might be designed to hang on the visible surface of a wall or ceiling, such that an aesthetically pleasing design and/or color might be desirable, or at least a design that is as visually unobtrusive as possible.

Similarly, the base station can be made of any appropriate material, which can be similar to, or different from, the material used for the panel. The base station may or may not include mounting hardware, depending at least in part upon whether the base station is part of the panel assembly or a separate component connected to the panel by power and communication cabling, or another such component. The base station can include any additional components as may be appropriate, such as a cooling fan, power switch, LED element for providing operation and/or other notifications to a user, a display element for displaying an interface to a user, one or more input buttons or keys, a touch screen, or other such elements. In some embodiments the components of the base station might be built into another device as discussed elsewhere herein.

A transmitter can focus energy using all the antenna elements in the array in order to deliver the maximum amount of power capable of being provided to a receiver. In some embodiments, however, it might be desirable to only utilize a subset of the antenna elements. For example, a receiver might only be able to charge a device up to a certain rate or amount, a user might have specified a power limit, or another such factor might come into play. Increasing the number of antenna elements used can improve the ability to shape the beam, the amount of power able to be transferred via the beam, and other such aspects, but in some cases less than the total number of elements may be sufficient. Logic in the microcontroller or an attached device can determine how many elements to use for a given purpose at a given time.

Figure 14A:
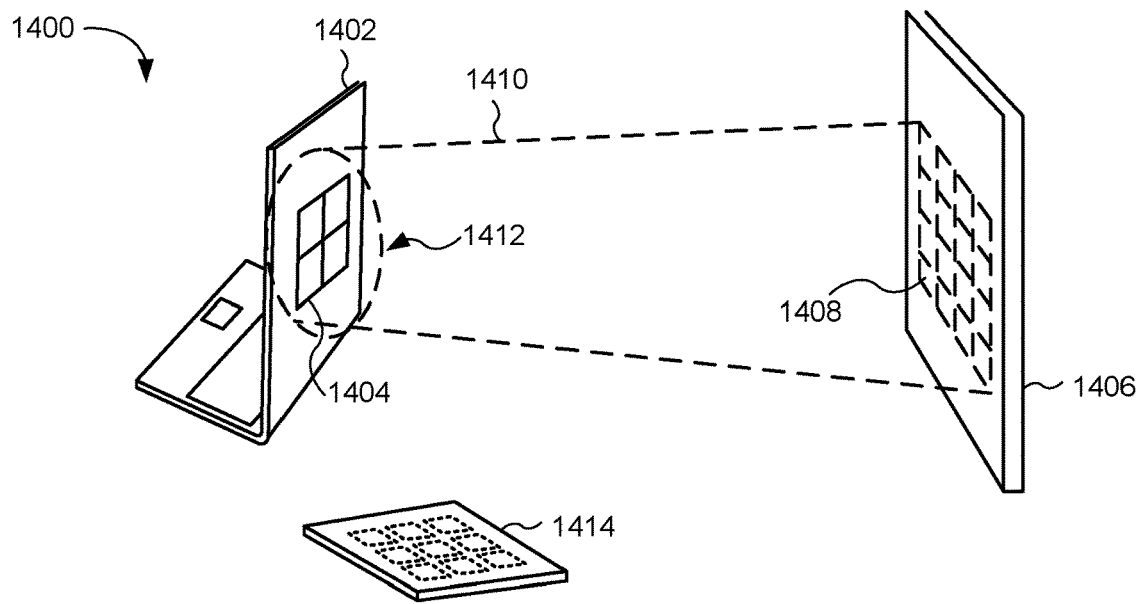
FIGS. 14A and 14B illustrate example power delivery approaches that can be used in accordance with various embodiments.

In some embodiments, such logic can also determine when and how to charge devices when there are more than two devices or receivers that want to receive a charge. For example, FIG. 14A illustrates an example situation 1400 wherein there are two computing devices 1402 and 1414 within a transmission range of a transmitter 1406, or at least an antenna panel of a transmitter, in accordance with at least one embodiment. In this example, each device 1402, 1414 can communicate over a wireless channel (Bluetooth, Wi-Fi, acoustic, optical, etc.) with the transmitter 1406 in order to convey information about a current power level, power stage, charging need, or other such information. In at least some embodiments, each of the devices 1402, 1414 can have software installed that communicates with a power receiver, which can be built in or external that can determine information about one or more power states of the respective device and communicate that information to the transmitter. In some embodiments, the software can cause power level information to periodically be transmitted to the transmitter, such as via a periodic heartbeat or in response to periodic polling from the transmitter, among other such options, while in other embodiments a receiver may send a request or transmission only when charging of the device is determined to be appropriate. For example, each device might have a determined power level at which the device requests charging to ensure that the device does not run out of power, at least before a next charging opportunity. In other embodiments, a user might configure or set a level at which to obtain charging. In still other embodiments a device might be set to periodically request charging to make sure that the device (or a battery or other power component of the device) is at or near a full charge. Various other timing and charge determining approaches can be used as well within the scope of the various embodiments.

In FIG. 14A, one of the devices, here a notebook computer 1402, has indicated to the transmitter 1406 that the device is requesting to receive power. Accordingly, the transmitter 1406 can attempt to determine the location of the notebook computer 1402 in order to attempt to deliver power to the antenna array 1404 of the notebook. As discussed, the transmitter can attempt to determine the location to which to deliver power in a number of different ways. In one approach, the antenna elements of the notebook computer can be caused to "chirp" or otherwise emit a signal that can be detected by the antenna elements of the transmitter, which can be analyzed by the components of the transmitter in order to adjust a gain or phase of at least some of the antenna elements in order to deliver power to that location, including an appropriate amount of beamforming and focus, etc. For example, a transmitter or receiver receiving a chirp can compare the signal to a local crystal, determine a difference in the local antenna elements, and adjust the phases accordingly. In other embodiments, the wireless or sideband channel can be used to send geolocation information, as may be determined using a GPS or other sensor of the notebook computer, among other such options. The information can be used to focus a beam 1410 to a focus region 1412 that is approximately the size of the antenna array 1404 of the notebook computer, in order to minimize losses due to portions of the beam that are not detected by the array. For at least some embodiments, the beam can be split and focused on different portions of the array, or even individual antenna elements, in order to further improve efficiency.

While power is being transmitted to the notebook computer 1402, the notebook computer can periodically send updates as to the current power state in at least some embodiments. Such an approach can not only help the transmitter to determine when to stop delivering power to the device, but can also help the transmitter to determine when and where to deliver power as will be discussed later herein. In some embodiments, a device might only send another signal to the transmitter when charging is complete, such that the transmitter knows to stop transmitting power to that device. Since such an approach might cause issues if the device is powered off or removed, in at least some embodiments a device must send a periodic message during charging in order to signal to the transmitter to continue sending a charge to the device. Various other approaches can be used as well within the scope of the various embodiments.

In FIG. 14A, however, there is also a tablet computer 1414 that also includes antenna elements of a power receiver, and is able to communicate with the transmitter to provide location and charging information, for example, in order to also obtain power as for the notebook computer 1402. The transmitter can determine the location and the need for charging, and can focus a beam on the antenna array of the tablet computer.

It might be the case, however, where at certain times both devices 1402, 1414 request power from the transmitter. A number of different approaches can be taken to provide power to both devices. In a first example, the needs of the devices are determined and ranked, such as to determine which device is more in need of power delivery, and then power is delivered to that device first, followed by the other device. In other embodiments, the transmitter 1406 can include logic to cause power to be delivered in an alternating fashion between the two devices. For example, the transmitter might determine equal periods of time to deliver power to each device. Since the antenna elements can adjust the beam very rapidly, the power can be delivered for a period of time to the first device, then for a period to the second device, then again for the first device, etc., until at least one of the devices is fully charged or otherwise no longer requires (or is able to obtain) charging. In some embodiments, the periods might be different for each device. For example, one device might be closer to losing power, or might be consuming more power, such that the transmitter can (if receiving such information from the devices) determine an appropriate ratio of charging periods to use for each device. As should be understood, such an approach can be used with more than two devices as well.

Figure 14B:
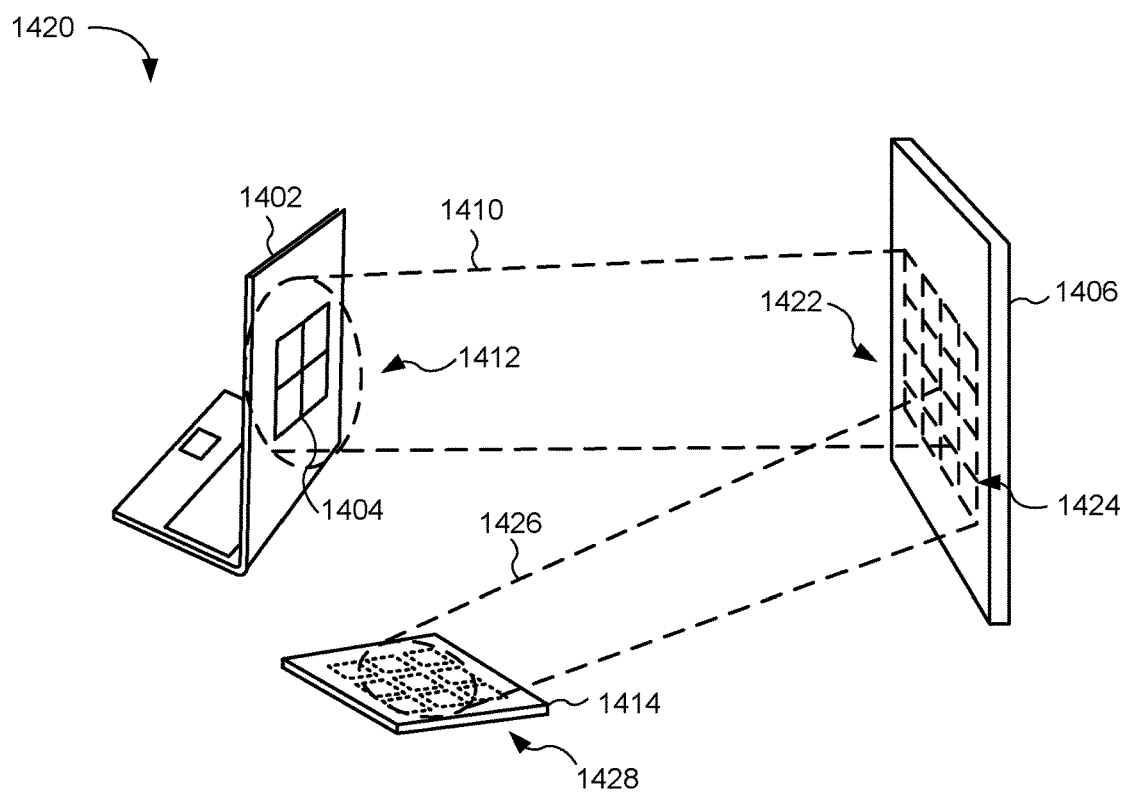

In some embodiments, the antenna array of the transmitter 1406 can also be configured to simultaneously deliver power to both devices using different subsets of the antenna array. For example, FIG. 14B illustrates an example situation 1420 where a first subset 1422 of antenna elements of the transmitter is configured to deliver power to the notebook computer 1402 and a second subset 1424 is configured to form and send a beam 1426 that is focused on the antenna array 1428 of the tablet computer. Such an approach can enable both devices to be charged concurrently, which can be desirable in at least some situations, such as where an external receiver is connected to a device and the device has some delay or time constraints on charging, constantly notifies the user with changes in charge state, etc. Further, in at least some embodiments one or more devices might not include a battery or otherwise might operate using the power delivered from the transmitter, such that periodic charging may not be sufficient. Such approaches might be used to enable the devices to be very light, without need for a battery, as well as to provide for security, where a device must provide authentication to receive power and cannot work outside a designated area. Various other such situations exist as well.

In some embodiments, the ability to use different portions of the array for different purposes also can allow for other types of transmission as well, such as a power transmission using a first subset and a data transmission using a second subset.

The transmitter can utilize any of a number of types of information to determine whether to charge in an alternating or concurrent manner, or in a combination thereof wherein at least one device receives continuous power and other devices might alternatively receive power. Further, the transmitter can determine information such as the number of elements available, size of beam needed, amount of power needed, and other such information to determine how many and which elements to use to deliver power to each device. Different devices or receivers can have different numbers of antenna elements, such that the logic on the transmitter can determine how to fairly distribute power based on capacity or other such factors. Also as discussed, in some situations a device might need more power than another device, such that the transmitter can determine how to split up the power delivery in a proportion that is still as fair as possible to all receivers. Various other approaches and logic can be used as well.

The devices and transmitter can remain in communication such that power delivery can change as needed. For example, an amount of power consumption by one device might change, the user might plug a device into a wall socket, etc., such that the amount of power needed can change while charging. The transmitter can receive this information in at least some embodiments, and can determine how to adjust delivery. In some embodiments, the receivers (or devices attached to the receivers) can determine an amount of power delivery needed in response to a change, action, or event, and can communicate that information to the transmitter. Thus, the number of elements or approach used to power various devices can change at any time, even during charging.

As mentioned, the transmitter can include a number of antenna elements that can have different polarizations and arrangements in order to handle multiple different receiver orientations and/or locations. Such differences can also affect how many elements are used to deliver power to a given device, as certain polarizations or orientations may be more effective for certain device orientations or locations, and in at least some embodiments the transmitter can be configured to optimize for efficiency to the extent possible while still providing sufficient power delivery.

It also should be stated that such delivery approaches can advantageously be used with other types of signals as well, such as for communications or other such purposes.

Figure 15:
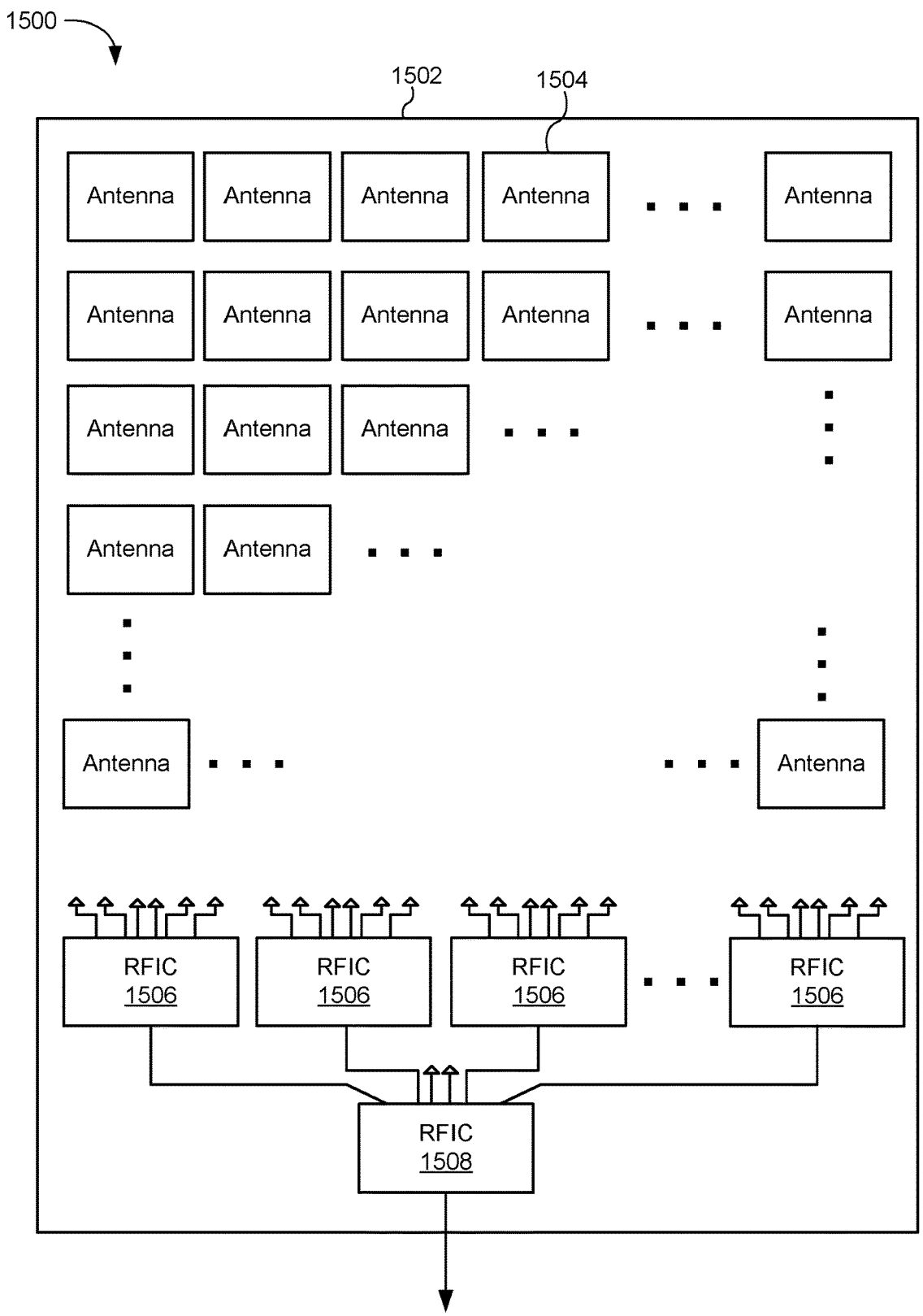
FIG. 15 illustrates an example transmitter configuration that can be used in accordance with various embodiments.

FIG. 15 illustrates an example transmitter panel 1500 that can be utilized in accordance with various embodiments. In this example the panel includes a large number of antenna elements 1504, which could include over one-hundred elements in this example. It is possible that a single RFIC could be used with all these antenna elements. Such an RFIC can be relatively expensive, and as discussed it can be desirable to minimize the path length between antenna elements and the RFIC elements in order to minimize loss. Accordingly approaches in accordance with various embodiments utilize several smaller RFIC devices 1506 that are each connected to a subset of the antenna elements 1504 in the antenna panel housing 1502. In this example each RFIC is able to connect to eight antenna elements, although any appropriate number of connections can be made in various embodiments. Small analog RFIC devices are relatively inexpensive, so such an approach can minimize losses by enabling the RFIC devices to be placed relatively close to the connected antenna elements, but also can substantially reduce costs over a larger, single RFIC device. In this example, at least one additional layer of RFIC devices 1508 can be used to connect or "cascade" the RFIC devices 1506 in order to combine the connections of the various antenna elements to a single output (or at least fewer outputs).

The ability to inexpensively add additional RFIC devices and antenna elements provides the scaling desired for various transmission applications, as the beamforming capability can scale with the number of phase shifters and amplifiers of the RFIC devices for the respective antenna elements. Although two layers are shown in the example, there can be any of a number of layers of RF chips or other such devices cascading to support the number of antenna elements, with the number of RF chips per layer and number of layers being a factor of the number of antenna elements and the number of connectors on each RF chip. In an embodiment where each chip can accept sixteen inputs, an assembly of seventeen RFIC chips can support up to two-hundred and fifty-six antenna elements. A similar approach can be performed where the transmitter is also configured to act as a receiver.

Figure 16:
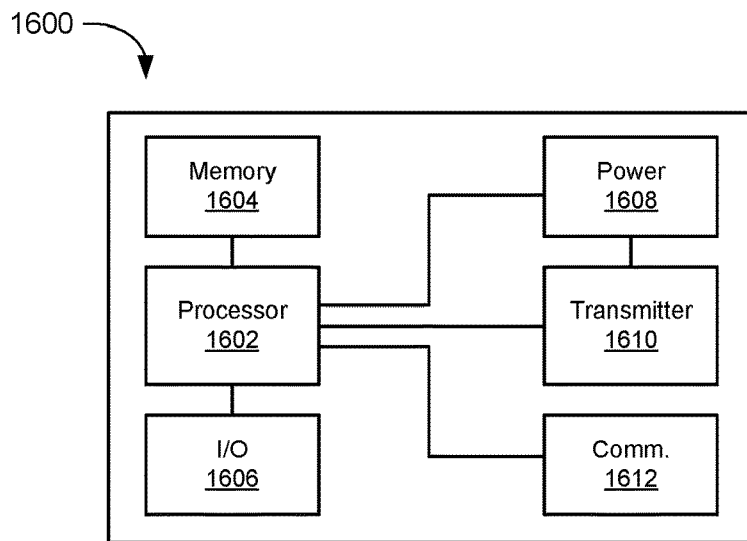
FIG. 16 illustrates a transmitter built into a computing device that can be utilized in accordance with various embodiments.

Although in many instances a transmitter will be a stand-alone component, as a single unit or as a base station and antenna panel, for example, in some embodiments one or more components of a computing or electronic device can be utilized with a transmitter as well. For example, the components of a transmitter can be connected to an electronic device, embedded in an electronic device, or otherwise positioned in order to deliver power to the device. For example, in FIG. 16 the transmitter 1610 is embedded in a device 1600, such that the device can provide power obtained from a power source 1608 of the device without having to connect any external components to the device. The device can include a communication module 1612 as discussed which can receive information from a processor 1602 or I/O component 1606 of the device to send to a receiver, in order to cause power to be transmitted to the receiver. Such an approach can be used to charge a battery of the receiving device or power the device without need for a battery, among other such options.

Figure 17:
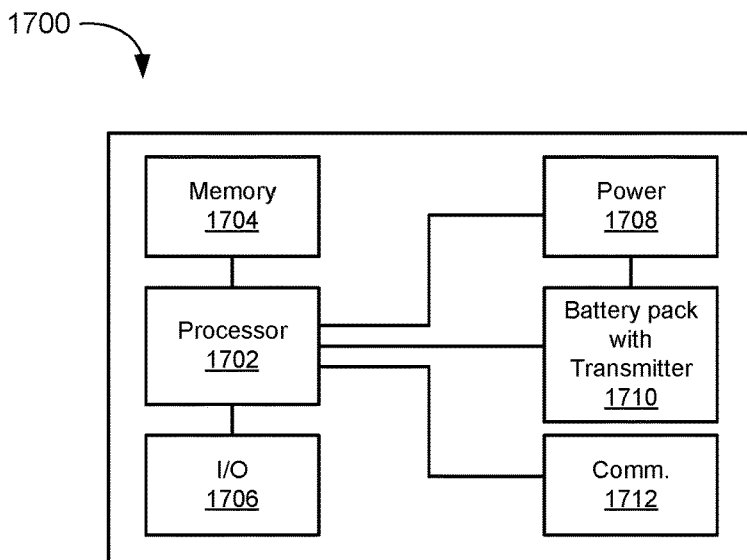
FIG. 17 illustrates a transmitter built into a battery pack that can be utilized in accordance with various embodiments.

In the configuration 1700 of FIG. 17, the transmitter is part of a battery or battery back 1710 utilized by the device. In this way, the battery can transmit power to other devices in order to charge those devices, such as may be useful in a gaming console or similar device that has controllers or other accessories that might require power.

Figure 18:
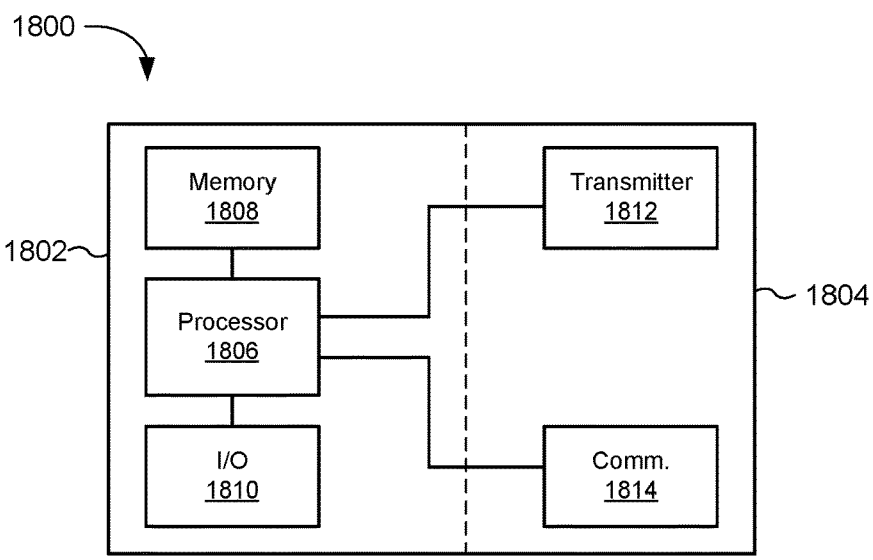
FIGS. 18-19 illustrate examples of an attachment that can be used to wirelessly transmit power from a computing device that can be utilized in accordance with various embodiments.

In the configuration 1800 of FIG. 18, the transmitter 1812 and a communication element 1814 are contained in a component 1804 that is separate from the electronic device 1802. The component can be plugged into, or otherwise attached to, any of a number of different devices, such that a customer can use a single receiver with various devices. The component also can take a number of different forms, such as a case for the device 1802, a dongle, a USB device, a third-party accessory, etc. In this example the receiver is able to obtain power from the device, and the communication module is able to obtain information to be conveyed to the receiver in order to ensure that an appropriate amount of energy is sent at an appropriate time. Various other configurations and functionality can be used as discussed elsewhere herein.

Figure 19:
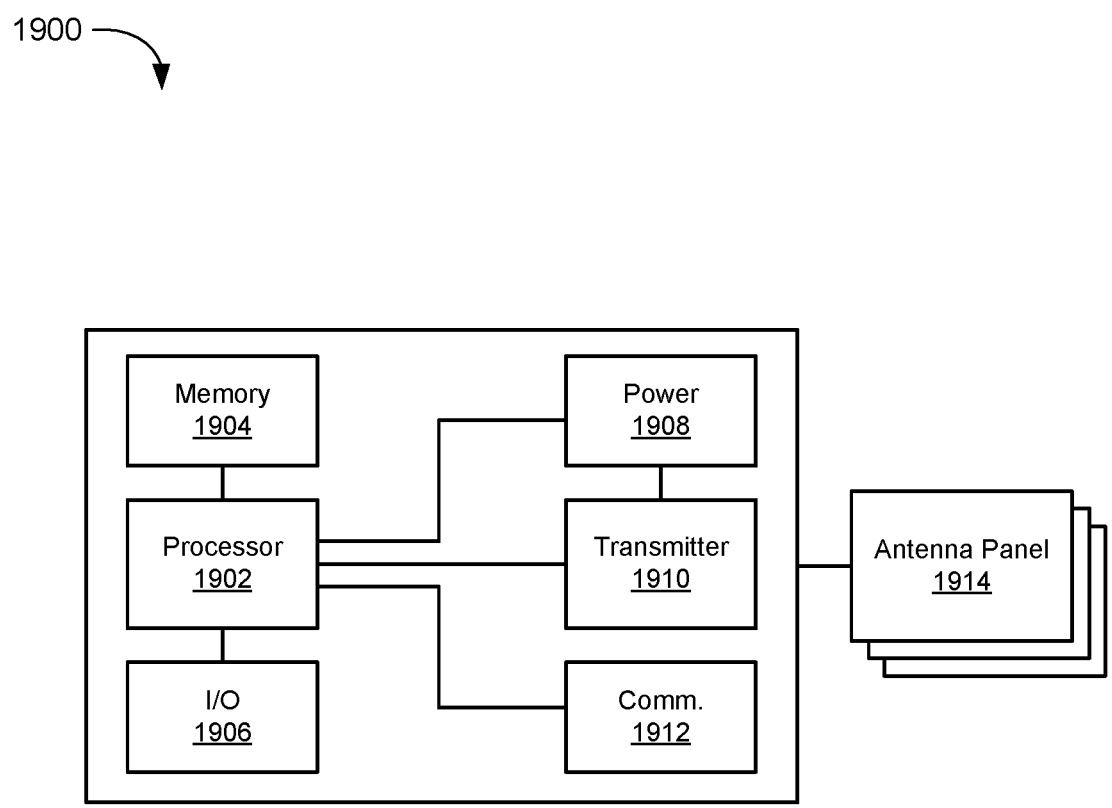

In the configuration 1900 of FIG. 19, it is shown that additional antenna elements and/or assemblies 1914 can be added to such a device as well, using approaches discussed elsewhere herein.

In at least some instances, a user might want the ability to increase the amount of power that can be delivered, in order to more rapidly charge one or more devices. A user might also want the ability to power more devices concurrently. In many cases a user also, or alternatively, will want to improve the overall efficiency of power transmission using various transmitters discussed herein. As mentioned, these goals can be achieved in at least some embodiments by increasing the number of antenna elements used for the transmission(s). A user thus can purchase a new transmitter, or can purchase a new antenna panel as discussed with respect to FIG. 15, that includes additional antenna elements.

Replacing an entire transmission system can be expensive, however, particularly where the user also has to replace the base station including the power components. Swapping in a different antenna panel can be less expensive, but still can result in unused panels and can increase the amount of waste produced if the user gets rid of the old panel. Further still, purchasing a larger antenna panel does not take advantage of the fact that the user already has a number of antenna elements in the user's possession.

Accordingly, approaches in accordance with various embodiments enable users to utilize additional antenna panels, arrays, assemblies, or other such configurations or components, in addition to those that the user might already utilize. For example, consider the situation 2000 of FIG. 20A. In this example the user already has an antenna panel 2002 plugged into a base station 2012, where the panel includes a number of antenna elements 2006 and control circuitry or components 2008, as discussed elsewhere herein. If the user wants to increase the number of antenna elements in the transmission system, the user can plug another antenna panel 2004 into the base station 2012. In this example both antenna panels include the same number of antenna elements 2006 (although different numbers, sizes, or configurations can be used within the scope of various embodiments) such that the number of antenna elements in the system is doubled, without any waste with respect to the original panel 2002. Each panel can have a cable 2010 or other connector that is able to be received by a port or other connection mechanism of the base station 2012. The number of panels that can be connected in this example might be limited only by the number of ports or connectors available on the base station. The base station can be configured such that the controller 2014 can detect the addition of another panel 2004, and can determine information such as the number and arrangement of elements, among other such information that might be stored by the panel or otherwise obtainable based at least in part upon some information or identifier provided by the panel or input into the base station, etc. The controller can enable the panels 2002, 2004 to share the controller 2014 and power elements 2016, as well as the wireless device 2018 or other mechanisms of the base station. It should be understood, however, that in some embodiments one or more of these components might also be contained in at least one of the panels, such that not every panel needs to share all functionality of each appropriate component in a given base station.

The controller 2014 in the base station can then choose to treat the panels separately or as part of a larger, single array of antenna elements 2006. The controller also can select sub-sets of one or the other, or across both panels, to use to direct energy (or data, etc.) to various destinations. The increased number of antenna elements enables improved beamforming and focus versus for a single panel, such that efficiency can be improved. Further, the larger number of elements enables additional groups of those elements to be used to power more devices concurrently, or deliver more power to each device concurrently receiving power, etc.

Figure 20A:
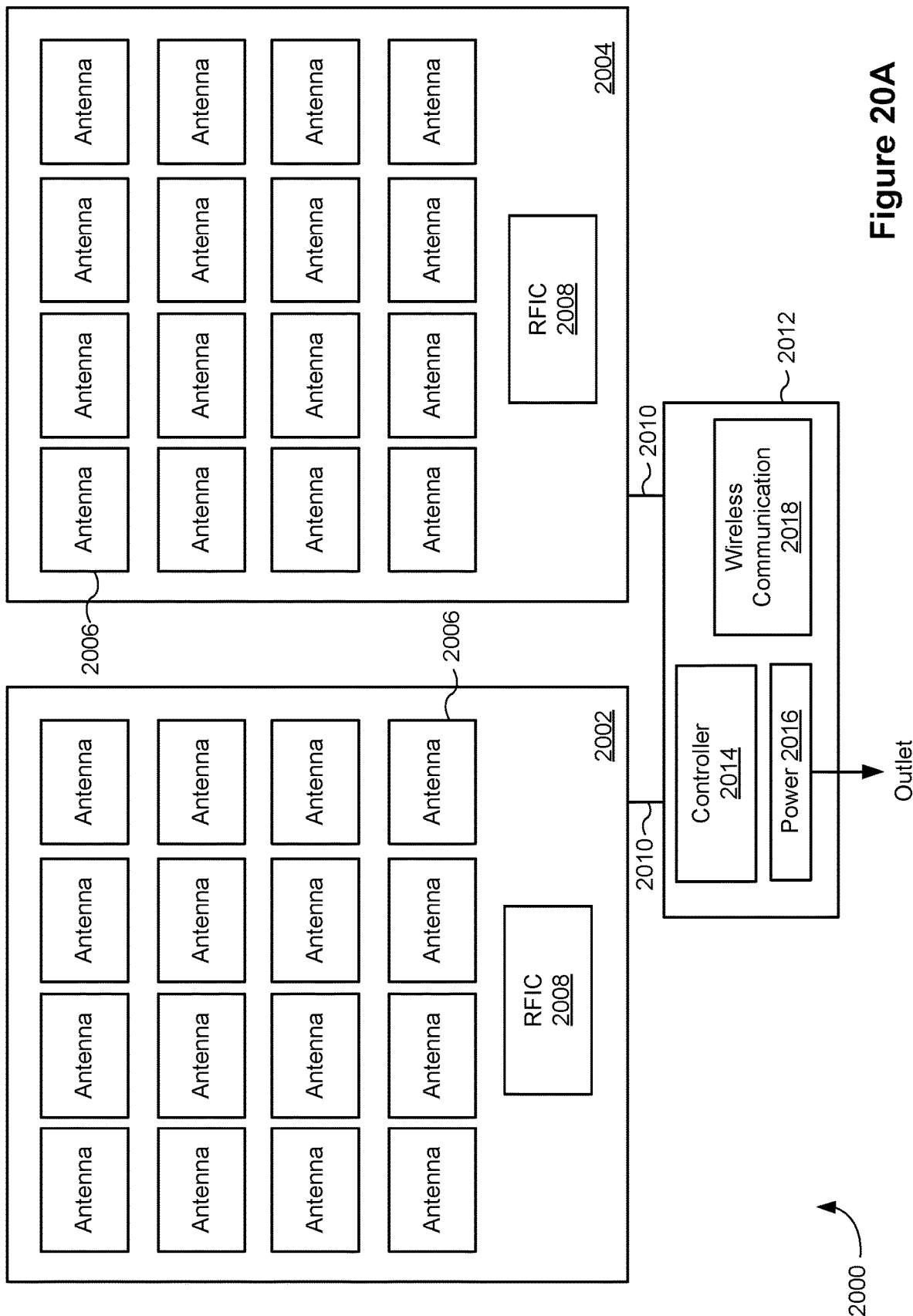
FIGS. 20A-20B illustrate example antenna panel configuration that can be used in accordance with various embodiments.
Figure 20B:
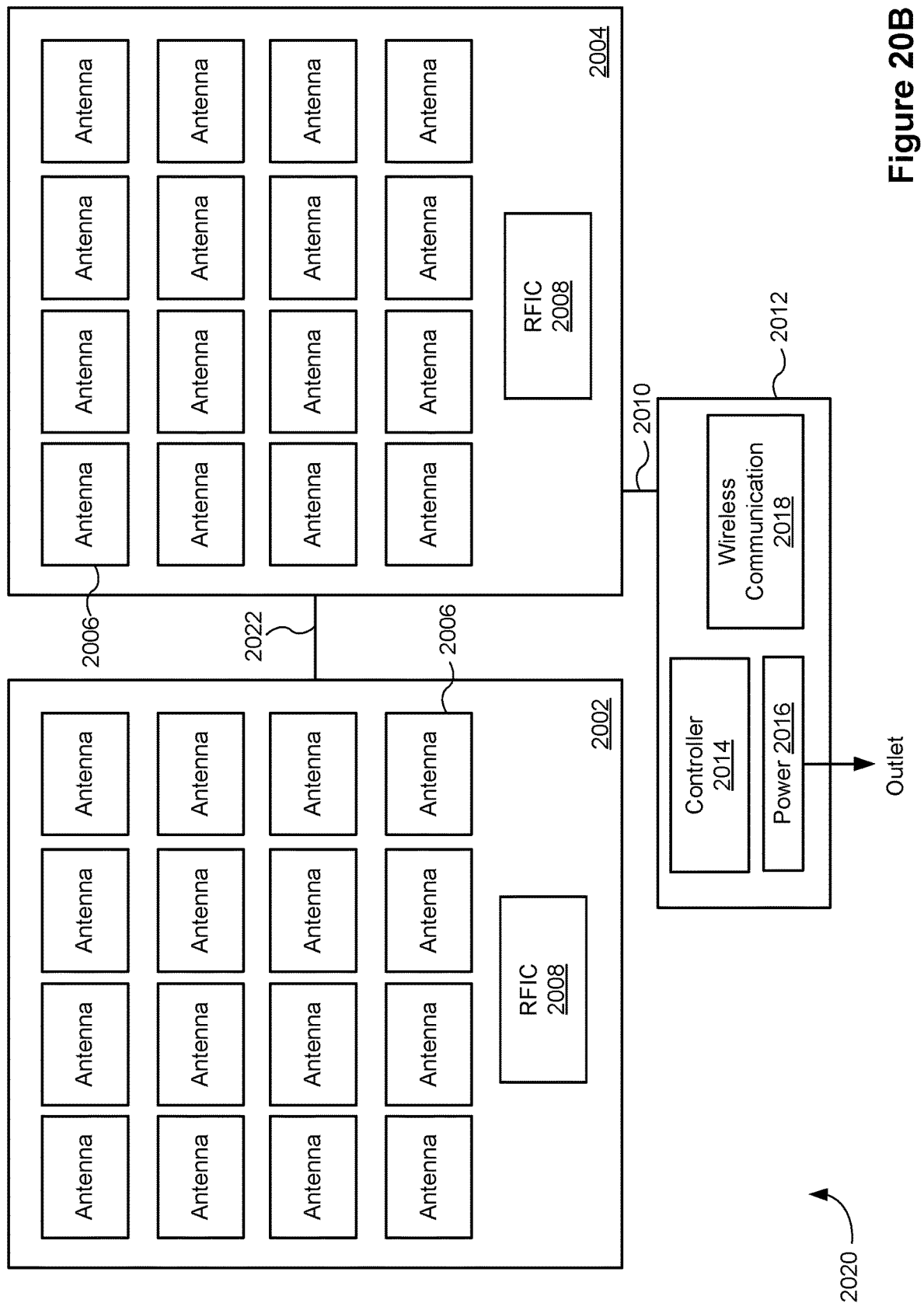

In FIG. 20A each panel 2002, 2004 is connected by a cable 2010 or other connector directly to the base station 2012. FIG. 20B illustrates another example configuration 2020, wherein only one of the panels 2004 is connected to the base station 2012, and a second panel 2002 is directly connected to that panel 2004 by a cable 2022 or other appropriate connector. It should be understood that while direct connections are shown for purposes of explanation, it is possible that indirect connections can be made as well within the scope of the various embodiments.

An advantage to such an assembly is that the panels might be located in a position, such as on a wall or in a ceiling, that is at a significant distance from the base station, and requiring each panel to connect to the base station can involve running an additional connector to the base station, which can be impractical in at least some situations. Accordingly, approaches in accordance with at least some embodiments can enable the panels to connect to each other, such that the number of antenna elements can be increased without having to run another cable to the base station. In this example, each antenna panel assembly 2002, 2004 includes a number of antenna elements (of similar or different number, size, shape, material, orientation, transmission capability, etc.) and appropriate RF or other such circuitry, with a single controller of the base station 2012 used to drive the antennas.

Figure 21:
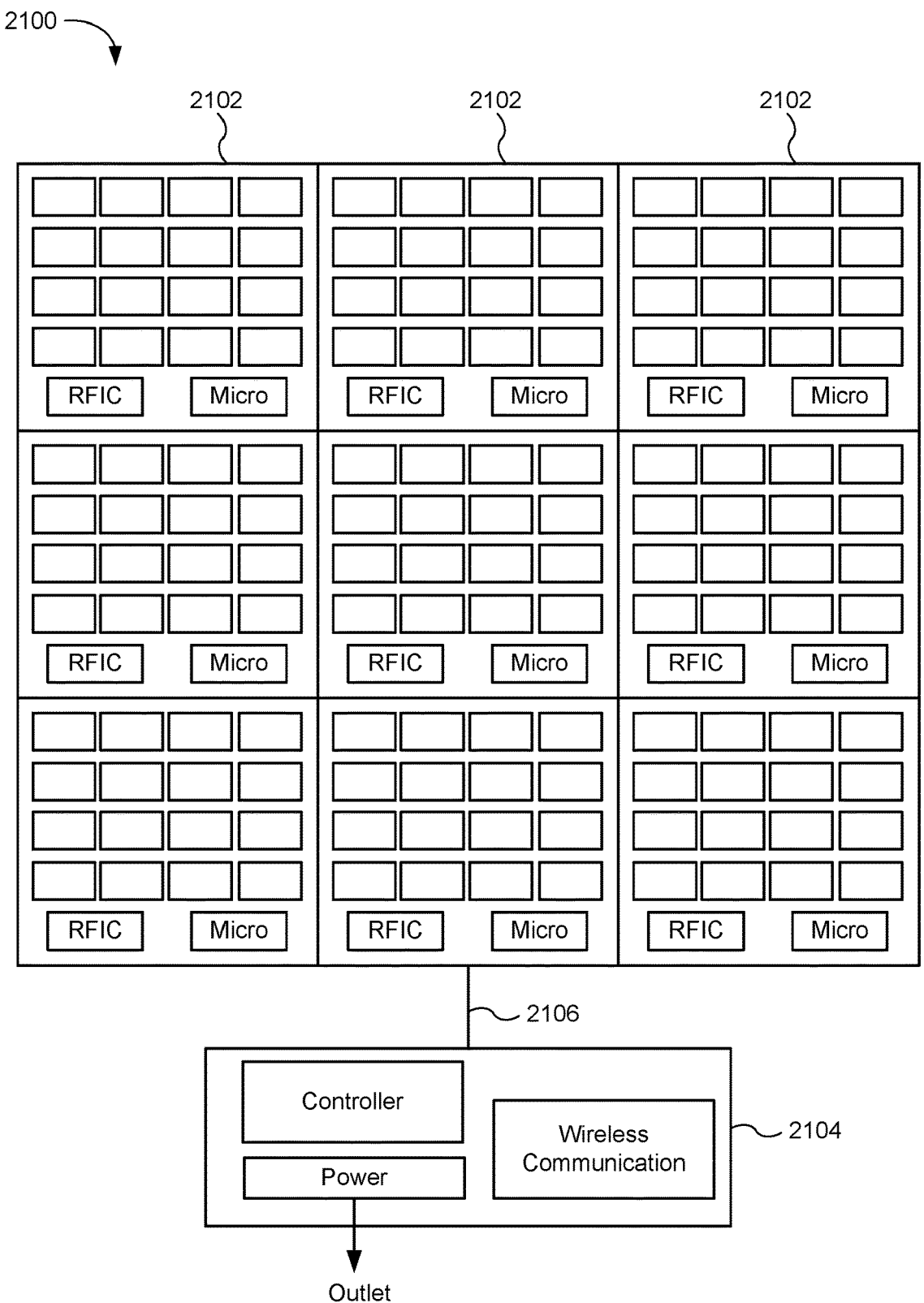
FIG. 21 illustrates an example antenna panel configuration that can be utilized in accordance with various embodiments.

It is possible, however, that each panel (or at least one of the panels) might also include its own microcontroller, or other such control mechanism, that can work together with the controller of the base station 2004 and potentially any other controller of any other antenna panel. Further, each panel might be able to connect to a number of other panels, such as is illustrated in the example situation 2100 of FIG. 21. In this example, each panel 2102 can connect on a side to another panel, with each panel being able to connect to up to four panels in order to effectively create a larger antenna panel assembly. It should be understood that other configurations and numbers of connections can be used as well, including stacking, connecting in shaped configurations, etc.

In this example, each panel includes its own microcontroller that can communicate with the controller of the base station, although in at least some embodiments a single controller in the base station might be used. Upon a panel being connected to the assembly, the controller of the base station can obtain information about the panel, either by receiving information pushed by the microcontroller of the added panel, polling the panels for new information, or other such mechanisms. In some embodiments a user might use an interface to indicate to the base station and/or assembly that a panel has been added, where the panel was added, how many elements are included, etc. In some embodiments, the user (or system, etc.) might execute a software program that provides such information and/or programs the base station to control the additional panel. In other embodiments, configuration information might be stored in each panel that can be read by the base station, and the connection port(s) or mechanism(s) to which the panel is connected can be used to determine the relative location of the panel in the assembly. Various other approaches can be used as well.

In this example each panel can "snap" into, or otherwise connect with, an adjacent panel. Other approaches might connect using only data cables or other such mechanisms. In embodiments that do not include separate housings, additional elements or set of elements might be able to be added as desired, such as by plugging another set into a board or assembly, among other such options. Such an approach enables each panel to operate separately using the respective microcontroller, but also allows any set or grouping of the antenna elements of the connected panel assembly to be used for transmission to a particular destination. A controller of the base station can include logic (or can be in communication with a component having logic) that enables the base station to determine which of the connected antennas to use for a particular amount of power delivery, destination, etc., and can contact the individual microcontrollers where appropriate. Approaches for determining how to utilize the antenna arrays can be similar to the logic discussed above wherein the antenna elements are all part of a single assembly, among other such options.

In some embodiments, each panel includes a printed circuit board (PCB) with a number of antenna elements or patches positioned thereon, that are connected to an RF chip configured to control those patches. As discussed, each panel can include at least one microcontroller, or can communicate with a microcontroller in a base station or other such component. In some embodiments, a panel may include space to add circuit boards with additional elements within the same housing. Various other components such as LEDs, display elements, audio components, wireless communications components, or other such existing or conventional components can be used as well within the scope of the various embodiments. The base station can include power components and other components as discussed elsewhere herein, and can include, or enable attachment of, a power plug or other such component for obtaining power from a power outlet or other such source.

The number of antenna elements in each panel can vary, and may be selected based on any of a number of factors. For example, different numbers of elements may be selected for different panels of different sizes, in order to provide panels of different cost and power delivery capability, as well as to enable customers to select panels or other housings of antenna elements that will fit in various spaces. Further, in some embodiments depending upon geographic location and amount of power to be transmitted, there might be federal, local, or other applicable regulations regarding the amount of power transmitted, or other such aspects, although beamforming with multiple antennas allows the amount of power transmitted to be increased with respect to other potential approaches.

A small example panel for home or office use, for example, might include sixteen or thirty-two patches, and might be able to deliver about half a Watt over a range of about twenty feet. If the user wants to move the transmission system to a larger room, or wants more power to charge devices more quickly, the user can plug in an additional panel with more antenna elements. In some embodiments, the packaging for each panel can give guidance as to the amount of additional power each can provide. In some embodiments, a user might be able to run a software program where the user inputs various parameters, such as room size, number of devices to be charged, cost, and/or speed at which devices should be charged, and can receive a recommendation as to the number of antenna elements, number of panels, or size of additional panel(s) to be added to provide those values. For example, in some embodiments, adding a second panel with a similar number of antenna elements can double the amount of power that can be delivered and cut the charging time in half. Each additional model can reduce the charging time proportionally.

Each additional panel or other antenna assembly can obtain power from the base station (directly or indirectly through another antenna assembly), and can utilize control logic from the base station and/or other components. It is desired in at least some situations that when a user adds another panel, the transmission system does not require any additional configuration by the user and acts as if the larger number of antenna elements were included in the system as originally installed. As mentioned, each antenna assembly can have one or more RFIC's or other such circuits, which can be controlled by a local and/or remote controller or microcontroller. In at least some embodiments, the panels do not include power supplies or microcontrollers in order to reduce redundancy and decrease the cost of the system, among other such advantages.

As mentioned, in some situations there might be regulations limiting the amount of power that can be delivered in a particular geographic area. In some embodiments there can be a GPS element included in the base station to determine the location, which can then be used to determine the local regulations, such as by checking against a local storage or making a call to a network if the base station includes one or more networking components, such as WiFi, 4G, etc. In some embodiments where the base station is able to communicate with devices such as smart phones or tablet computers over a wireless connection, such as Bluetooth, the base station can request location information from the device, and can even leverage the network connection of the device, where permitted, to obtain local regulation information from across the relevant network(s). The controller of the base station then can ensure that power is not delivered in a way that violates local regulations, and can monitor usage of the system when the system has the capability to exceed those regulations to notify the user of any request or application that might violate the regulations. In some embodiments the base station can communicate with a user, such as by a display element on the station or a panel, by communicating with one of the nearby devices, by sending a text or instant message, etc., to indicate that adding additional panels might only enable more devices to be charged concurrently, as the maximum amount of power delivery to a single device has already been reached. Various other information and notifications can be provided as well within the scope of the various embodiments.

As mentioned, when a controller (or microcontroller) in the base station controls the antenna patches of each panel, the controller will need to be able to determine the presence, number, and configuration of the additional elements, in order to be able to control those elements for purposes of beamforming, etc. While the RFIC or other such circuitry and/or components are doing the actual adjustments for the respective elements or patches in a panel, the microcontroller is providing the instructions to the RFIC, with some I/O requests or other such communications. In some embodiments, an 8-bit, $I^2C$, MIPI, SPI, or other such bus might be used for communications. As mentioned, in some embodiments each panel might include its own microcontroller, which can receive instructions (wired or wirelessly) from the base station or another such component and determine how to instruct the local RFIC elements.

Each panel in at least some embodiments can have at least one "power in" and at least one "power out" port or connector to enable additional panels to receive power from the base station, in addition to communication ports or connections. Each panel only needs to receive power from one other panel, or the base station, so a single power in and single power out can be sufficient in at least some embodiments. In one embodiment, 5V AC can be fed across the panels such that there is no need to pay for another AC to DC conversion. In some embodiments, the same cable or connection can be used for communication and power delivery, such as a USB cable or other such connector, although the microcontrollers can communicate wirelessly using a protocol such as ZigBee or Bluetooth in at least some embodiments. In some embodiments each panel can have an identifier, and instructions emitted by the controller can include the identifier in a header portion, metadata, etc., such that even though some or all of the panels might receive the instructions, each local component (e.g., microcontroller and/or RFIC) can ignore the instructions including any other identifier. Certain panels can communicate with the microcontroller to be dynamically assigned an identifier that is different from the other panels, or a user might set one or more switches or other inputs to establish an identifier, or designate a panel as a "master" or a "slave," among other such options. Further, the base station controller might receive configuration information from the user as to where each panel is attached, or might be able to determine from the order each panel is added, and the ports or connectors used to connect that panel, where the panel is in the system. Various other such approaches can be used as well within the scope of the various embodiments.

In some embodiments it might also be possible to scale the base station, such as by adding additional base stations or additional modules. Such an approach can enable new communications or control mechanisms, additional ports or power connections, or other such components to be added to a transmission system, without need to purchase a new (or larger overall) base station. In some embodiments such as commercial establishments where there might be a large number of panels in different locations, there might be multiple base stations used to provide power and instructions, but those base stations can communicate in order to coordinate the delivery of power from different panels that might be connected to different base stations. In some embodiments there might be a master base station that manages the overall delivery for the location, sending instructions and exchanging information with each other base station connected to the system. Various other reasons for adding base stations or station components can apply as well in various situations. Various other upgrade paths can be possible as well, as may be implemented through software upgrades, new cards or chips, etc.

While this invention has been described in terms of several embodiments, there are alterations, permutations, modifications and various substitute equivalents, which fall within the scope of this invention. It should also be noted that there are many alternative ways of implementing the methods and systems of the present invention. It is therefore intended that the following appended claims be interpreted as including all such alterations, permutations, modifications, and various substitute equivalents as fall within the true spirit and scope of the present invention.

What is claimed is:

1. A method of wireless power transmission, the method comprising: at a wireless power transmitter that includes an antenna array:
   transmitting, via one or more antenna elements of the antenna array, a plurality of first electromagnetic (EM) signals having a first phase and a first gain;
   determining a location of a receiver device based, at least in part, on the plurality of first EM signals transmitted by one or more antenna elements of the antenna array;
   based on the location of the receiver device, adjusting, for a subset of the one or more antenna elements of the antenna array, one of a phase and a gain to produce a second phase distinct from the first phase or a second gain distinct from the first gain; and
   transmitting, via the subset of the one or more antenna elements of the antenna array, a plurality of second EM signals having the second phase or the second gain such that the plurality of second EM signals (i) is focused at a focus region that is approximately the size of an antenna array of the receiver device and (ii) provides EM energy at the focus region that is converted by the receiver device into usable power.

2. The method of claim 1, wherein the receiver device is a first receiver device and the subset of the one or more antenna elements of the antenna array is a first subset of the one or more antenna elements of the antenna array, the method further comprising:
   determining a location of a second receiver device based, at least in part, on the plurality of first EM signals transmitted by the first subset of the one or more antenna elements of the antenna array;
   based on the location of the second receiver device, adjusting, for a second subset of the one or more antenna elements of the antenna array, one of a phase and a gain to produce a third phase distinct from the first phase or a third gain distinct from the first gain; and
   transmitting, via the second subset of the one or more antenna elements of the antenna array, a plurality of third EM signals having the third phase or the third gain such that the plurality of third EM signals (i) is focused at a focus region that is approximately the size of an antenna array of the second receiver device and (ii) provides EM energy at the focus region that is converted by the second receiver device into usable power, wherein the plurality of third EM signals are is transmitted simultaneously with the plurality of second EM signals.

3. The method of claim 1, wherein the receiver device is a first receiver device and the subset of the one or more antenna elements of the antenna array is a first subset of the one or more antenna elements of the antenna array, the method further comprising:
   while transmitting the plurality of second EM signals, determining a location of a third receiver device based, at least in part, on the plurality of second EM signals transmitted by the first subset of the one or more antenna elements of the antenna array;
   based on the location of the third receiver device, adjusting, for a third subset of the one or more antenna elements of the antenna array, one of a phase and a gain to produce a fourth phase distinct from the second phase or a fourth gain distinct from the second gain; and
   transmitting, via the third subset of the one or more antenna elements of the antenna array, a plurality of fourth EM signals having the fourth phase or the fourth gain such that the plurality of fourth EM signals (i) is focused at a focus region that is approximately the size of an antenna array of the third receiver device and (ii) provides EM energy at the focus region that is converted by the third receiver device into usable power, wherein the plurality of fourth EM signals is transmitted simultaneously with the plurality of second EM signals.

4. The method of claim 1, further comprising:
while transmitting, via the subset of the one or more antenna elements of the antenna array, the plurality of second EM signals, determining a change in the location of the receiver device based, at least in part, on the plurality of second EM signals transmitted by the subset of the one or more antenna elements of the antenna array;
based on the change in the location of the receiver device, adjusting, for the subset of the one or more antenna elements of the antenna array, one of the second phase and the second gain to produce an adjusted second phase or an adjusted second gain; and
transmitting, via the subset of the one or more antenna elements of the antenna array, a plurality of fifth EM signals having the adjusted second phase or the adjusted second gain such that the plurality of fifth EM signals (i) is focused at a focus region that is approximately the size of the antenna array of the receiver device and (ii) provides EM energy at the focus region that is converted by the receiver device into usable power.

5. The method of claim 1, wherein:
determining the location of the receiver device includes determining an orientation of the receiver device; and
adjusting, for the subset of the one or more antenna elements of the antenna array, one of the phase and the gain to produce the second phase or the second gain is further based, at least in part, on the orientation of the receiver device.

6. The method of claim 5, wherein adjusting, for the subset of the one or more antenna elements of the antenna array, one of the phase and the gain to produce the second phase or the second gain further includes adjusting a polarization of the subset of the one or more antenna elements of the antenna array based, at least in part, on the orientation of the receiver device.

7. The method of claim 1, wherein the plurality of second EM signals is focused such that at least some of the plurality of second EM signals reflect from a surface to focus at the focus region that is approximately the size of the antenna array of the receiver device.

8. The method of claim 1, wherein:
the plurality of second EM signals includes a first set of second EM signals and a second set of second EM signals;
the first set of second EM signals is focused at a first portion of the focus region that is approximately the size of a first portion of the antenna array of the receiver device; and
the second set of second EM signals is focused at a second portion of the focus region that is approximately the size of a second portion of the antenna array of the receiver device.

9. The method of claim 1, wherein each antenna element of the antenna array is coupled to an RF circuit controlled by a respective controller, the respective controller configured to determine the location of the receiver device and adjust one of the phase and the gain for each antenna element of the antenna array.

10. The method of claim 1, wherein at least two antenna elements of the antenna array are coupled to an RF circuit controlled by a respective controller, the respective controller configured to determine the location of the receiver device and adjust one of the phase and the gain for the at least two antenna elements of the antenna array.

11. The method of claim 1, wherein each antenna element of the subset of the one or more antenna elements of the antenna array has a same polarization.

12. The method of claim 1, wherein each antenna element of the subset of the one or more antenna elements of the antenna array has a different polarization.

13. The method of claim 1, wherein the receiver device comprises:
a wireless power receiver; and
an electronic device coupled to the wireless power receiver.

14. A wireless power transmitter for wirelessly delivering power to a receiver device, the wireless power transmitter comprising an antenna array and a controller, wherein the controller is configured to:
determine a location of a receiver device based, at least in part, on a plurality of first electromagnetic (EM) signals transmitted by one or more antenna elements of the antenna array, the plurality of first EM signals having a first phase and a first gain;
based on the location of the receiver device, adjust, for a subset of the one or more antenna elements of the antenna array, one of a phase and a gain to produce a second phase distinct from the first phase or a second gain distinct from the first gain; and
transmit, via the subset of the one or more antenna elements of the antenna array, a plurality of second EM signals having the second phase or the second gain such that the plurality of second EM signals (i) is focused at a focus region that is approximately the size of an antenna array of the receiver device and (ii) provides EM energy at the focus region that is converted by the receiver device into usable power.

15. The wireless power transmitter of claim 14, wherein the receiver device is a first receiver device and the subset of the one or more antenna elements of the antenna array is a first subset of the one or more antenna elements of the antenna array, and the controller is further configured to:
determine a location of a second receiver device based, at least in part, on the plurality of first EM signals transmitted by the first subset of the one or more antenna elements of the antenna array;
based on the location of the second receiver device, adjust, for a second subset of the one or more antenna elements of the antenna array, one of a phase and a gain to produce a third phase distinct from the first phase or a third gain distinct from the first gain; and
transmit, via the second subset of the one or more antenna elements of the antenna array, a plurality of third EM signals having the third phase or the third gain such that the plurality of third EM signals (i) is focused at a focus region that is approximately the size of an antenna array of the second receiver device and (ii) provides EM energy at the focus region that is converted by the second receiver device into usable power, wherein the plurality of third EM signals is transmitted simultaneously with the plurality of second EM signals.

16. The wireless power transmitter of claim 14, wherein the receiver device is a first receiver device and the subset of the one or more antenna elements of the antenna array is a first subset of the one or more antenna elements of the antenna array, and the controller is further configured to:
while transmitting the plurality of second EM signals, determine a location of a third receiver device based, at least in part, on the plurality of second EM signals transmitted by the first subset of the one or more antenna elements of the antenna array;
based on the location of the third receiver device, adjust, for a third subset of the one or more antenna elements of the antenna array, one of a phase and a gain to produce a fourth phase distinct from the second phase or a fourth gain distinct from the second gain; and
transmit, via the third subset of the one or more antenna elements of the antenna array, a plurality of fourth EM signals having the fourth phase or the fourth gain such that the plurality of fourth EM signals (i) is focused at a focus region that is approximately the size of an antenna array of the third receiver device and (ii) provides EM energy at the focus region that is converted by the third receiver device into usable power, wherein the plurality of fourth EM signals is transmitted simultaneously with the plurality of second EM signals.

17. The wireless power transmitter of claim 14, wherein the controller is further configured to:
while transmitting, via the subset of the one or more antenna elements of the antenna array, the plurality of second EM signals, determine a change in the location of the receiver device based, at least in part, on the plurality of second EM signals transmitted by the subset of the one or more antenna elements of the antenna array;
based on the change in the location of the receiver device, adjust, for the subset of the one or more antenna elements of the antenna array, one of the second phase and the second gain to produce an adjusted second phase or an adjusted second gain; and
transmit, via the subset of the one or more antenna elements of the antenna array, a plurality of fifth EM signals having the adjusted second phase or the adjusted second gain such that the plurality of fifth EM signals (i) is focused at a focus region that is approximately the size of an antenna array of the receiver device and (ii) provides EM energy at the focus region that is converted by the receiver device into usable power.

18. The wireless power transmitter of claim 14, wherein:
determining the location of the receiver device includes determining an orientation of the receiver device; and
adjusting, for the subset of the one or more antenna elements of the antenna array, one of the phase and the gain to produce the second phase or the second gain is further based, at least in part, on the orientation of the receiver device.

19. The wireless power transmitter of claim 18, wherein adjusting, for the subset of the one or more antenna elements of the antenna array, one of the phase and the gain to produce the second phase or the second gain further includes adjusting a polarization of the subset of the one or more antenna elements of the antenna array based, at least in part, on the orientation of the receiver device.

20. A non-transitory computer-readable storage medium, storing one or more programs configured for execution by one or more processors of a wireless power transmitter, the one or more programs including instructions for:
transmitting, via one or more antenna elements of the antenna array, a plurality of first electromagnetic (EM) signals having a first phase and a first gain;
determining a location of a receiver device based, at least in part, on the plurality of first EM signals transmitted by one or more antenna elements of the antenna array;
based on the location of the receiver device, adjusting, for a subset of the one or more antenna elements of the antenna array, one of a phase and a gain to produce a second phase distinct from the first phase or a second gain distinct from the first gain; and
transmitting, via the subset of the one or more antenna elements of the antenna array, a plurality of second EM signals having the second phase or the second gain such that the plurality of second EM signals (i) is focused at a focus region that is approximately the size of an antenna array of the receiver device and (ii) provides EM energy at the focus region that is converted by the receiver device into usable power.

21. The wireless power transmitter of claim 14, wherein the plurality of second EM signals is focused such that at least some of the plurality of second EM signals reflect from a surface to focus at the focus region that is approximately the size of the antenna array of the receiver device.

22. The wireless power transmitter of claim 14, wherein:
the plurality of second EM signals includes a first set of second EM signals and a second set of second EM signals;
the first set of second EM signals is focused at a first portion of the focus region that is approximately the size of a first portion of the antenna array of the receiver device; and
the second set of second EM signals is focused at a second portion of the focus region that is approximately the size of a second portion of the antenna array of the receiver device.

23. The non-transitory computer-readable storage medium of claim 20, wherein the receiver device is a first receiver device and the subset of the one or more antenna elements of the antenna array is a first subset of the one or more antenna elements of the antenna array, and the one or more programs further including instructions for:
determining a location of a second receiver device based, at least in part, on the plurality of first EM signals transmitted by the first subset of the one or more antenna elements of the antenna array;
based on the location of the second receiver device, adjusting, for a second subset of the one or more antenna elements of the antenna array, one of a phase and a gain to produce a third phase distinct from the first phase or a third gain distinct from the first gain; and
transmitting, via the second subset of the one or more antenna elements of the antenna array, a plurality of third EM signals having the third phase or the third gain such that the plurality of third EM signals (i) is focused at a focus region that is approximately the size of an antenna array of the second receiver device and (ii) provides EM energy at the focus region that is converted by the second receiver device into usable power, wherein the plurality of third EM signals is transmitted simultaneously with the plurality of second EM signals.

24. The non-transitory computer-readable storage medium of claim 20, wherein the receiver device is a first receiver device and the subset of the one or more antenna elements of the antenna array is a first subset of the one or more antenna elements of the antenna array, and the one or more programs further include instructions for:

while transmitting the plurality of second EM signals, determining a location of a third receiver device based, at least in part, on the plurality of second EM signals transmitted by the first subset of the one or more antenna elements of the antenna array;

based on the location of the third receiver device, adjusting, for a third subset of the one or more antenna elements of the antenna array, one of a phase and a gain to produce a fourth phase distinct from the second phase or a fourth gain distinct from the second gain; and transmitting, via the third subset of the one or more antenna elements of the antenna array, a plurality of fourth EM signals having the fourth phase or the fourth gain such that the plurality of fourth EM signals (i) is focused at a focus region that is approximately the size of an antenna array of the third receiver device and (ii) provides EM energy at the focus region that is converted by the third receiver device into usable power, wherein the plurality of fourth EM signals is transmitted simultaneously with the plurality of second EM signals.

25. The non-transitory computer-readable storage medium of claim 20, wherein the one or more programs further include instructions for:

while transmitting, via the subset of the one or more antenna elements of the antenna array, the plurality of second EM signals, determining a change in the location of the receiver device based, at least in part, on the plurality of second EM signals transmitted by the subset of the one or more antenna elements of the antenna array;

based on the change in the location of the receiver device, adjusting, for the subset of the one or more antenna elements of the antenna array, one of the second phase and the second gain to produce an adjusted second phase or an adjusted second gain; and transmitting, via the subset of the one or more antenna elements of the antenna array, a plurality of fifth EM signals having the adjusted second phase or the adjusted second gain such that the plurality of fifth EM signals (i) is focused at a focus region that is approximately the size of an antenna array of the receiver device and (ii) provides EM energy at the focus region that is converted by the receiver device into usable power.

26. The non-transitory computer-readable storage medium of claim 20, wherein the plurality of second EM signals is focused such that at least some of the plurality of second EM signals reflect from a surface to focus at the focus region that is approximately the size of the antenna array of the receiver device.

27. The non-transitory computer-readable storage medium of claim 20, wherein:

the plurality of second EM signals includes a first set of second EM signals and a second set of second EM signals;

the first set of second EM signals is focused at a first portion of the focus region that is approximately the size of a first portion of the antenna array of the receiver device; and the second set of second EM signals is focused at a second portion of the focus region that is approximately the size of a second portion of the antenna array of the receiver device.

\* \* \* \* \*

UNITED STATES PATENT AND TRADEMARK OFFICE
CERTIFICATE OF CORRECTION

PATENT NO. : 11,652,369 B2
APPLICATION NO. : 17/216474
DATED : May 16, 2023
INVENTOR(S) : Leabman et al.

It is certified that error appears in the above-identified patent and that said Letters Patent is hereby corrected as shown below:

In the Claims

Claim 2, Column 26, Line 47, please delete "plurality of third EM signals are is" and insert --plurality of third EM signals is--.

Signed and Sealed this
Tenth Day of October, 2023

Katherine Kelly Vidal
Director of the United States Patent and Trademark Office